| (12) | United States Patent | (10) Patent No.: | US 9,046,956 B2 |
|---|---|---|---|
| | Koizumi et al. | (45) Date of Patent: | Jun. 2, 2015 |

(54) POSITION INPUT APPARATUS THAT DETECTS A POSITION WHERE A PRESSURE IS APPLIED

(75) Inventors: Yoshiaki Koizumi, Chiyoda-ku (JP); Naoyuki Hibara, Chiyoda-ku (JP); Toshiaki Kikuta, Chiyoda-ku (JP); So Nakai, Chiyoda-ku (JP); Toshiyasu Higuma, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 725 days.

(21) Appl. No.: 13/264,438

(22) PCT Filed: Jan. 19, 2010

(86) PCT No.: PCT/JP2010/050536
§ 371 (c)(1),
(2), (4) Date: Oct. 14, 2011

(87) PCT Pub. No.: WO2010/122824
PCT Pub. Date: Oct. 28, 2010

(65) Prior Publication Data
US 2012/0032907 A1    Feb. 9, 2012

(30) Foreign Application Priority Data

Apr. 22, 2009  (JP) ................................. 2009-103531
Sep. 4, 2009  (JP) ................................. 2009-204284

(51) Int. Cl.
*G06F 3/041*  (2006.01)
*G06F 3/0488*  (2013.01)

(52) U.S. Cl.
CPC ............ *G06F 3/0414* (2013.01); *G06F 3/0488* (2013.01)

(58) Field of Classification Search
USPC ..................... 345/173–178; 178/18.01–20.04
See application file for complete search history.

(56) References Cited

U.S. PATENT DOCUMENTS

| 5,844,500 A | 12/1998 | Beuk et al. |
| 6,919,927 B1 | 7/2005 | Hyodo |

(Continued)

FOREIGN PATENT DOCUMENTS

| JP | 58-142429 A | 8/1983 |
| JP | 61148522 A | 7/1986 |

(Continued)

OTHER PUBLICATIONS

International Search Report (PCT/ISA/210) issued on May 11, 2010, by Japanese Patent Office as the International Searching Authority for International Application No. PCT/JP2010/050536.

(Continued)

*Primary Examiner* — Ryan A Lubit
(74) *Attorney, Agent, or Firm* — Buchanan Ingersoll & Rooney PC

(57) ABSTRACT

As for a position input apparatus that, when a user applies a pressure to an operation area, determines a pressed position where the pressure is applied, the manufacturing cost of the position input apparatus is reduced. An operation plate is a flat plate having the operation area on one surface. A plurality of pressure sensors (pressure detection devices) detect, at respectively different pressure detection positions, a detection position pressure generated by the pressure applied to the pressed position. A pressed position determination device determines the pressed position, based on a plurality of detection position pressures detected by the plurality of pressure sensors.

6 Claims, 27 Drawing Sheets

(56) References Cited

U.S. PATENT DOCUMENTS

| | | | |
|---|---|---|---|
| 7,746,325 B2 * | 6/2010 | Roberts | 345/173 |
| 8,169,410 B2 * | 5/2012 | Hashimoto et al. | 345/173 |
| 2002/0033795 A1 | 3/2002 | Shahoian et al. | |
| 2002/0175836 A1 * | 11/2002 | Roberts | 345/173 |
| 2003/0098853 A1 | 5/2003 | Ladouceur et al. | |
| 2006/0181521 A1 | 8/2006 | Perreault et al. | |
| 2006/0238517 A1 * | 10/2006 | King et al. | 345/173 |
| 2007/0113681 A1 | 5/2007 | Nishimura et al. | |
| 2007/0127992 A1 * | 6/2007 | Spichtinger et al. | 407/39 |
| 2008/0007434 A1 | 1/2008 | Hristov | |
| 2008/0278458 A1 | 11/2008 | Masuzawa et al. | |
| 2010/0123686 A1 * | 5/2010 | Klinghult et al. | 345/173 |
| 2010/0139990 A1 * | 6/2010 | Westerman et al. | 178/18.03 |

FOREIGN PATENT DOCUMENTS

| | | | |
|---|---|---|---|
| JP | 5-298013 A | 11/1993 | |
| JP | 7-295727 A | 11/1995 | |
| JP | 11-355617 A | 12/1999 | |
| JP | 2000-066626 A | 3/2000 | |
| JP | 2006-039745 A | 2/2006 | |
| JP | 2008-046817 A | 2/2008 | |
| JP | 2008-281616 A | 11/2008 | |
| JP | 2009-110248 A | 5/2009 | |
| WO | 2005/114369 A2 | 12/2005 | |

OTHER PUBLICATIONS

Office Action issued on Oct. 28, 2013, by the Chinese Patent Office in corresponding Chinese Patent Application No. 201080017590.9, and an English Translation of the Office Action. (12 pages).

Extended European Search Report Issued Nov. 5, 2013, by the European Patent Office in corresponding European Patent Application No. 10766884.0. (17 pages).

Office Action (Notification of Reasons for Refusal) dated Sep. 18, 2012, issued by the Japanese Patent Office in the corresponding Japanese Patent Application No. 2011-510243 and an English translation thereof. (5 pages).

* cited by examiner

POSITION INPUT APPARATUS THAT DETECTS A POSITION WHERE A PRESSURE IS APPLIED

TECHNICAL FIELD

This invention relates to a position input apparatus that, when a pressure is applied within an operation area, determines a position where the pressure is applied.

BACKGROUND ART

There is an apparatus, such as a touch panel, in which a transparent pressure sensor is disposed on a display device displaying an operation screen, and when a user applies a pressure on a button or the like displayed on the operation screen, the pressure sensor detects the pressure and it determines a position where the pressure has been applied.

Examples of position detection methods include a method in which two opposing resistive films of approximately the size of the operation screen are disposed on the display device as a pressure sensor. The two resistive films come into contact with each other at a position where a pressure is applied. By measuring a resistance value of them, the contact position is calculated.

CITATION LIST

Patent Documents

Patent Document 1: JP 7-295727 A

SUMMARY OF INVENTION

Technical Problem

A pressure sensor using a conventional method needs to be sized to correspond to the size of an operation screen, so that the manufacturing cost increases in accordance with the size of the operation screen.

Further, since a user views the operation screen through the pressure sensor, the brightness of the operation screen is reduced to a non-negligible degree, so that the visibility of the operation screen is adversely affected. Increasing the brightness of the operation screen to compensate this will result in increased energy consumption.

This invention is made to solve the above problems, for example, and aims to reduce the manufacturing cost of a position input apparatus as well as to prevent the reduction in brightness of an operation screen, regardless of the size of an operation area.

Solution to Problem

A position input apparatus according to this invention determines a pressed position where a pressure is applied, when the pressure is applied to any position within an operation area.

The position input apparatus has an operation plate, at least two pressure detection devices, and a pressed position determination device.

The operation plate is of a flat plate shape and has the operation area on one surface.

Each of the pressure detection devices detects, at a pressure detection position different from a pressure detection position of other pressure detection device, a detection position pressure generated by the pressure applied to the pressed position.

The pressure detection position is located outside the operation area on the operation plate.

The pressed position determination device determines the pressed position, based on at least two detection position pressures detected by the at least two pressure detection devices.

Advantageous Effects of Invention

According to a position input apparatus according to this invention, a pressure detection position is located outside an operation area, so that there is no need to place a pressure detection device for detecting a pressure within the operation area. For this reason, even when an operation screen display device for displaying the operation screen is placed under the operation area, the brightness of the operation screen is not reduced, so that the viewability of the operation screen can be enhanced. Further, even when the size of the operation area is increased, there is no need to change the configuration of the pressure detection device, so that the manufacturing cost of the position input apparatus can be reduced.

DESCRIPTION OF EMBODIMENTS

First Embodiment

A first embodiment will be described with reference to FIGS. 1 to 8.

Figure 1:
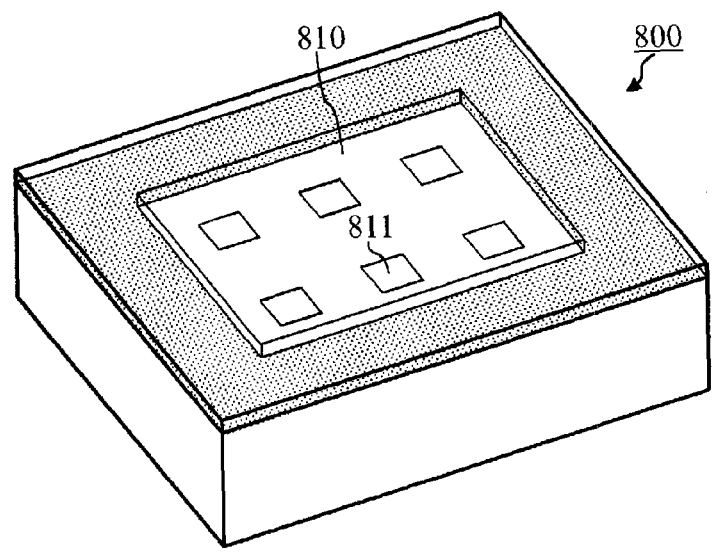
FIG. 1 is an overall axonometric view showing an example of the appearance of a touch panel 800 in a first embodiment.

FIG. 1 is an overall axonometric view showing an example of the appearance of a touch panel 800 in this embodiment.

The touch panel 800 (a position input apparatus, a display operation device) is connected with an information processing device, such as a computer, through a signal line, such as a cable (not shown), or wirelessly. The touch panel 800 receives from the connected information processing device a signal representing an operation screen 810. The touch panel 800 displays the operation screen 810 represented by the input signal. The operation screen 810 includes one or more buttons 811. When a user presses any one of the displayed buttons by using a finger, a pen or the like, the touch panel 800 determines the button 811 pressed by the user. The touch panel 800 transmits data representing a result of the determination to the connected information processing device.

Figure 2:
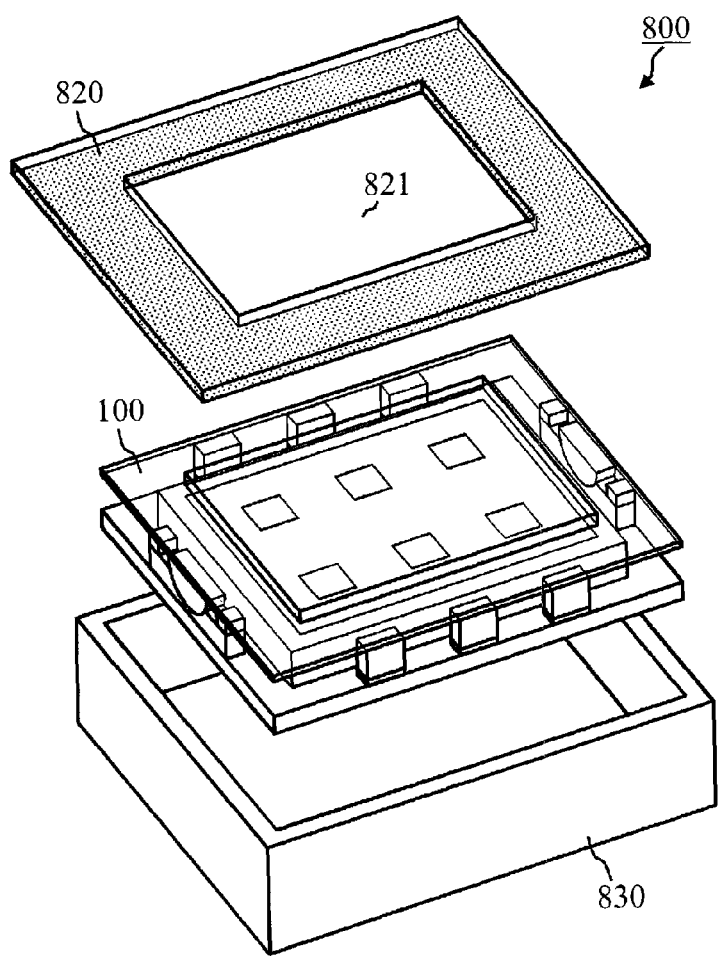
FIG. 2 is an exploded axonometric view showing an example of the structure of the touch panel 800 in the first embodiment.

FIG. 2 is an exploded axonometric view showing an example of the structure of the touch panel 800 in this embodiment.

The touch panel 800 has a housing 830, a decorative plate 820, and a main body 100.

The housing 830 is an open-top box-type case in which the main body 100 is housed.

The main body 100 displays the operation screen 810, and detects pressing of the button 811 by the user.

The decorative plate 820 (an out-of-area protection portion) is a cover covering an opening of the housing 830. The decorative plate 820 has a frame-like shape and is formed with an acrylic plate or the like, for example. The decorative plate 820 has an opening 821 at a center of the plate. The opening 821 is of the same shape as the operation screen 810, and the user can view the operation screen 810 through the opening 821. The decorative plate 820 has its underside printed such that only the operation screen 810 is visible. The user can touch the main body 100 through the opening 821. The decorative plate 820 protects the main body 100 such that when the user presses a portion outside the opening 821, the pressure is not conveyed to the main body 100.

Figure 3:
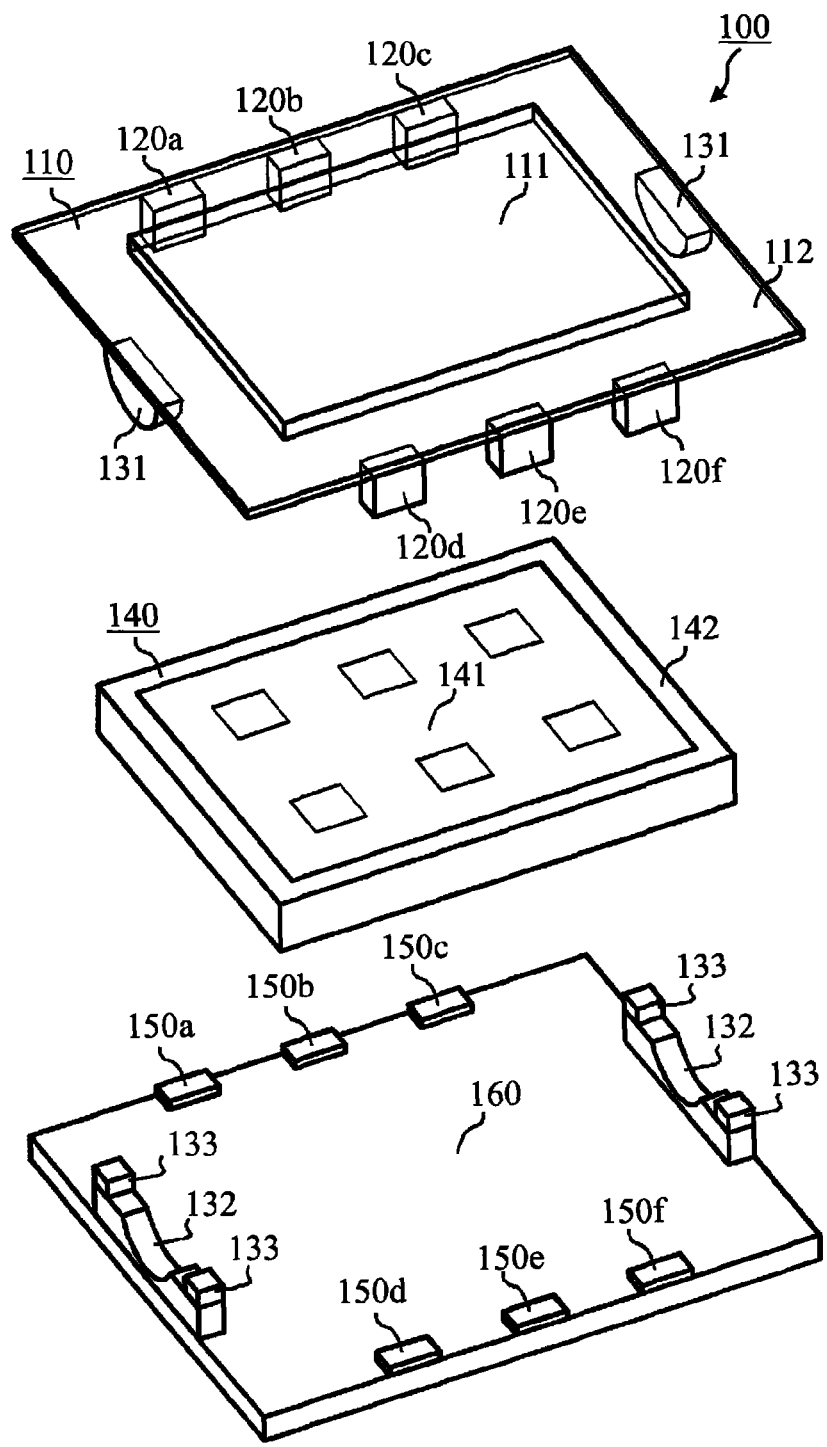
FIG. 3 is an exploded axonometric view showing an example of the structure of a main body 100 in the first embodiment.

FIG. 3 is an exploded axonometric view showing an example of the structure of the main body 100 in this embodiment.

The main body 100 has an operation plate 110, an operation screen display device 140, and a bottom plate 160.

The operation screen display device 140 is a device for displaying the operation screen 810 such as a liquid crystal display panel (an LCD). The operation screen display device 140 has a display portion 141 and a frame portion 142. The display portion 141 is a portion where the operation screen 810 is actually displayed. The frame portion 142 is a portion around the display portion 141. The operation screen display device 140 is fixed to the bottom plate 160 (a lower plate) by using a fixation member (a fixation tool) such as a screw. The operation screen display device 140 inputs from the information processing device, such as a computer, a signal representing the operation screen 810 to be displayed. The operation screen display device 140 displays the operation screen 810 represented by the input signal.

The operation plate 110 is a flat plate composed of a transparent material such as an acrylic plate, for example. The operation plate 110 has a center portion 111 and an outer edge portion 112. The center portion 111 is of the same shape as the operation screen 810. An upper surface of the center portion 111 is an operation area to be touched by the user for operating a button. The center portion 111 is thicker than the outer edge portion 112.

Six detection position support portions 120a to 120f (posts) and two operation plate support portions 131 are attached to the outer edge portion 112. The detection position support portions 120a to 120f and the operation plate support portions 131 may be formed integrally with the operation plate 110, or may be configured separately from the operation plate 110 and fixed to the operation plate 110 by using a fixation member such as a screw.

Six pressure sensors 150a to 150f and two operation plate support receiving portions 132 are attached to the bottom plate 160. The operation plate support receiving portions 132 may be formed integrally with the bottom plate 160, or may be configured separately from the bottom plate 160 and fixed to the bottom plate 160 by using a fixation member such as a screw, a double-sided tape or the like.

The pressure sensors 150a to 150f (pressure detection devices) are disposed at positions where they contact the detection position support portions 120a to 120f. The detection position support portions 120a to 120f support the operation plate 110, and secures a space between the bottom plate 160 and the operation plate 110, as well as conveys to the pressure sensors 150a to 150f a pressure applied to the operation plate 110 by the user. The pressure sensors 150a to 150f detect through the detection position support portions 120a to 120f the pressure applied to the operation plate 110. The pressure sensors 150a to 150f output a signal representing the detected pressure.

Although not limited to any specific configuration, the pressure sensors 150a to 150f may be configured by using, for example, membrane switches. A pair of electrodes are disposed at a lower side and a resistive body is disposed at an upper side. When application of a pressure causes the resistive body at the upper side to come into contact with the pair of electrodes at the lower side, an electrical connection is established between the electrodes. As the applied pressure increases, a contact area between the resistive body and the electrodes increases and a resistance value between the electrodes decreases. The pressure sensors 150a to 150f generate a voltage proportional to the resistance value between the electrodes, and output the voltage as a signal representing the detected pressure, for example.

The operation plate support receiving portions 132 are disposed at positions where they engage with the operation plate support portions 131. The operation plate support portions 131 and the operation plate support receiving portions 132 support the operation plate 110, and secure the space between the bottom plate 160 and the operation plate 110. The two operation plate support portions 131 are semicircular cylinders having a common axis. The operation plate 110 is held in a rotatable manner by the operation plate support portions 131 and the operation plate support receiving portions 132 such that a center of rotation is the axis of the operation plate support portions 131.

A total of four elastic bodies 133 are disposed between the operation plate 110 and the operation plate support receiving portions 132, two for each operation plate support receiving portion 132. The elastic bodies 133 are, for example, rubber, sponges, springs or the like, and have a tendency to hold the operation plate 110 in parallel with the bottom plate 160.

Figure 4:
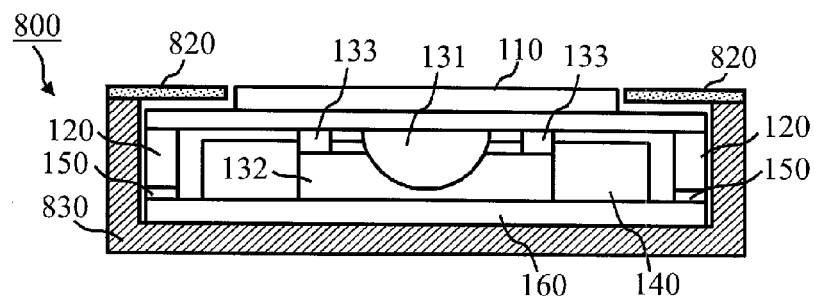
FIG. 4 is a side cutaway view showing an example of the structure of the touch panel 800 in the first embodiment.

FIG. 4 is a side cutaway view showing an example of the structure of the touch panel 800 in this embodiment.

A gap is formed between the operation plate 110 and the operation screen display device 140 such that a pressure applied to the operation plate 110 by the user will not be conveyed to the operation screen display device 140. When the user applies a pressure to the operation area of the operation plate 110, this causes the operation plate 110 to rotate on the axis of the operation plate support portions 131. The pressure is conveyed through the detection position support portion 120 to the pressure sensor 150 located at a side where the pressure is applied, and the pressure sensor 150 detects the pressure. When the user stops applying the pressure, elastic force of the elastic bodies 133 causes the operation plate 110 to return to a parallel position with the bottom plate 160, and the pressure sensor 150 ceases to detect the pressure.

When the user presses the decorative plate 820, the gap between the decorative plate 820 and the outer edge portion 112 prevents the pressure from being conveyed, so that the pressure sensor 150 does not detect the pressure.

The configuration may be modified such that the operation plate 110 is fixed to the bottom plate 160 with posts or the like, instead of having the operation plate 110 held in a rotatable manner by the operation plate support portions 131, the operation plate support receiving portions 132, and the elastic bodies 133. In this modified configuration, when the user applies a pressure to the operation plate 110, the operation plate 110 is elastically deformed and the pressure is conveyed to the pressure sensors 150 through the detection position support portions 120.

The configuration may also be modified such that the decorative plate 820 is not used. In that case, by configuring the center portion 111 and the outer edge portion 112 to be of the same thickness, the surface can be flat. It is also possible to hide the inside of the touch panel 800 by painting a backside of the outer edge portion 112. In this way, an aesthetically-enhanced design with a transparent surface can be realized.

Figure 5:
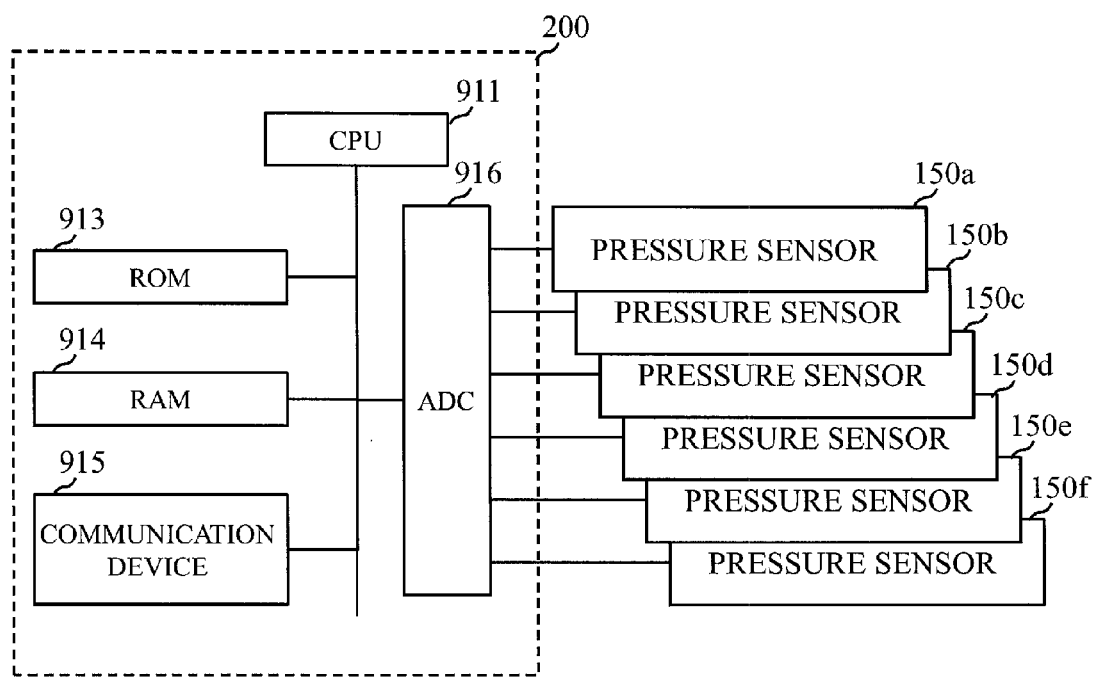
FIG. 5 is a diagram showing an example of the hardware configuration of a pressed position determination device 200 in the first embodiment.

FIG. 5 is a diagram showing an example of the hardware configuration of a pressed position determination device 200 in this embodiment.

The touch panel 800 further has the pressed position determination device 200. Based on a pressure detected by the pressure sensor 150, the pressed position determination device 200 determines where in the operation area the pressure has been applied.

The pressed position determination device 200 has a processing device (hereafter called a "CPU 911"), a nonvolatile memory (hereafter called a "ROM 913"), a volatile memory (hereafter called a "RAM 914"), a communication device 915, and an analog-to-digital converter (hereafter called an "ADC 916").

By executing programs stored in the ROM 913, the CPU 911 controls the pressed position determination device 200 as a whole, processes data stored in the ROM 913 or the RAM 914, and realizes functional blocks to be described below.

The ROM 913 is a nonvolatile storage device storing programs, data and so on.

The RAM 914 is a volatile storage device storing data and so on.

The communication device 915 (a transmitting device/receiving device) communicates with the information processing device such as a computer. Based on an instruction from the CPU 911, the communication device 915 transmits data to the information processing device, or receives data transmitted by the information processing device to the pressed position determination device 200.

The ADC 916 inputs a signal output from the pressure sensor 150, and converts the signal into digital data that can be processed by the CPU 911.

Figure 6:
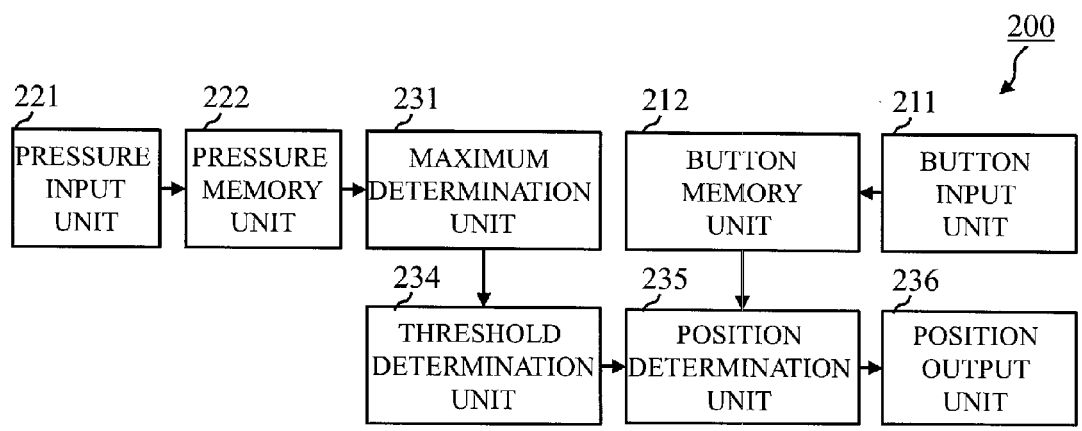
FIG. 6 is a block configuration diagram showing an example of the functional block configuration of the pressed position determination device 200 in the first embodiment.

FIG. 6 is a block configuration diagram showing an example of the functional block configuration of the pressed position determination device 200 in this embodiment.

The pressed position determination device 200 has a button input unit 211, a button memory unit 212, a pressure input unit 221, a pressure memory unit 222, a maximum determination unit 231, a threshold determination unit 234, a position determination unit 235, and a position output unit 236.

As described above, these functional blocks are realized by the CPU 911 executing programs. A part or whole of these functional blocks may be realized by an analog circuit, a digital circuit, an integrated circuit or the like, instead of by programs.

The button input unit 211, using the communication device 915, receives button position data transmitted by the information processing device. The button position data is data representing where exists a button that can be pressed by the user in the operation screen 810 displayed by the operation screen display device 140. The button input unit 211, using the CPU 911, outputs the received button position data.

The button memory unit 212, using the CPU 911, inputs the button position data output by the button input unit 211. The button memory unit 212, using the RAM 914, stores the input button position data.

Figure 7:
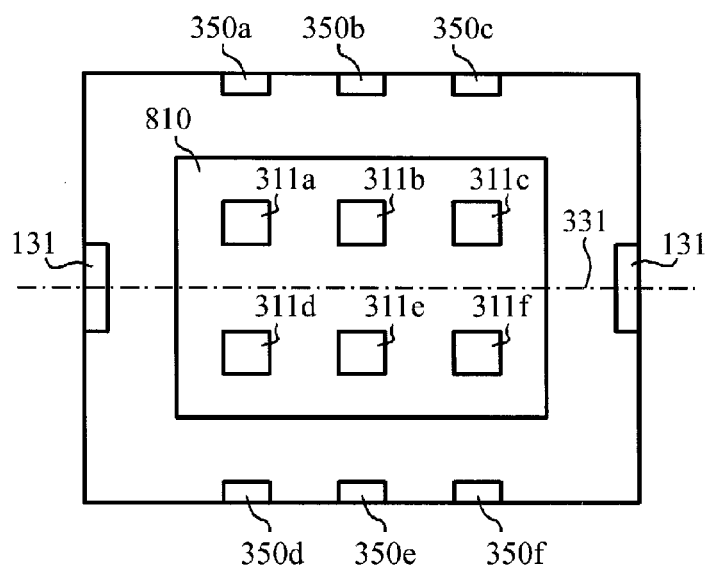
FIG. 7 is a diagram showing an example of the relationship between a button display position 311 and a detection position 350 in the first embodiment.

FIG. 7 is a diagram showing an example of the relationship between a button display position 311 and a detection position 350 in this embodiment.

The button display position 311 (a pressing position) is a standard position where the button 811 can be displayed in the operation screen 810. The button 811 may or may not be displayed at the button display position 311. The button 811 displayed at the button display position 311 may be of any shape, size, color and so on.

The detection position 350 is a position where the pressure sensor 150 detects a pressure applied to the operation plate 110. The detection position 350 is a position where the detection position support portion 120 and the operation plate 110 are connected.

In this example, the operation screen 810 includes six button display positions 311a to 311f. The operation screen 810 is divided into an upper portion and a lower portion at an axis 331 of the operation plate support portions 131, and the upper portion and the lower portion each include three button display positions, namely, 311a to 311c and 311d to 311f, respectively. The three button display positions 311a to 311c are arranged side by side, and the three button display positions 331d to 311f are arranged side by side.

The six detection positions 350a to 350f respectively corresponding to the six pressure sensors 150a to 150f are positioned near the six button display positions 311a to 311f, respectively, and the detection positions 350a to 350f are all located outside the operation screen 810.

The button position data to be input by the button input unit 211 represents which positions of the six button display positions 311a to 311f have the button 811 displayed and which positions do not have the button 811 displayed.

Referring back to FIG. 6, the explanation of the functional blocks of the pressed position determination device 200 will be continued.

The pressure input unit 221, using the ADC 916, inputs the signals output by the pressure sensors 150a to 150f, and converts the signals into digital data (hereafter called "detected pressure data"). The pressure input unit 221, using the CPU 911, outputs the converted detected pressure data.

The pressure memory unit 222, using the CPU 911, inputs the detected pressure data output by the pressure input unit 221. The pressure memory unit 222, using the RAM 914, stores the input detected pressure data.

The maximum determination unit 231, using the CPU 911, inputs the detected pressure data stored by the pressure memory unit 222. The maximum determination unit 231, using the CPU 911 and based on the input detected pressure data, determines the pressure sensor 150 that has detected the largest pressure (hereafter called a "maximum pressure detecting sensor") and the pressure detected by that pressure sensor 150 (hereafter called a "detected maximum pressure"). The maximum determination unit 231, using the CPU 911, outputs data representing a result of the determination.

The threshold determination unit 234, using the CPU 911, inputs the data output by the maximum determination unit 231. The threshold determination unit 234, using the CPU 911 and based on the result of the determination represented by the input data, compares the detected maximum pressure with a predetermined threshold. When the user presses the button 811, the detected maximum pressure becomes larger than the threshold. The threshold determination unit 234, using the CPU 911, outputs data representing a result of the comparison.

A plurality of thresholds may be provided such that, when the user presses the button 811, the threshold determination unit 234 determines whether the pressure is strong or weak by comparing the detected maximum pressure with the plurality of thresholds.

The position determination unit 235, using the CPU 911, inputs the button position data stored by the button memory unit 212 and the data output by the threshold determination unit 234. The position determination unit 235, using the CPU 911, determines whether or not the button 811 is displayed at the button display position corresponding to the maximum pressure detecting sensor that has detected a pressure exceeding the threshold. This is done in order to ignore a case in which the user presses a position where the button 811 is not displayed. If the button 811 is displayed at the button display position corresponding to the maximum pressure detecting sensor, the position determination unit 235, using the CPU 911, generates and outputs data representing the button display position corresponding to the maximum pressure detecting sensor.

The position output unit 236, using the CPU 911, inputs the data output by the position determination unit 235. The position output unit 236, using the communication device 915, transmits the input data to the information processing device.

For example, when the user presses the button 811 displayed at the button display position 311a, the operation plate 110 is tilted centered on the axis 311 toward an upper side. As a result, the pressure is detected by the pressure sensors 150a to 150e corresponding to the upper three pressure detection positions 350a to 350c. Among these sensors, in particular, the sensor 150a corresponding to the detection position 350a proximate to the button display position 311a detects the strongest pressure. The pressed position determination device 200, based on the pressures detected by the pressure sensors 150a to 150f, determines that the pressed button 811 is the button 811 displayed at the button display position 311a corresponding to the pressure sensor 150a that has detected the strongest pressure.

Figure 8:
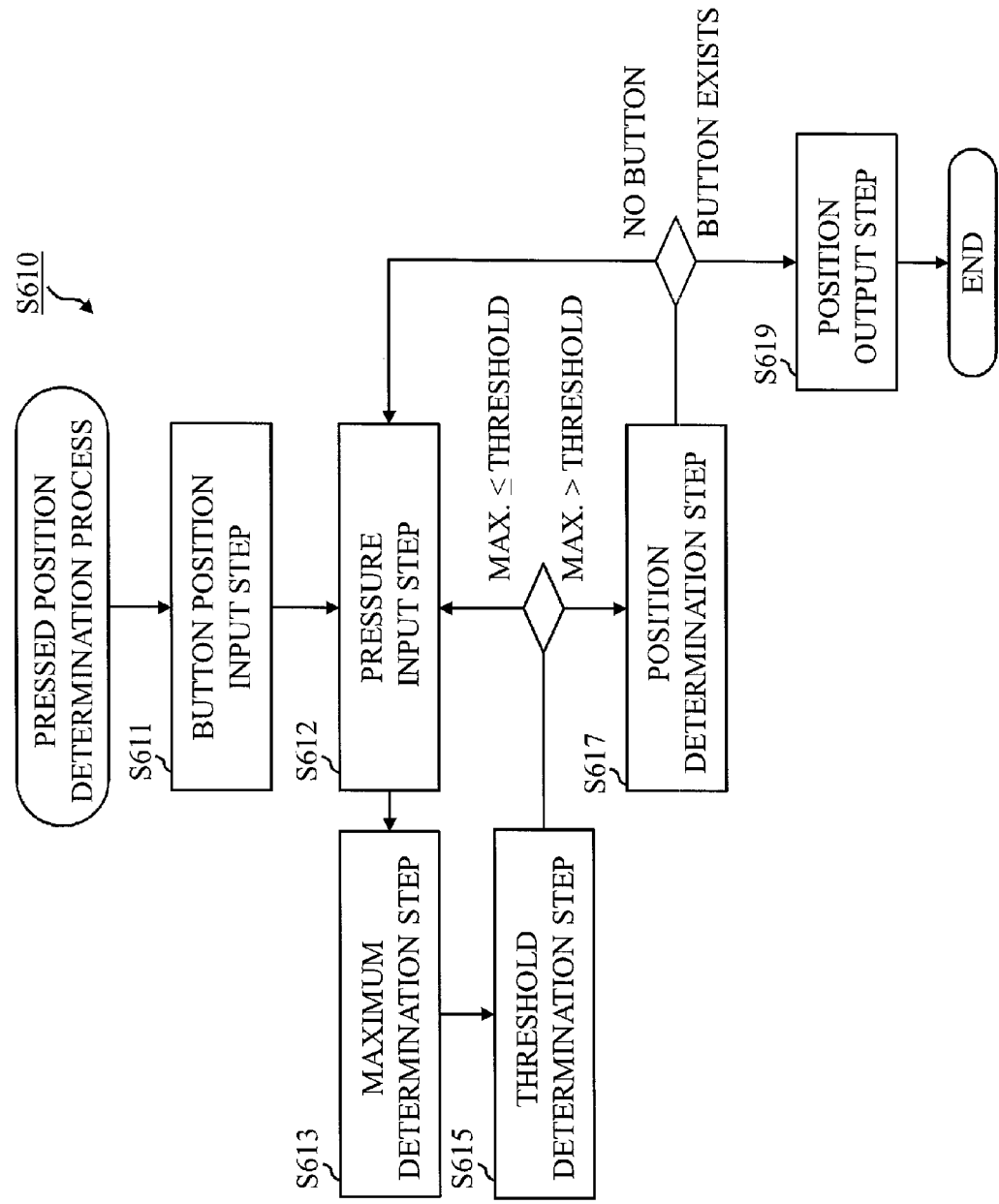
FIG. 8 is a flowchart diagram showing an example of the flow of a pressed position determination process S610 in the first embodiment.

FIG. 8 is a flowchart diagram showing an example of the flow of a pressed position determination process S610 in this embodiment.

In the pressed position determination process S610, the pressed position determination device 200 determines the position where a pressure has been applied within the operation area. The pressed position determination process S610 includes a button position input step S611, a pressure input step S612, a maximum determination step S613, a threshold determination step S615, a position determination step S617, and a position output step S619.

In the button position input step S611, the button input unit 211, using the communication device 915, receives button position data. The button memory unit 212, using the RAM 914, stores the button position data received by the button input unit 211.

In the pressure input step S612, the pressure input unit 221, using the ADC 916, inputs pressures detected by the pressure sensors 150a to 150f. The pressure memory unit 222, using the RAM 914, stores detected pressure data representing the pressures input by the pressure input unit 221.

In the maximum determination step S613, the maximum determination unit 231, using the CPU 911 and based on the detected pressure data stored by the pressure memory unit 222 in the pressure input step S612, determines the maximum pressure detecting sensor and the detected maximum pressure.

In the threshold determination step S615, the threshold determination unit 234, using the CPU 911, compares the detected maximum pressure determined by the maximum determination unit 231 in the maximum determination step S613 with a predetermined threshold.

If the button 811 has not been pressed, the detected maximum pressure is smaller than the threshold. The pressed position determination device 200 returns to the pressure input step S612.

If the button 811 has been pressed, the detected maximum pressure is larger than the threshold. The pressed position determination device 200 proceeds to the position determination step S617.

In the position determination step S617, the position determination unit 235, using the CPU 911 and based on the button position data stored by the button memory unit 212 in the button position input step S611, determines whether or not the button 811 is displayed at the button display position corresponding to the maximum pressure detecting sensor determined by the maximum determination unit 231 in the maximum determination step S613.

If the button 811 is not displayed at the position where the pressure has been applied, the pressed position determination device 200 returns to the pressure input step S612.

If the button 811 is displayed at the position where the pressure has been applied, the pressed position determination device 200 proceeds to the position output step S619.

In the position output step S619, the position determination unit 235, using the CPU 911, generates data representing the button display position corresponding to the maximum pressure detecting sensor determined by the maximum determination unit 231 in the maximum determination step S613. The position output unit 236, using the communication device 915, transmits the data generated by the position determination unit 235.

The position input apparatus (the touch panel 800) in this embodiment determines a pressed position where a pressure is applied, when the pressure is applied to any position within the operation area.

The position input apparatus has the operation plate 110, at least two pressure detection devices (the pressure sensors 150), and the pressed position determination device 200.

The operation plate 110 is of a flat plate shape and has the operation area on one surface.

Each of the pressure detection devices detects, at the pressure detection position 350 different from the pressure detection position 350 of other pressure detection device, a detection position pressure generated by the pressure applied to the pressed position.

The pressure detection position 350 is located outside the operation area on the operation plate 110.

The pressed position determination device 200 determines the pressed position, based on at least two detection position pressures detected by the at least two pressure detection devices.

According to the position input apparatus (the touch panel 800) in this embodiment, the pressure detection positions are located outside the operation area, so that there is no need to place the pressure detection devices within the operation area. Thus, even when the operation screen display device 140 for displaying the operation screen is placed under the operation area, the brightness of the operation screen is not reduced, and the viewability of the operation screen is enhanced. Further, even when the size of the operation area is increased, there is no need to modify the configuration of the pressure detection devices. As a result, the manufacturing cost of the position input apparatus can be reduced.

In the position input apparatus (the touch panel 800) in this embodiment, the pressed position determination device 200 determines a pressure detection device that has detected a largest detection position pressure (the maximum pressure detecting sensor) among the at least two pressure detection devices (the pressure sensors 150), and determines that the pressed position is a position proximate to the pressure detection position 350 of the determined pressure detection device (the maximum pressure detecting sensor) among at least two of the pressure detection positions 350.

According to the position input apparatus (the touch panel 800) in this embodiment, it determines that the pressed position is the position proximate to the pressure detection position of the pressure detection device that has detected the maximum pressure among a plurality of the pressure detection devices (the pressure sensors 150). Thus, when the buttons 811 are placed at predetermined positions, the pressed button 811 can be determined with a simple configuration.

The configuration may be modified such that a protrusion or a recess may be formed on an upper surface of the operation plate 110 at a position corresponding to the button display position. This enables the user to recognize the position of the button 811 not only by looking at the operation screen 810, but also by touching the protrusion or the recess with a finger. This combination of visual and tactile approaches further facilitates the user to recognize the position of the button 811.

The position input apparatus (the touch panel 800) in this embodiment further has the detection position support portions 120a to 120f.

The detection position support portions 120a to 120f support the operation plate 110 at the pressure detection positions 350a to 350f.

The pressure detection devices (the pressure sensors 150a to 150f) detect through the detection position support portions 120a to 120f the detection position pressures at the pressure detection positions 350a to 350f.

According to the position input apparatus (the touch panel 800) in this embodiment, the detection position support portions 120 support the operation plate 110. Thus, a space can be provided under the operation plate 110 for placing the operation screen display device 140, as well as the pressures generated at the pressure detection positions 350a to 350f can be detected by the pressure detection devices through the detection position support portions 120a to 120f.

The position input apparatus (the touch panel 800) in this embodiment further has the operation plate support portion 131.

The operation plate support portion 131 supports the operation plate 110 at a position different from the pressure detection positions 350a to 350f.

According to the position input apparatus (the touch panel 800) in this embodiment, the operation plate support portion 131 supports the operation plate 110 at a position different from the pressure detection positions 350a to 350f. Thus, it is possible to control the movable range of the operation plate 110 and the transmission of force from the pressed position to the pressure detection position.

For example, the configuration may be modified such that, as the operation plate support portion, a bar-shaped member (a post) shorter than the detection position support portion 120 may be disposed between the adjacent detection position support portions 120. In this way, when a pressure is applied to the button display position 311 not corresponding to the pressure sensor 150, the pressure conveyed to the pressure detection position can be reduced. As a result, the pressed position can be determined with enhanced accuracy.

The configuration may be modified such that the pressure detection devices are placed at intermediate portions of the detection position support portions 120a to 120f, instead of under the detection position support portions 120a to 120f. For example, the pressure detection device is configured in the form of a ring, and the detection position support portion is divided into two portions, and the lower detection position support portion is fixed to the bottom plate 160. A male screw is disposed at a top end of the lower detection position support portion and a female screw is disposed at a bottom end of the upper detection position support portion. The two screws are engaged such that the tip of the male screw passes through the ring of the pressure detection device. In this way, the operation plate 110 can be supported only with the detection position support portions. Thus, there is no need to provide a support structure, such as the operation plate support portions, other than the detection position support portions.

The position input apparatus (the touch panel 800) in this embodiment further has an out-of-area protection portion (the decorative plate 820).

The out-of-area protection portion is located, relative to the operation plate 110, at a side of the surface having the operation area, and covers a portion of the operation plate 110 other than the operation area so as to prevent a pressure from being applied to the portion of the operation plate 110 other than the operation area.

According to the position input apparatus (the touch panel 800) in this embodiment, the out-of-area protection portion (the decorative plate 820) covers the portion of the operation plate 110 other than the operation area. Thus, no pressure is applied to the portion of the operation plate 110 other than the operation area, and when the user presses a position outside of the operation area, this can be prevented from being interpreted as the pressing of the button 811.

The position input apparatus (the touch panel 800) in this embodiment further has the operation screen display device 140.

The operation plate 110 is transparent.

The operation screen display device 140 is located, relative to the operation plate 110, at an opposite side of the surface having the operation area, and displays the operation screen 810 visually viewable through the operation area of the operation plate 110.

According to the position input apparatus (the touch panel 800) in this embodiment, the pressure detection positions are located outside the operation area. Thus, there is no need to place a pressure sensor for detecting a pressure inside the operation area, and the brightness of the operation screen 810 is not reduced. As a result, the viewability of the operation screen 810 can be enhanced.

The position input apparatus (the display operation device) described above includes a display screen (the display portion 141), a pressure-sensitive sensor (the pressure sensor 150), a transparent plate (the operation plate 110), and an analog voltage detection circuit (an AD converter, a comparator or the like) (the ADC 916). The transparent plate is disposed at a display surface side of the display screen, and the pressure-sensitive sensor is disposed around the display screen. By pressing the transparent plate over the display screen, a pressure is given to the pressure-sensitive sensor. By reading the value of this pressure by the analog voltage detection circuit, the pressed position is detected.

The position input apparatus (the display operation device) described above includes pressure-sensitive sensors at an n number of locations near pressing positions (the button display positions 311) on a liquid crystal screen, and detects the n number of pressing positions near the sensor positions.

The configuration of the position input apparatus (the display operation device) described above may be modified such that support posts (the operation plate support portions) may be disposed between the pressure-sensitive sensors, and the transparent plate is supported by the support posts.

The configuration of the position input apparatus (the display operation device) described above may be modified such that the decorative plate 820 is disposed on the transparent plate, and the decorative plate 820 is supported independent of the transparent plate such that pressing on the decorative plate 820 does not exert any pressure on the transparent plate.

The configuration of the position input apparatus (the display operation device) described above may be modified such that a protruded portion is provided at each pressing position on the transparent plate.

The configuration of the position input apparatus (the display operation device) described above may be modified such that a recessed portion may be provided at each pressing position on the transparent plate.

The configuration of the position input apparatus (the display operation device) described above may be modified such that control is changed according to a plurality of pressing forces detected by the pressure-sensitive sensor.

Second Embodiment

A second embodiment will be described with reference to FIG. 9.

Like reference numerals will be used to denote like components as in the first embodiment, and explanation will be omitted.

Figure 9:
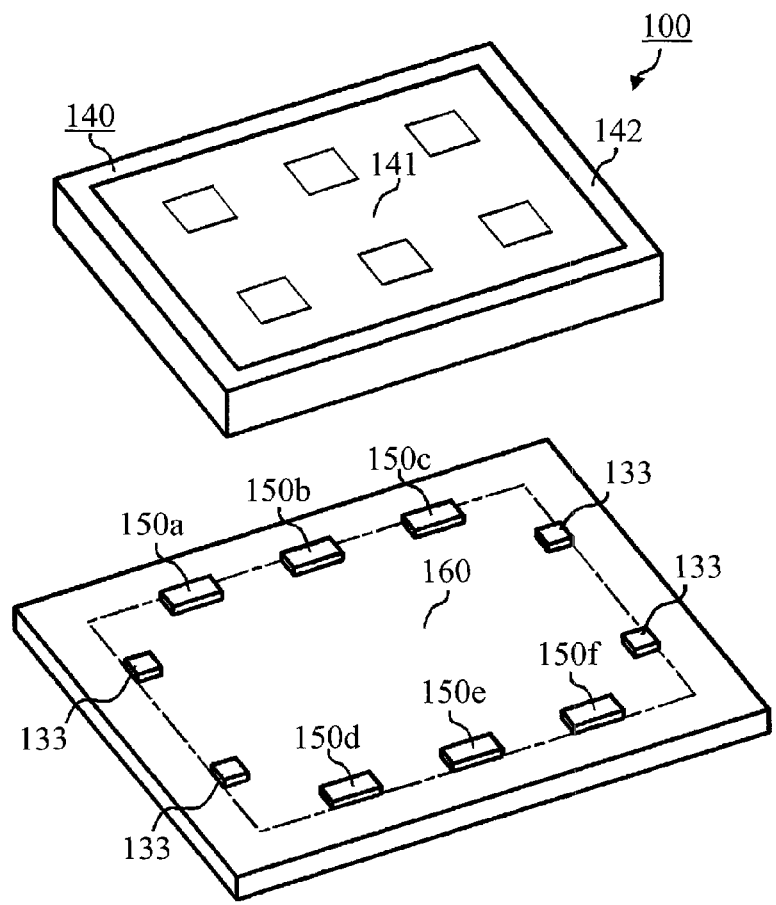
FIG. 9 is an exploded axonometric view showing an example of the structure of the main body 100 in a second embodiment.

FIG. 9 is an exploded view showing an example of the structure of the main body 100 in this embodiment.

The main body 100 has the operation screen display device 140 and the bottom plate 160, and does not have the operation plate 110.

Six pressure sensors 150a to 150f and four elastic bodies 133 are provided on the bottom plate 160.

The elastic bodies 133 have a tendency to hold the display portion 141 of the operation screen display device 140 in parallel with the bottom plate 160.

The pressure sensors 150a to 150f are in direct contact with the backside of the operation screen display device 140, and detect a pressure generated when the user presses the display portion 141 of the operation screen display device 140.

In this embodiment, the operation plate 110 is not provided. Instead, the display portion 141 of the operation screen display device 140 is used as the operation area. When the user presses the button 811 displayed on the display portion 141, a pressure is applied to the pressure sensors 150a to 150f, and the pressure sensors 150a to 150f detect the pressure.

In this way, the configuration may be modified such that the display portion 141 of the operation screen display device 140 is used as the operation plate, and the user presses the button 811 by directly touching the display portion 141.

In the position input apparatus (the touch panel 800) in this embodiment, the operation plate (the operation screen display device 140) displays the operation screen 810 in the operation area.

According to the position input apparatus (the touch panel 800) in this embodiment, the operation plate (the operation screen display device 140) displays the operation screen 810 in the operation area. Thus, the component count of the touch panel 800 can be reduced, and the manufacturing cost of the position input apparatus can be reduced.

The configuration of the position input apparatus (the display operation device) described above may be modified such that the pressure-sensitive sensors (the pressure sensors 150) are disposed at four corners of the backside of the operation screen (the operation screen display device 140) held by the elastic bodies 133, and an LCD (the operation screen display device 140) is fixed at the positions where the pressure-sensitive sensors are disposed, and by pressing the display screen (the display portion 141), a pressing pressure is detected and a pressed position is estimated.

The configuration of the position input apparatus (the display operation device) described above may be modified such that the pressure-sensitive sensors (the pressure sensors 150) are disposed at four sides of the backside of the display screen (the operation screen display device 140) held by the elastic bodies 133, and an LCD (the operation screen display device 140) is fixed at the positions where the pressure-sensitive sensors are disposed, and by pressing the display screen (the display portion 141), a pressing pressure is detected and a pressed position is estimated.

The configuration of the position input apparatus (the display operation device) described above may be modified such that the pressure-sensitive sensors (the pressure sensors 150) are formed in the shape of a ring (not limited to a circular ring but also including a square ring), and the pressure-sensitive sensors are disposed at positions where posts for fixedly holding an LCD are located, and the LCD is fixedly held by passing a metal fitting (a screw) through a hollow portion at the center of each ring-shaped sensor.

Third Embodiment

A third embodiment will be described with reference to FIGS. 10 to 13.

Like reference numerals will be used to denote like components as in the first and second embodiments, and explanation will be omitted.

Figure 10:
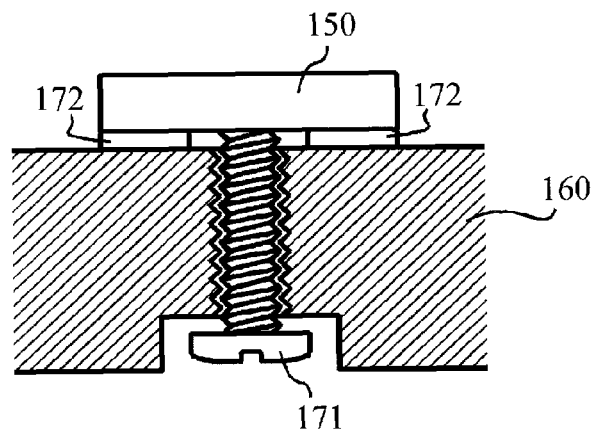
FIG. 10 is a partial enlarged side cutaway view showing an example of the configuration for fixing a pressure sensor 150 to a bottom plate 160 in a third embodiment.

FIG. 10 is a partial enlarged side cutaway view showing an example of the configuration for fixing the pressure sensor 150 to the bottom plate 160 in this embodiment.

The bottom plate 160 has a screw hole passing through the plate at a position exactly under the position at which the pressure sensor 150 is fixed.

The pressure sensor 150 is temporarily attached to the bottom plate 160 with a soft material such as rubber 172. The attachment height of the pressure sensor 150 can be adjusted with an adjustment screw 171 or the like which passes through the screw hole and protrudes from the backside of the bottom plate 160.

When the attachment height of the pressure sensor 150 is raised by adjusting the adjustment screw 171 (a detected pressure adjustment device), the pressure detected by the pressure sensor 150 becomes large. Conversely, when the attachment height of the pressure sensor 150 is lowered by adjusting the adjustment screw 171, the pressure detected by the pressure sensor 150 becomes small.

Due to a slight difference in length of the detection position support portion 120, an angle at which the touch panel 800 is disposed, differences in sensitivity among the pressure sensors 150, and so on, the same applied pressure may result in varied detected pressures among the pressure sensors 150. By adjusting the adjustment screw 171 to eliminate these variations, incorrect detections are reduced.

Figure 11:
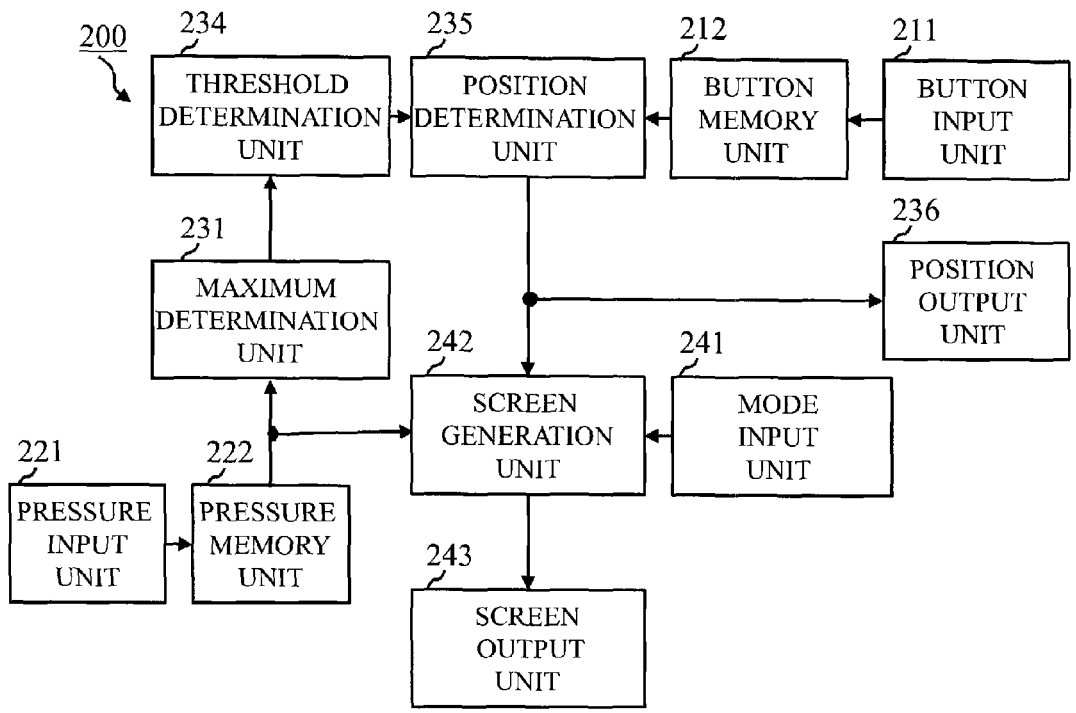
FIG. 11 is a block configuration diagram showing an example of the functional block configuration of the pressed position determination device 200 in the third embodiment.

FIG. 11 is a block configuration diagram showing an example of the functional block configuration of the pressed position determination device 200 in this embodiment.

The pressed position determination device 200 has a mode input unit 241, a screen generation unit 242, and a screen output unit 243, in addition to the components described in the first embodiment.

The mode input unit 241, using the CPU 911, inputs a mode of the touch panel 800. The touch panel 800 has an "operation mode" for inputting an operation of the user and an "adjustment mode" for adjusting the pressure sensor 150. For example, the mode input unit 241, using the communication device 915, inputs a mode by receiving data representing the mode from the information processing device. Alternatively, the mode input unit 241 inputs a mode by reading the state of a mechanical switch such as a tact switch provided on the touch panel 800. The mode input unit 241, using the CPU 911, outputs data representing the input mode.

The screen generation unit 242, using the CPU 911, inputs the data output by the mode input unit 241. The screen generation unit 242, based on the input data and when the mode of the touch panel 800 is the adjustment mode, generates an adjustment screen to be displayed by the operation screen display device 140. The screen generation unit 242, using the CPU 911, outputs data representing the generated adjustment screen.

The screen output unit 243, using the CPU 911, inputs the data output by the screen generation unit 242. The screen output unit 243, using the CPU 911, generates a signal representing the adjustment screen represented by the input data, and outputs the signal to the operation screen display device 140.

When the mode of the touch panel 800 is the operation mode, the operation screen display device 140 displays the operation screen 810 based on the signal received from the information processing device. When the mode of the touch panel 800 is the adjustment mode, it inputs the signal output by the screen output unit 243 and displays the adjustment screen.

Figure 12:
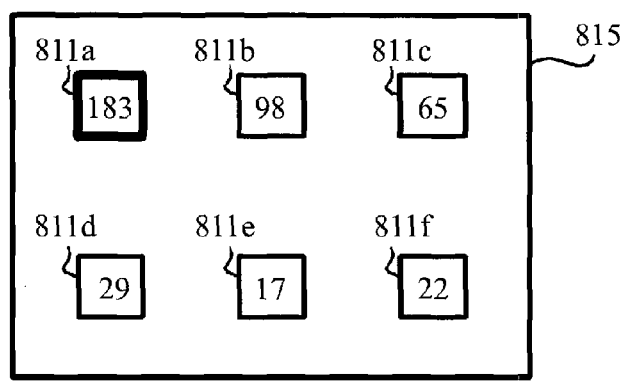
FIG. 12 is a diagram showing an example of an adjustment screen 815 generated by a screen generation unit 242 in the third embodiment.

FIG. 12 is a diagram showing an example of an adjustment screen 815 generated by the screen generation unit 242 in this embodiment.

The adjustment screen 815 includes buttons 811a to 811f at the button display positions 311a to 311f. In each of the buttons 811a to 811f, a pressure value detected by the corresponding pressure sensor 150 is displayed. When the pressed position determination device 200 determines that any of the buttons 811a to 811f is being pressed, the color, shape, size or the like of the button 811 determined as being pressed is changed in order to distinguish that button 811.

Figure 13:
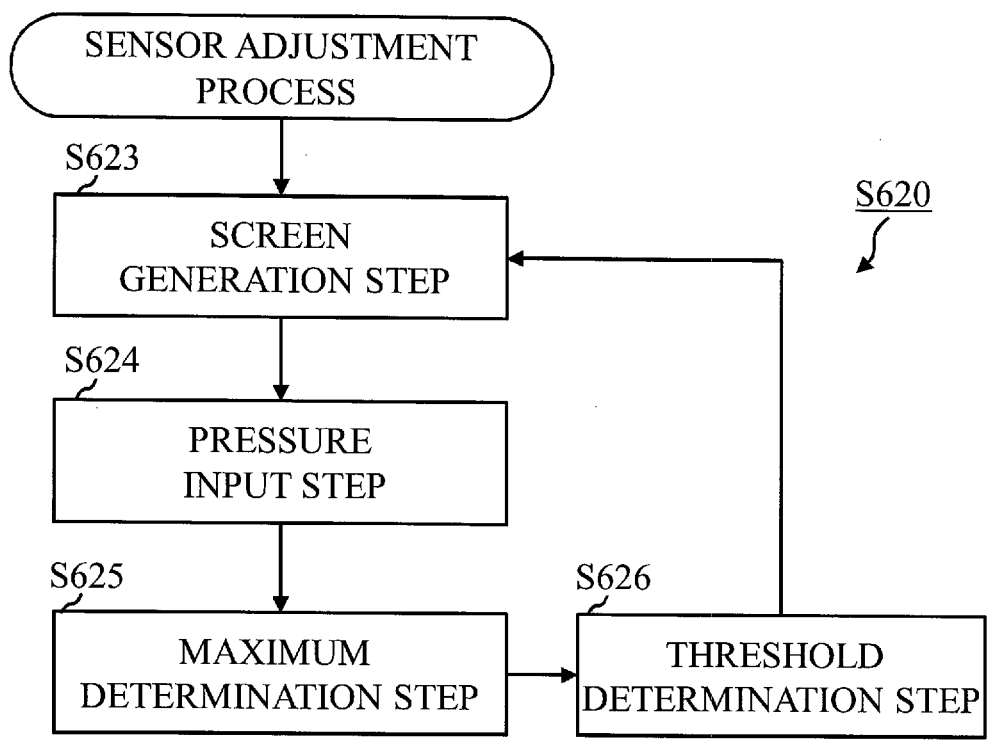
FIG. 13 is a flowchart diagram showing an example of the flow of a sensor adjustment process S620 in the third embodiment.

FIG. 13 is a flowchart diagram showing an example of the flow of a sensor adjustment process S620 in this embodiment.

The sensor adjustment process S620 is executed when the mode input by the mode input unit 241 is the adjustment mode. In the sensor adjustment process S620, the pressed position determination device 200 has the operation screen display device 140 display the adjustment screen 815 in order to aid an administrator to adjust the pressure sensor 150. The sensor adjustment process S620 includes a screen generation step S623, a pressure input step S624, a maximum determination step S625, and a threshold determination step S626.

In the screen generation step S623, the screen generation unit 242, using the CPU 911, generates the adjustment screen 815 based on the detected pressure data stored by the pressure memory unit 222 and the result of the determination represented by the data output by the position determination unit 235. The operation screen display device 140 displays the adjustment screen 815 generated by the screen generation unit 242.

In the pressure input step S624, the pressure input unit 221, using the ADC 916, inputs pressures detected by the pressure sensors 150a to 150f. The pressure memory unit 222, using the RAM 914, stores detected pressure data representing the pressures input by the pressure input unit 221.

In the maximum determination step S625, the maximum determination unit 231, using the CPU 911 and based on the detected pressure data stored by the pressure memory unit 222 in the pressure input step S624, determines the maximum pressure detecting sensor and the detected maximum pressure.

In the threshold determination step S626, the threshold determination unit 234, using the CPU 911, compares the detected maximum pressure determined by the maximum determination unit 231 in the maximum determination step S625 with a predetermined threshold, and determines whether or not the detected maximum pressure is larger than the threshold.

Then, processing returns to the screen generation step S623.

The administrator sets the touch panel 800 to the adjustment mode to display the adjustment screen 815. Looking at the adjustment screen 815, the administrator adjusts the adjustment screw 171 so as to bring the pressure detected by the pressure sensor 150 to an appropriate value. For example, the administrator adjusts each adjustment screw 171 so that the pressure sensors 150 detect the same pressures when no pressure is applied to the operation plate 110. Then, the administrator presses the button 811 with a predetermined force, and checks to see whether the pressed position determination device 200 determines that the pressed button 811 has been pressed. The administrator may use a finger to press the button 811 for checking purposes. However, it is preferable that the pressure to be applied to each button 811 be made uniform by, for example, placing a weight of a predetermined weight over the button 811 (on the operation plate 110).

The position input apparatus (the touch panel 800) in this embodiment further has a detected pressure adjustment device (the adjustment screw 171).

The detected pressure adjustment device is capable of adjusting the detection position pressure to be detected by the pressure detection device (the pressure sensor 150).

According to the position input apparatus (the touch panel 800) in this embodiment, the pressure to be detected by the pressure sensor 150 can be adjusted by the detected pressure adjustment device (the adjustment screw 171). Thus, an incorrect determination can be prevented by adjusting the pressure to be detected by the pressure sensor 150 to an appropriate value.

The position input apparatus (the display operation device) described above includes an adjustment screw (the adjustment screw 171) for changing an initial pressure applied to each pressure-sensitive sensor (the pressure sensor 150), the adjustment screw being disposed on the backside at the position of each pressure-sensitive sensor.

Fourth Embodiment

A fourth embodiment will be described with reference to FIGS. 14 to 16.

Like reference numerals will be used to denote like components as in the first to third embodiments, and explanation will be omitted.

In the third embodiment, the pressure detected by the pressure detection device (the pressure sensor 150) is adjusted by hardware by using the detected pressure adjustment device (the adjustment screw 171). In this embodiment, adjustment is done by software by adding a correction value to the detected pressure data input by the pressure input unit 221, instead of adjusting the pressure detected by the pressure sensor 150.

Figure 14:
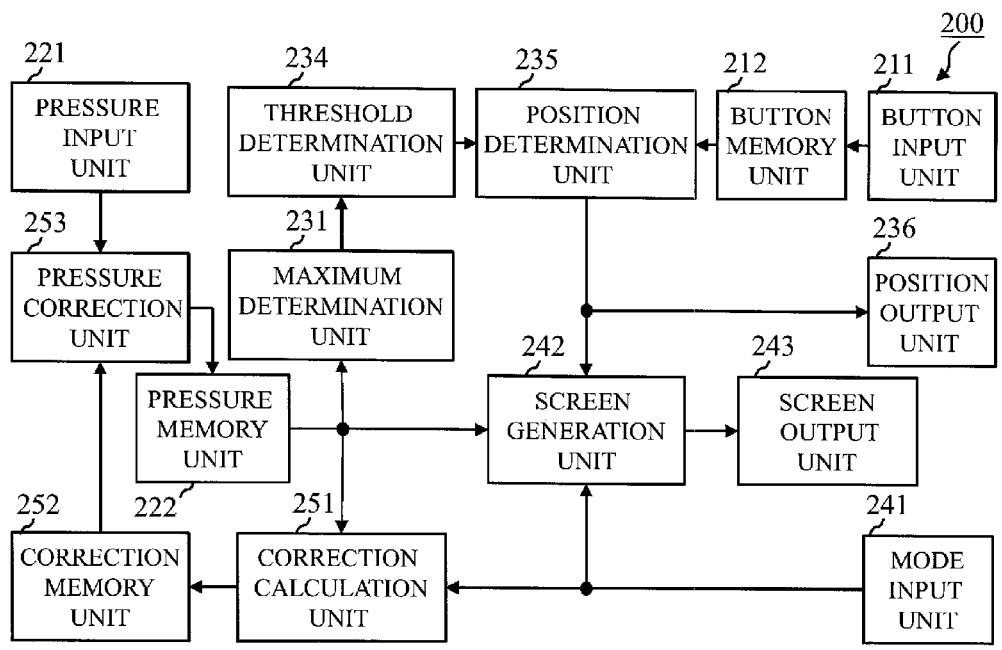
FIG. 14 is a block configuration diagram showing an example of the functional block configuration of the pressed position determination device 200 in a fourth embodiment.

FIG. 14 is a block configuration diagram showing an example of the functional block configuration of the pressed position determination device 200 in this embodiment.

The pressed position determination device 200 further has a correction calculation unit 251, a correction memory unit 252, and a pressure correction unit 253, in addition to the components described in the third embodiment.

When the mode of the touch panel 800 is the adjustment mode, the correction calculation unit 251, using the CPU 911 and based on the detected pressure data stored by the pressure memory unit 222, calculates a pressure correction value. The pressure correction value is a correction value to be added to the pressure detected by the pressure sensor 150. The correction calculation unit 251 calculates the pressure correction value for each of the pressure sensors 150a to 150f. The correction calculation unit 251, using the CPU 911, outputs data representing the calculated pressure correction value (hereafter called "correction value data").

The correction memory unit 252, using the CPU 911, inputs the correction value data output by the correction calculation unit 251. The correction memory unit 252, using the ROM 913, stores the input correction value data. The correction memory unit 252 stores the correction value data in a nonvolatile memory, so that the correction value data is retained even when the touch panel 800 is powered off and then powered on again.

The pressure correction unit 253 (a detected pressure correction device), using the CPU 911, inputs the detected pressure data output by the pressure input unit 221 and the correction value data stored by the correction memory unit 252. The pressure correction unit 253, using the CPU 911, calculates the sum of the pressure represented by the input detected pressure data and the correction value represented by the correction value data. The pressure correction unit 253, using the CPU 911, outputs data representing the calculated sum (hereafter called "corrected pressure data").

The pressure memory unit 222, using the CPU 911, inputs the corrected pressure data output by the pressure correction unit 253, in place of the detected pressure data output by the pressure input unit 221, and using the RAM 914, stores the input corrected pressure data as the detected pressure data.

In this way, the pressure memory unit 222 stores a result of adding a correction value to the pressure detected by the pressure sensor 150, so that the same effect as hardware adjustment of the pressure detected by the pressure sensor 150 can be obtained. Compared to when the detected pressure adjustment device (the adjustment screw 171) is provided, the structure of the touch panel 800 is simplified and the component count is reduced. Thus, the manufacturing cost of the touch panel 800 can be reduced.

Figure 15:
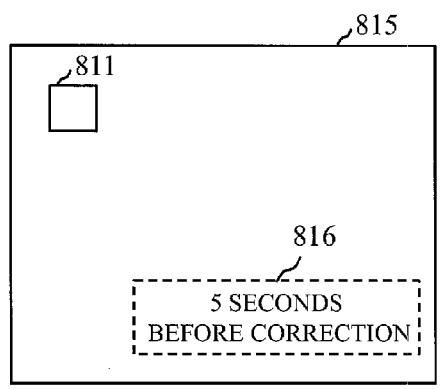
FIG. 15 is a diagram showing an example of the adjustment screen 815 generated by the screen generation unit 242 in the fourth embodiment.

FIG. 15 is a diagram showing an example of the adjustment screen 815 generated by the screen generation unit 242.

The screen generation unit 242, for example, selects the button display positions one by one, and generates the adjustment screen 815 displaying the button 811 at the selected button display position. The adjustment screen 815 also includes a countdown display 816 which counts down in accordance with passage of time. When the countdown display 816 reaches "0", the correction calculation unit 251 calculates the correction value of the pressure sensor 150 corresponding to this button display position if the button 811 is being pressed.

The adjustment screen 815 may be configured without the countdown display 816.

Figure 16:
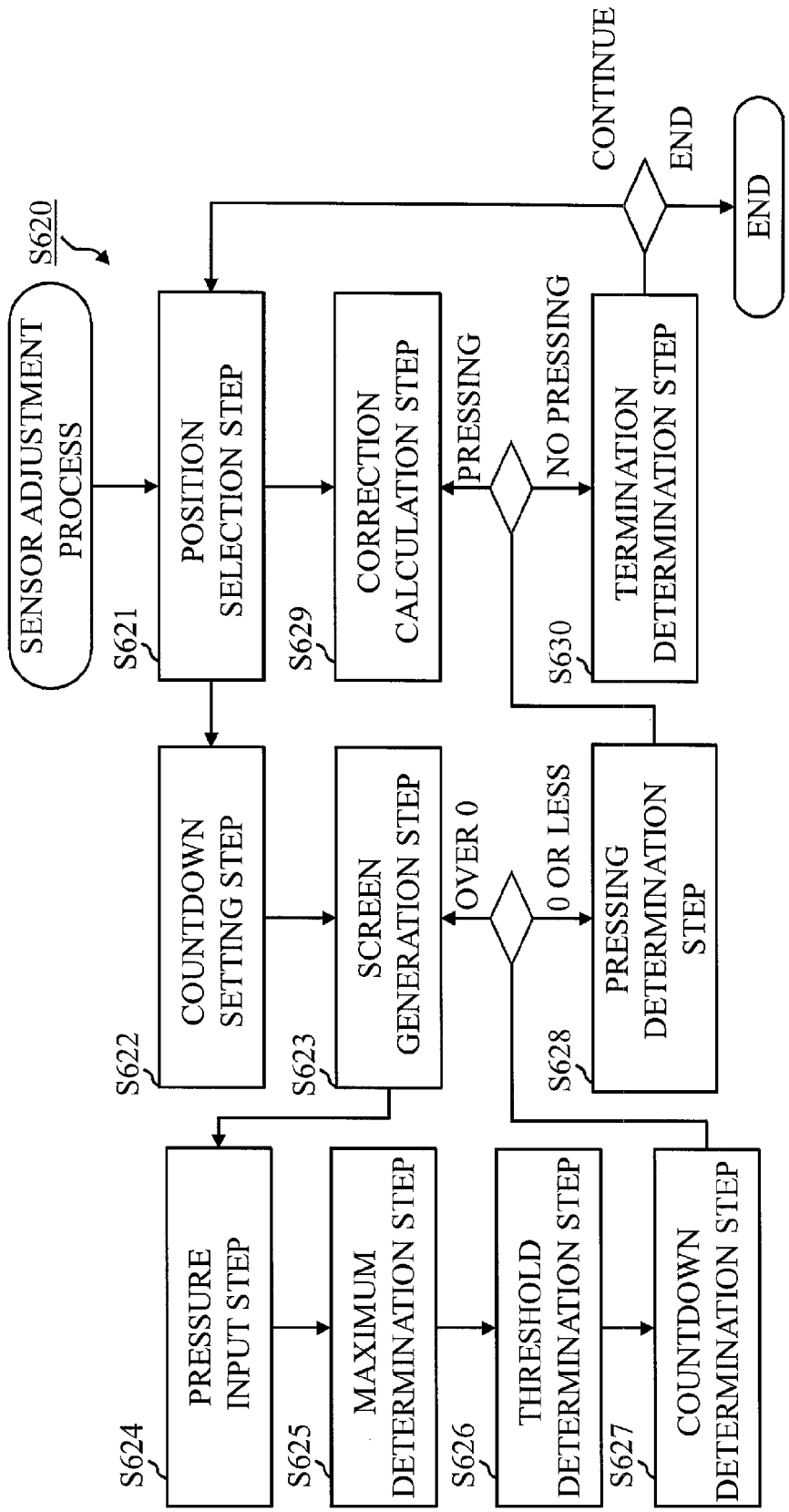
FIG. 16 is a flowchart diagram showing an example of the flow of the sensor adjustment process S620 in the fourth embodiment.

FIG. 16 is a flowchart diagram showing an example of the flow of the sensor adjustment process S620 in this embodiment.

The sensor adjustment process S620 includes a position selection step S621, a countdown setting step S622, a countdown determination step S627, a pressing determination step S628, a correction calculation step S629, and a termination determination step S630, in addition to the steps described in the third embodiment.

In the position selection step S621, the correction calculation unit 251, using the CPU 911, selects each one of the six pressure sensors 150a to 150f in turn.

In the countdown setting step S622, the correction calculation unit 251, using the CPU 911, sets a predetermined time period (for example, 5 seconds) as the remaining time until correction.

In the screen generation step S623, the screen generation unit 242, using the CPU 911, generates the adjustment screen 815 displaying the button 811 at the button display position corresponding to the pressure sensor 150 selected by the correction calculation unit 251 in the position selection step S621, and displaying in the countdown display 916 the remaining time set in the countdown setting step S622. The operation screen display device 140 displays the adjustment screen 815 generated by the screen generation unit 242.

In the countdown determination step $627, the correction calculation unit 251, using the CPU 911, determines whether or not the remaining time until correction has reached 0. If the remaining time is larger than 0, processing returns to the screen generation step S623. If the remaining time is 0 or less, processing proceeds to the pressing determination step S628.

In the pressing determination step S628, the correction calculation unit 251, using the CPU 911, compares the pressure detected by the pressure sensor 150 selected in the position selection step S621 with a predetermined second threshold. The second threshold is a value smaller than the threshold used by the threshold determination unit 234 in the threshold determination steps S615 and S626 for determining whether or not the button is pressed. This is because the pressure detected by the pressure sensor 150 may be small, and the value before correction may be smaller than the threshold of the threshold determination unit 234.

If the pressure detected by the pressure sensor 150 is larger than the second threshold, pressing is determined and processing proceeds to the correction calculation step S629.

If the pressure detected by the pressure sensor 150 is smaller than or equal to the second threshold, non-pressing is determined and processing proceeds to the termination determination step S630.

In the correction calculation step S629, the correction calculation unit 251, using the CPU 911, subtracts the pressure detected by the pressure sensor 150 selected in the position selection step S621 from a predetermined reference pressure so as to calculate a difference, and determines the calculated difference as the pressure correction value for this pressure sensor 150. The correction memory unit 252, using the ROM 913, stores the pressure correction value calculated by the correction calculation unit 251.

Then, the correction calculation unit 251 returns to the position selection step S621, and selects the next pressure sensor 150. When the last pressure sensor 150 has been selected, the correction calculation unit 251 selects the first pressure sensor 150 again.

In the termination determination step S630, the correction calculation unit 251, using the CPU 911, determines whether or not to terminate the sensor adjustment process S620. For example, if non-pressing has been determined in all of the last six determinations in the pressing determination step S628, the correction calculation unit 251 determines that the sensor adjustment process S620 is to be terminated. If it is determined that the sensor adjustment process S620 is not to be terminated, processing returns to the position selection step S621 and the next pressure sensor 150 is selected.

The position input apparatus (the touch panel 800) in this embodiment further has a detected pressure correction device (the pressure correction unit 253).

The detected pressure correction device corrects the detection position pressure detected by the pressure detection device (the pressure sensor 150).

The pressed position determination device 200 determines the pressed position, based on the detection position pressure corrected by the detected pressure correction device.

According to the position input apparatus (the touch panel 800) in this embodiment, the pressed position determination device 200 determines the pressed position based on the detection position pressure corrected by the detected pressure correction device (the pressure correction unit 253). Thus, an incorrect determination can be prevented by appropriately correcting the pressure detected by the pressure sensor 105.

The configuration may be modified such that the touch panel 800 includes a mechanical correction switch for inputting a timing for pressure correction, and when the correction switch is pressed, the correction calculation unit 251 calculates the correction value based on the pressure input by the pressure input unit 221, rather than the correction calculation unit 251 calculates the correction value based on the pressure input by the pressure input unit 221 when the predetermined remaining time expires. In this case, the administrator presses the correction switch while pressing the button 811 displayed on the adjustment screen 815.

Alternatively, the configuration may be modified such that the correction calculation unit 251 calculates the correction value based on the pressure input by the pressure input unit 221 when the pressure detected by the pressure sensor 150 has stabilized at a value larger than a predetermined threshold (for example, when the fluctuating range in a second is within 1%).

The configuration may be modified such that the position input apparatus (the display operation device) described above has a pressure sensitivity setting mode (the adjustment mode), enters the setting mode by a switch (a selector switch) other than switches to be detected by the pressure-sensitive sensors the pressure sensors 150), and stores the pressure sensitivity by pressing another switch (a correction switch) while pressing a position displayed on the display screen (the display portion 141) with a given pressure.

The configuration may be modified such that the position input apparatus (the display operation device) described above has the pressure sensitivity setting mode, enters the setting mode by a switch other than switches to be detected by the pressure-sensitive sensors, and stores the pressure sensitivity upon expiration of a given time period after a position displayed on the display screen is pressed with a given pressure.

The configuration may be modified such that the position input apparatus (the display operation device) described above has the pressure sensitivity setting mode, enters the setting mode by a switch other than switches to be detected by the pressure-sensitive sensors, then displays the position to be pressed (the button 811) on the display screen, and outputs a display intended for information required for setting (setting in progress or setting completed) (the countdown display 816) in a liquid crystal display area other than the position to be pressed.

Fifth Embodiment

A fifth embodiment will be described with reference to FIGS. 17 to 21.

Like reference numerals will be used to denote like components as in the first to fourth embodiments, and explanation will be omitted.

In this embodiment, a configuration will be described in which the button 811 can be disposed at any position in the operation screen 810 instead of at a fixed position.

Figure 17:
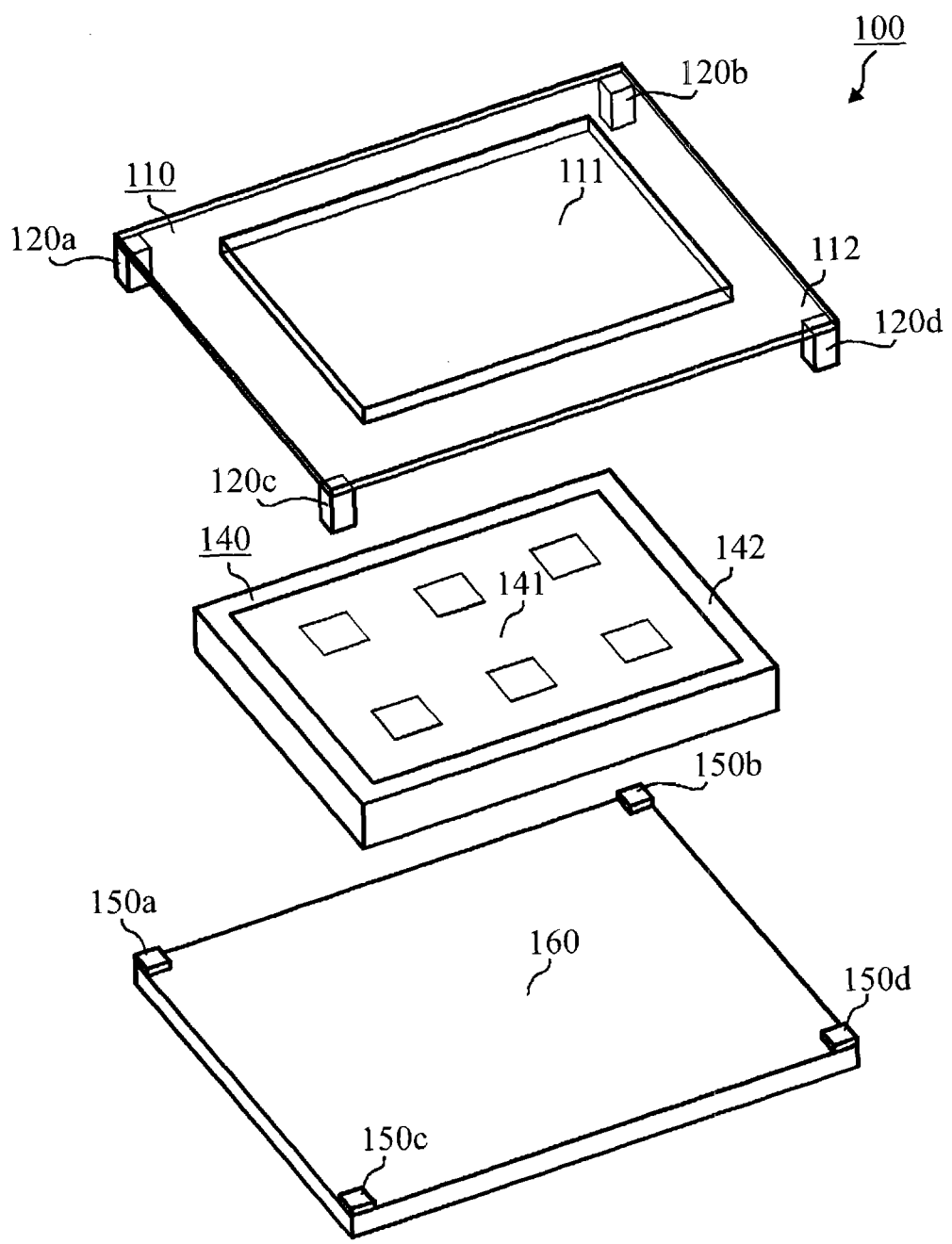
FIG. 17 is an exploded axonometric view showing an example of the structure of the main body 100 in a fifth embodiment.

FIG. 17 is an exploded axonometric view showing an example of the structure of the main body 100 in this embodiment.

The main body 100 has four detection position support portions 120a to 120d and four pressure sensors 150a to 150d.

The detection position support portions 120a to 120d are respectively provided at four corners of the outer edge portion 112.

The pressure sensors 150a to 150d are provided at positions where they contact the detection position support portions 120a to 120d, and detect through the detection position support portions 120a to 120d a detection position pressure generated by a pressure applied to the operation plate 110.

Contact positions between the detection position support portions 120a to 120d and the operation plate 110 define pressure detection positions, and the operation area is included in a rectangle defined by the four pressure detection positions.

When the user applies a pressure to the operation plate 110, that force is distributed among the four detection position support portions 120a to 120d and conveyed to the pressure sensors 150.

Figure 18:
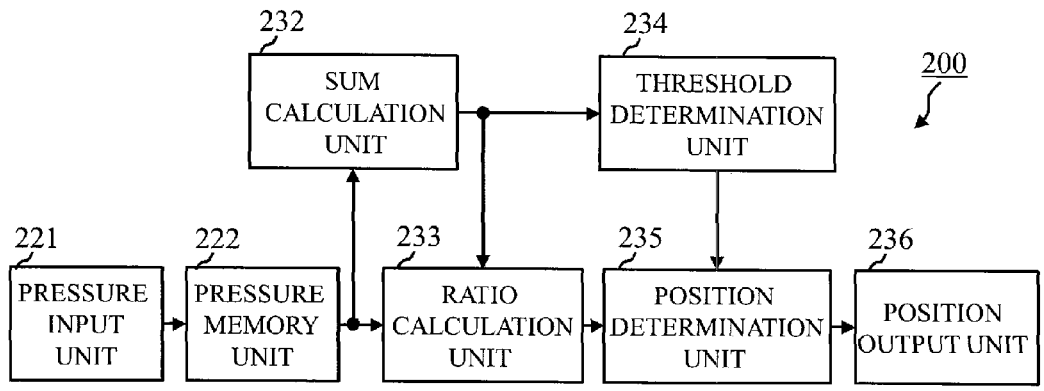
FIG. 18 is a block configuration diagram showing an example of the functional block configuration of the pressed position determination device 200 in the fifth embodiment.

FIG. 18 is a block configuration diagram showing an example of the functional block configuration of the pressed position determination device 200 in this embodiment.

The pressed position determination device 200 has the pressure input unit 221, the pressure memory unit 222, a sum calculation unit 232, a ratio calculation unit 233, the threshold determination unit 234, the position determination unit 235, and the position output unit 236.

The sum calculation unit 232, using the CPU 911, inputs the detected pressure data stored by the pressure memory unit 222. The sum calculation unit 232, using the CPU 911 and based on the input detected pressure data, calculates the sum of the pressures detected by the four pressure sensors 150a to 150d. The sum calculation unit 232, using the CPU 911, outputs data representing the calculated sum.

The ratio calculation unit 233, using the CPU 911, inputs the detected pressure data stored by the pressure memory unit 222 and the data output by the sum calculation unit 232. The ratio calculation unit 233, using the CPU 911 and based on the input data, divides the pressure detected by each of the four pressure sensors 150a to 150d by the sum of the four pressures so as to calculate a quotient. The ratio calculation unit 233, using the CPU 911, outputs data representing the calculated quotients (hereafter called a "pressure distribution ratio").

The threshold determination unit 234, using the CPU 911, inputs the data output by the sum calculation unit 232. The threshold determination unit 234, using the CPU 911 and based on the input data, compares the sum of the four pressures with a predetermined threshold. The sum of the pressures detected by the four pressure sensors is proportional to the pressure applied to the operation plate 110. Thus, when the user has pressed the button 811, the sum of the four pressures is larger than the threshold. The threshold determination unit 234, using the CPU 911, outputs data representing a result of the comparison.

The position determination unit 235, using the CPU 911, inputs the data output by the threshold determination unit 234 and the data output by the ratio calculation unit 233. The position determination unit 235, based on the input data and when the sum of the four pressures is larger than the threshold, calculates the pressed position from the pressure distribution ratio calculated by the ratio calculation unit 233. The position determination unit 235, using the CPU 911, outputs data representing the calculated pressed position.

Figure 19:
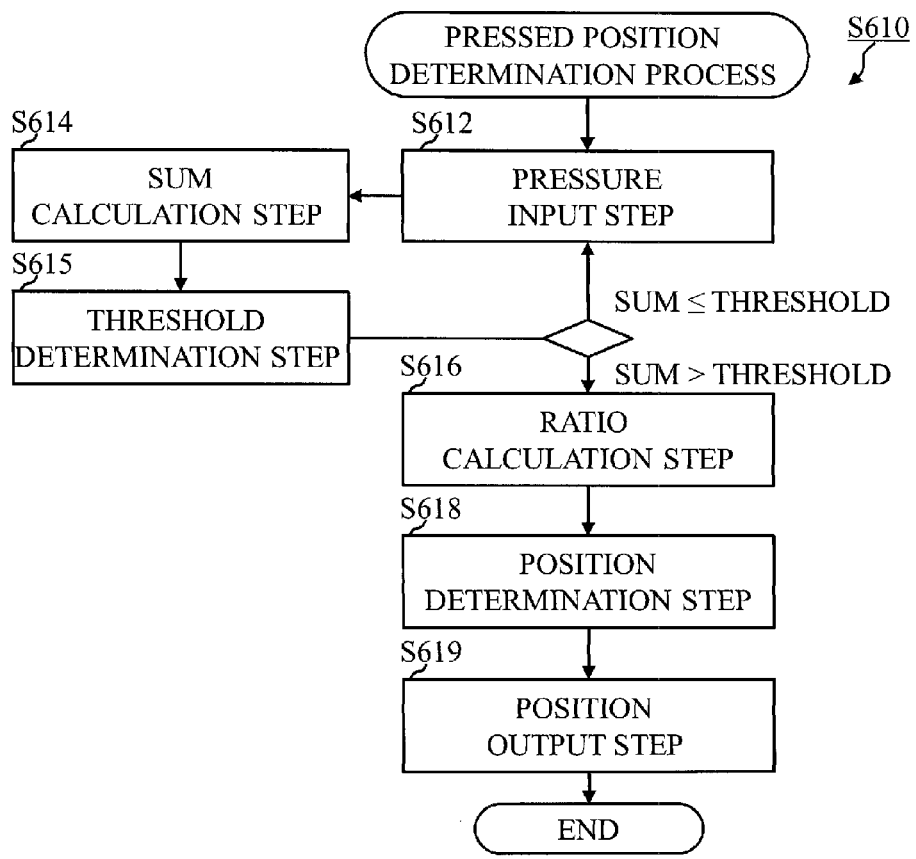
FIG. 19 is a flowchart diagram showing an example of the flow of the pressed position determination process S610 in the fifth embodiment.

FIG. 19 is a flowchart diagram showing an example of the flow of the pressed position determination process S610 in this embodiment.

The pressed position determination process S610 includes the pressure input step S612, a sum calculation step S614, the threshold determination step S615, a ratio calculation step S616, a position determination step S618, and the position output step S619.

In the sum calculation step S614, the sum calculation unit 232, using the CPU 911, calculates the sum of the pressures based on the detected pressure data stored by the pressure memory unit 222 in the pressure input step S612.

In the threshold determination step S615, the threshold determination unit 234, using the CPU 911, compares the sum of the pressures calculated in the sum calculation step S614 with a predetermined threshold.

If the button 811 has not been pressed, the sum of the pressures is smaller than or equal to the threshold. The pressed position determination device 200 returns to the pressure input step S612.

If the button 811 has been pressed, the sum of the pressures is larger than the threshold. The pressed position determination device 200 proceeds to the ratio calculation step S616.

In the ratio calculation step S616, the ratio calculation unit 233, using the CPU 911, calculates the pressure distribution ratios based on the detected pressure data stored by the pressure memory unit 222 in the pressure input step S612 and the sum of the pressures calculated by the threshold determination unit 234 in the sum calculation step S614.

In the position determination step S618, the position determination unit 235, using the CPU 911, calculates the pressed position based on the pressure distribution ratio calculated in the ratio calculation step S616.

Next, a method will be described in which the position determination unit 235 calculates the pressed position.

Figure 20:
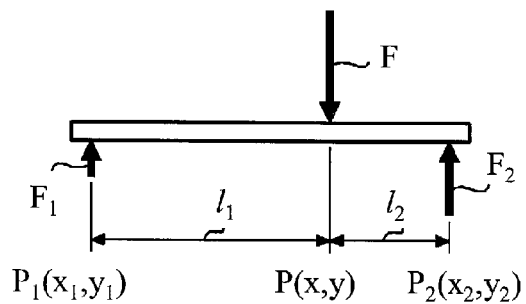
FIG. 20 is a diagram showing a balance of forces when there are two pressure detection positions.

FIG. 20 is a diagram showing a balance of forces when there are two pressure detection positions.

$P_1$ and $P_2$ represent pressure detection positions. Coordinates $(x_1, y_1)$ of the pressure detection position $P_1$ and coordinates $(x_2, y_2)$ of the pressure detection position $P_2$ are known. P represents a pressed position. Coordinates $(x, y)$ of the pressed position P are unknown except that the coordinates $(x, y)$ exist on a line linking the two pressure detection positions $P_1$ and $P_2$. F represents a force applied at the pressed position P. $F_1$ represents a stress generated at the pressure detection position $P_1$. $F_2$ represents a stress generated at the pressure detection position $P_2$. $l_1$ represents a distance between the pressed position P and the pressure detection position $P_1$. $l_2$ represents a distance between the pressed position P and the pressure detection position $P_2$.

The following relational expression holds between the coordinates $(x, y)$ of the pressed position P and the distances $l_1$ and $l_2$.

$$\begin{pmatrix} x \\ y \end{pmatrix} = \frac{l_2}{l_1 + l_2}\begin{pmatrix} x_1 \\ y_1 \end{pmatrix} + \frac{l_1}{l_1 + l_2}\begin{pmatrix} x_2 \\ y_2 \end{pmatrix} \quad \text{[Expression 11]}$$

Based on the balance of the force F and the stresses $F_1$ and $F_2$, the following expression holds:

$$\begin{cases} F = F_1 + F_2 \\ l_1 F_1 = l_2 F_2 \end{cases} \quad \text{[Expression 12]}$$

$$\therefore \frac{l_1}{l_1 + l_2} = \frac{F_2}{F}, \frac{l_2}{l_1 + l_2} = \frac{F_1}{F}$$

Therefore, the coordinates $(x, y)$ of the pressed position P are obtained by the following expression:

$$\begin{pmatrix} x \\ y \end{pmatrix} = \frac{F_1}{F}\begin{pmatrix} x_1 \\ y_1 \end{pmatrix} + \frac{F_2}{F}\begin{pmatrix} x_2 \\ y_2 \end{pmatrix} \quad \text{[Expression 13]}$$

where $F = F_1 + F_2$

Figure 21:
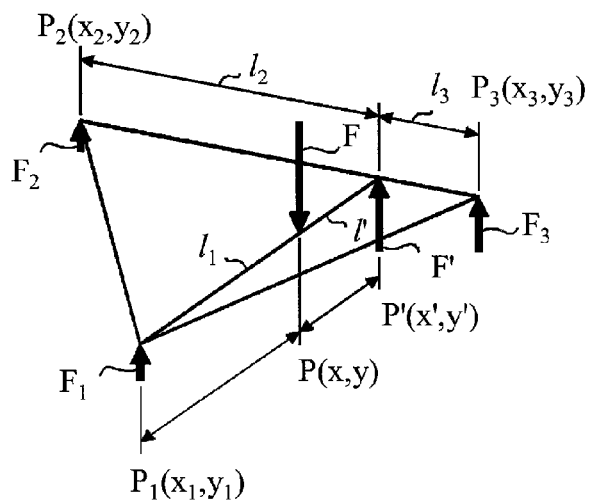
FIG. 21 is a diagram showing a balance of forces when there are three pressure detection positions.

FIG. 21 is a diagram showing a balance of forces when there are three pressure detection positions.

$P_3$ represents a third pressure detection position. Coordinates $(x_3, y_3)$ of the pressure detection position $P_3$ are known. Coordinates $(x, y)$ of the pressed position P are unknown except that the coordinates $(x, y)$ are located in a triangle whose vertices are the three pressure detection positions $P_1$, $P_2$, and $P_3$. P' represents an intersection point between a line passing the pressed position P and the pressure detection position $P_1$ and a line linking the two pressure detection positions $P_2$ and $P_3$. Coordinates $(x', y')$ of the intersection point P' are unknown. $F_3$ represents a stress generated at the pressure detection position $P_3$. F' represents a composite of the two stresses $F_2$ and $F_3$. l' represents a distance between the pressed position P and the intersection point P'. $l_2$ represents a distance between the pressure detection position $P_2$ and the intersection point P'. $l_3$ represents a distance between the pressure detection position $P_3$ and the intersection point P'.

The following expression is derived from the balance between the force F and the stress F1 plus the composite force F':

$$\begin{pmatrix} x \\ y \end{pmatrix} = \frac{F_1}{F}\begin{pmatrix} x_1 \\ y_1 \end{pmatrix} + \frac{F'}{F}\begin{pmatrix} x' \\ y' \end{pmatrix} \quad \text{[Expression 14]}$$

where $F = F_1 + F'$

Based on the relationship that F' is the composite of the stresses $F_2$ and $F_3$, the following expression holds:

$$\begin{pmatrix} x' \\ y' \end{pmatrix} = \frac{F_2}{F'}\begin{pmatrix} x_2 \\ y_2 \end{pmatrix} + \frac{F_3}{F'}\begin{pmatrix} x_3 \\ y_3 \end{pmatrix} \quad \text{[Expression 15]}$$

where $F' = F_2 + F_3$

Therefore, the coordinates $(x, y)$ of the pressed position P are obtained by the following expression:

$$\begin{pmatrix} x \\ y \end{pmatrix} = \frac{F_1}{F}\begin{pmatrix} x_1 \\ y_1 \end{pmatrix} + \frac{F_2}{F}\begin{pmatrix} x_2 \\ y_2 \end{pmatrix} + \frac{F_3}{F}\begin{pmatrix} x_3 \\ y_3 \end{pmatrix} \quad \text{[Expression 16]}$$

where $F = F_1 + F_2 + F_3$

Likewise, when there are an n number of pressure detection positions, the coordinates $(x, y)$ of the pressed position P are obtained by the following expression, where $(x_i, y_i)$ are coordinates of the i-th ($1 \le i \le n$) pressure detection position $P_i$, and $F_i$ is a stress generated at the position detection point $P_i$:

$$\begin{pmatrix} x \\ y \end{pmatrix} = \sum_{i=1}^{n}\left[\frac{F_i}{F}\begin{pmatrix} x_i \\ y_i \end{pmatrix}\right] \text{ where } F = \sum_{i=1}^{n} F_i \quad \text{[Expression 17]}$$

The position determination unit 235 calculates the pressed position by using this expression.

For example, the position determination unit 235, using the ROM 913, has prestored the coordinates $(x_i, y_i)$ of each pressure detection position. The position determination unit 235, using the CPU 911, calculates the x coordinate of the pressed position by multiplying the x coordinate of the pressure detection position corresponding to each pressure sensor 150 by the pressure distribution ratio calculated for each pressure sensor 150 by the ratio calculation unit 233 (equivalent to "$F_i/F$" in the above expression) so as to calculate each product, and then adding all the calculated products to obtain the total sum. Likewise, the position determination unit 235, using the CPU 911, calculates the y coordinate of the pressed position by multiplying the y coordinate of the pressure detection position corresponding to each pressure sensor 150 by the pressure distribution ratio calculated for each pressure sensor 150 by the ratio calculation unit 233 so as to calculate each product, and then adding all the calculated products to obtain the total sum.

As has been described, when the operation area is flat, the pressed position in the operation area can be determined by providing three or more pressure detection positions and placing the operation area so as to be contained in a polygon whose vertices are these pressure detection positions. Since the operation area is normally rectangular, it is efficient and preferable to provide four pressure detection positions.

The position input apparatus (the touch panel 800) in this embodiment has at least three pressure detection devices (the pressure sensors 150).

Pressure detection positions of the pressure detection devices form a polygon enclosing at least a part of the operation area.

The pressed position determination device 200 determines the pressed position, based on a ratio (a pressure distribution ratio) of at least three detection position pressures detected by the at least three pressure detection devices.

According to the position input apparatus (the touch panel 800) in this embodiment, there is no need to predetermine the position of the button 811, and the pressed position can be determined with a small number of pressure detection devices. Thus, the manufacturing cost of the position input apparatus can be reduced.

The configuration may be modified such that the position input apparatus (the display operation device) described above uses three pressure-sensitive sensors (the pressure sensors 150) positioned at three positions which are both edges of one side of a transparent plate (the operation plate 110) and a center of an opposing side, has the display screen (the display portion 141) disposed within a triangle connecting the three positions, and by pressing the display screen, detects the pressed position on the display screen.

The configuration may be modified such that the position input apparatus (the display operation device) described above detects the pressed position by using four pressure-sensitive sensors placed at four corners of the transparent plate.

Sixth Embodiment

A sixth embodiment will be described with reference to FIGS. 22 to 27.

Like reference numerals will be used to denote like components as in the first to fifth embodiments, and explanation will be omitted.

Figure 22:
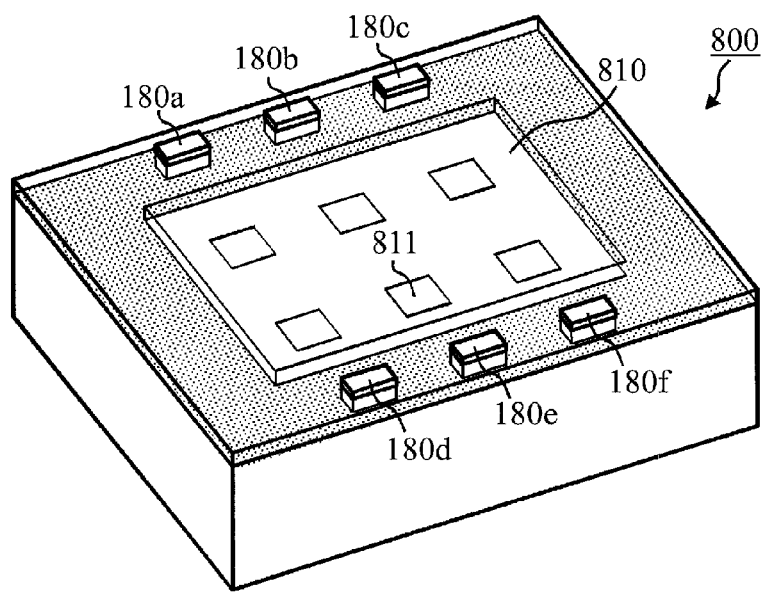
FIG. 22 is an overall axonometric view showing an example of the appearance of the touch panel 800 in a sixth embodiment.

FIG. 22 is an overall axonometric view showing an example of the appearance of the touch panel 800 in this embodiment.

The touch panel 800 further has six operation switches 180a to 180f, in addition to the components described in the first to fifth embodiments.

The operation switches 180a to 180f are positioned outside the operation screen 810. When the user presses any one of the operation switches 180a to 180f, the touch panel 800 determines which of the operation switches 180a to 180f has been pressed, and transmits data representing a result of the determination to the information processing device.

The touch panel 800 distinguishes between when the user presses the operation switches 180a to 180f and when the user presses the buttons 811 displayed within the operation screen 810. The information processing device may allocate to each of the operation switches 180a to 180f the same function as the button 811 displayed at the corresponding position within the operation screen 810, or may allocate a different function as the button 811 displayed within the operation screen 810.

Figure 23:
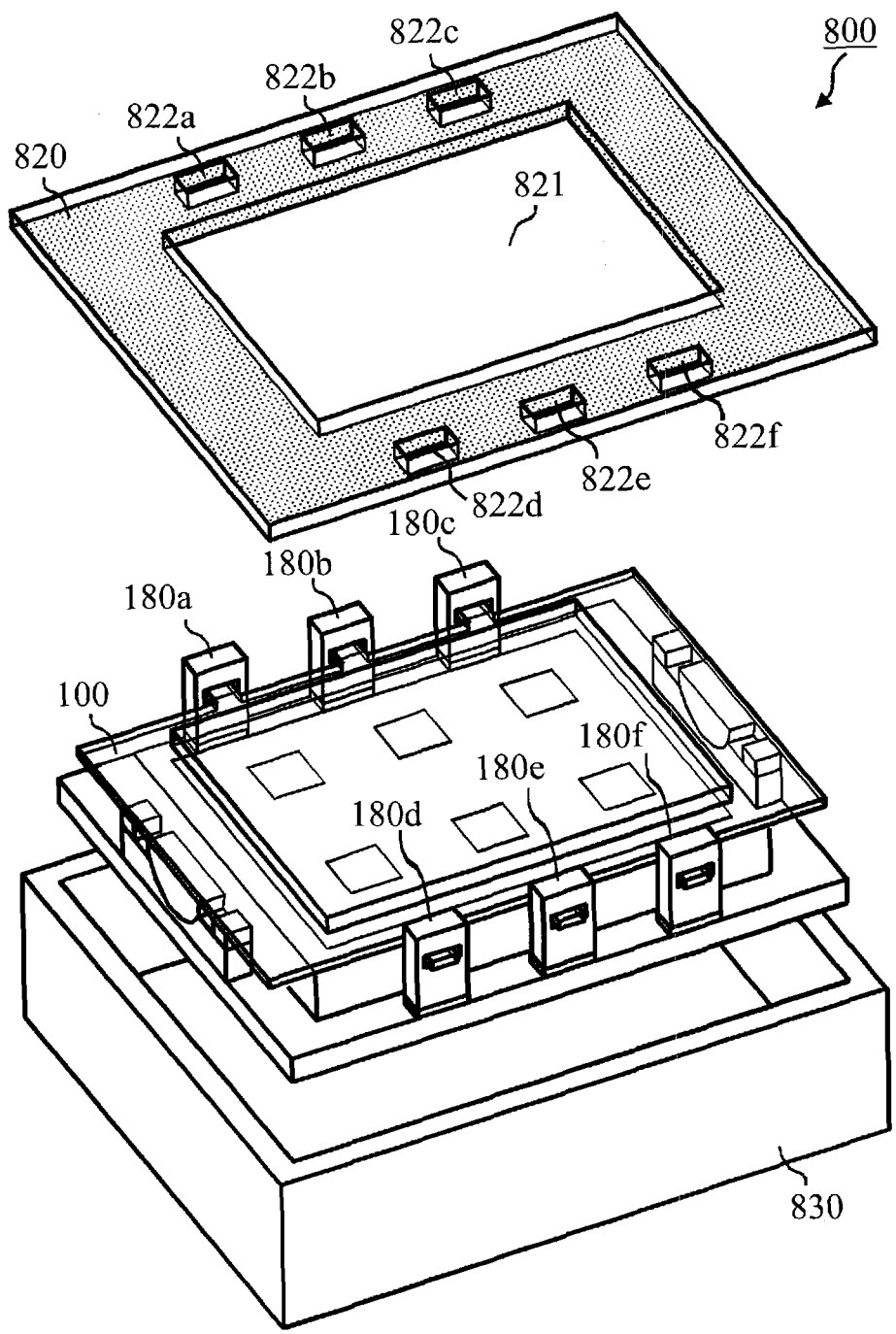
FIG. 23 is an exploded axonometric view showing an example of the structure of the touch panel 800 in the sixth embodiment.

FIG. 23 is an exploded axonometric view showing an example of the structure of the touch panel 800 in this embodiment.

The operation switches 180a to 180f are a part of the main body 110. The operation switches 180a to 180f also function as the detection position support portions 120a to 120f described in the first to fifth embodiments. That is, the operation switches 180a to 180f support the operation plate 110, and convey to the pressure sensors 150a to 150f a pressure applied to the operation plate 110 by the user. The operation switches 180a to 180f may be configured separately from the detection position support portions 120a to 120f.

The decorative plate 820 has through holes 822a to 822f at positions corresponding to the operation switches 180a to 180f. The upper portions of the operation switches 180a to 180f protrude from an upper side of the decorative plate 820 through the through holes 822a to 822f, so that the user can press the operation switches 180a to 180f.

Figure 24:
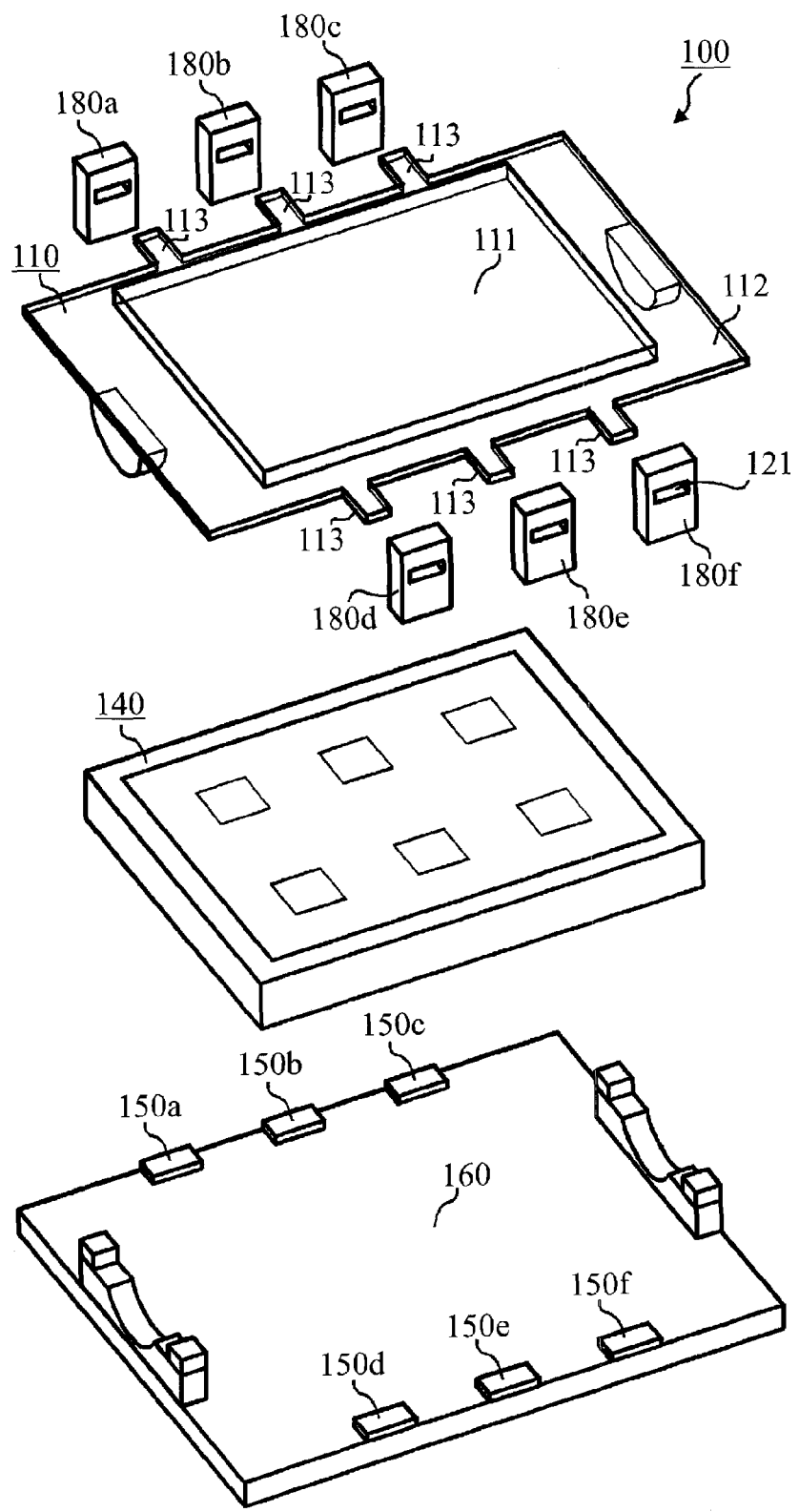
FIG. 24 is an exploded axonometric view showing an example of the structure of the main body 100 in the sixth embodiment.

FIG. 24 is an exploded axonometric view showing an example of the structure of the main body 100 in this embodiment.

The operation plate 110 has six tongue portions 113. The tongue portions 113 are provided at positions corresponding to the pressure detection positions of the operation plate 110.

The operation switches 180a to 180f are of an approximately rectangular parallelepiped shape, and has tongue support portions 121. The tongue support portions 121 are through holes provided across middle portions of the operation switches 180a to 180f. The tongue portions 113 of the operation plate 110 are inserted into the tongue support portions 121, so that the operation switches 180a to 180f support the operation plate 110, and convey to the pressure sensors 150a to 150f a pressure applied to the operation plate 110 by the user.

Figure 25:
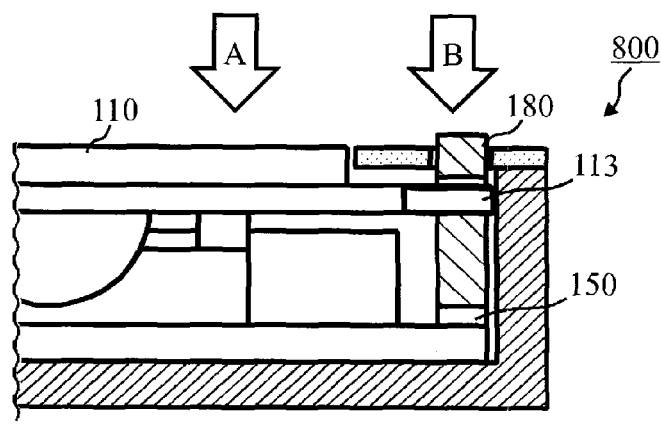
FIG. 25 is a schematic diagram showing an example of the operation of the touch panel 800 in the sixth embodiment.

FIG. 25 is a schematic diagram showing an example of the operation of the touch panel 800 in this embodiment.

When the user presses the operation plate 110 (hereafter called a "case A"), the pressure is conveyed to the pressure sensor 150 through the tongue portion 113 and the operation switch 180.

When the user presses the operation switch 180 (hereafter called a "case B"), the pressure is conveyed to the pressure sensor 150 through the operation switch 180.

Figure 26:
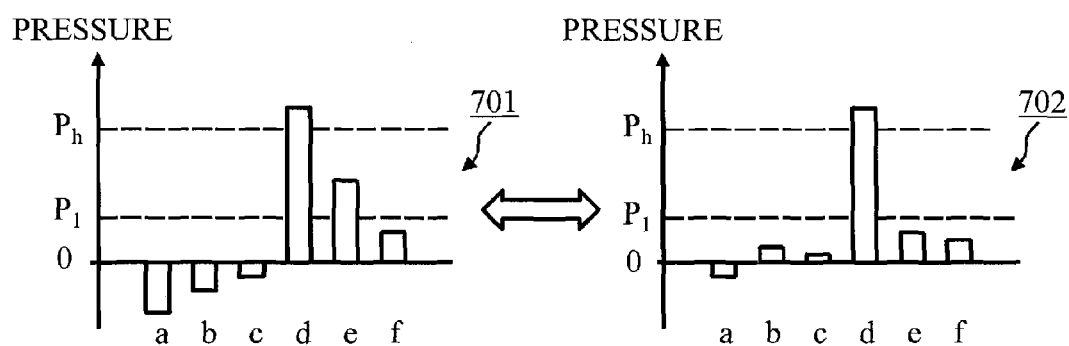
FIG. 26 shows graph charts depicting an example of detection position pressures detected by pressure sensors 150a to 150f in the sixth embodiment.

FIG. 26 shows graph charts depicting an example of detection position pressures detected by the pressure sensors 150a to 150f in this embodiment.

A chart 701 depicts the case A (when a position near the operation switch 180d is pressed in the operation plate 110), and a chart 702 depicts the case B (when the operation switch 180d is pressed). The horizontal axis depicts the pressure sensors 150a to 150f. The vertical axis depicts detection position pressures detected by the respective pressure sensors 150 (a difference in a manner that zero is a detection position pressure detected by the respective pressure sensors 150 when no operation is performed). The unit of the vertical axis is, for example, gram force per square millimeter ($gf/mm^2$).

$P_h$ represents a pressing determining threshold. The pressing determining threshold is a threshold for determining whether or not the user has pressed the operation plate 110 or the operation switch 180. $P_1$ represents a non-pressing determining threshold. The non-pressing determining threshold is a threshold for determining whether the user has pressed the operation plate 110 or the operation switch 180.

When the user presses the operation plate 110 (at a position near the operation switch 180*d*) (the chart 701), the operation plate 110 as a whole is tilted toward a near side, so that the detection position pressures detected by the pressure sensors 150*d* to 150*f* become large and, conversely, the detection position pressures detected by the pressures sensors 150*a* to 150*c* become small. Among the pressure sensors 150*d* to 150*f*, the largest pressure is the detection position pressure detected by the pressure sensor 150*d* proximate to the position pressed by the user. As a result, only the detection position pressure detected by the pressure sensor 150*d* exceeds the pressing determining threshold $P_h$, and the detection position pressure detected by at least one of the other pressure sensors (the pressure sensor 150*e* in this example) exceeds the non-pressing determining threshold.

When the user presses the operation switch 180*d* (the chart 702), the pressure is conveyed only to the pressure sensor 150*d* and only the detection position pressure detected by the pressure sensor 150*d* increases. When the operation switch 180*d* is not pressed, the half of the operation plate 110 at the near side is supported by three operation switches 180*d* to 180*f*. When the operation switch 180*d* is pressed, the half of the operation plate 110 at the near side is supported only by two operation switches 180*e* and 180*f*, so that the detection position pressures detected by the pressure sensors 150*e* and 150*f* also increase slightly but the difference is small. As a result, only the detection position pressure detected by the pressure sensor 150*d* exceeds the pressing determining threshold $P_h$, and the pressures at the detection position pressures detected by other pressure sensors are smaller than the non-pressing determining threshold.

Figure 27:
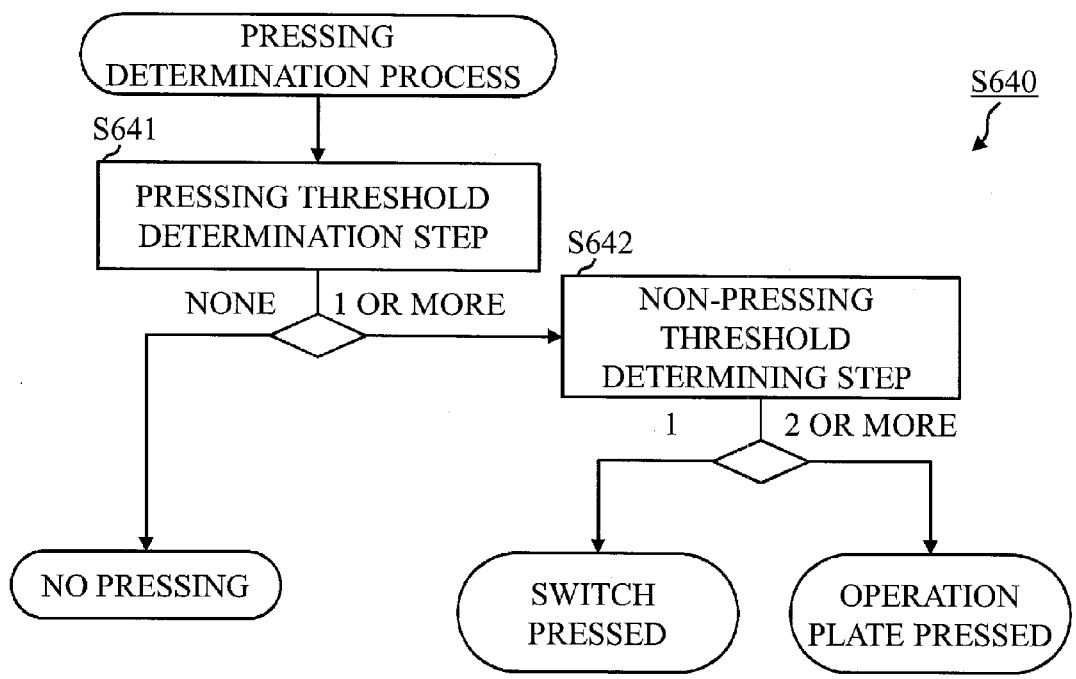
FIG. 27 is a flowchart diagram showing an example of the flow of a pressing determination process S640 in the sixth embodiment.

FIG. 27 is a flowchart diagram showing an example of the flow of a pressing determination process S640 in this embodiment.

In the pressing determination process S640, the pressed position determination device 200 determines whether or not the operation plate 110 or the operation switch 180 is pressed. The pressing determination process S640 includes a pressing threshold determination step S641 and a non-pressing threshold determination step S642.

In the pressing threshold determination step S641, the threshold determination unit 234, using the CPU 911 and based on the detection position pressures detected by a plurality of the pressure sensors 150, calculates the number of the pressure sensors 150 that have detected a detection position pressure exceeding the pressing determining threshold $P_h$.

If one or more pressure sensors 150 have detected a detection position pressure exceeding the pressing determining threshold $P_h$, processing proceeds to the non-pressing threshold determination step S642.

If no pressure sensors 150 have detected a detection position pressure exceeding the pressing determining threshold $P_h$, the position determination unit 235, using the CPU 911, determines that neither the operation plate 110 nor the operation switch 180 has been pressed, and terminates the pressing determination process S640.

In the non-pressing threshold determination step S642, the threshold determination unit 234, using the CPU 911 and based on the detection position pressures detected by the plurality of the pressure sensors 150, calculates the number of the pressure sensors 150 that have detected a detection position pressure exceeding the non-pressing determining threshold $P_1$.

If only one pressure sensor 150 has detected a detection position pressure exceeding the non-pressing determining threshold $P_1$, the position determination unit 235, using the CPU 911, determines that the operation switch 180 corresponding to the pressure sensor 150 that has detected a detection position pressure exceeding the non-pressing determining threshold $P_1$ has been pressed, and terminates the pressing determination process S640.

If two or more pressure sensors 150 have detected a detection position pressure exceeding the non-pressing determining threshold $P_1$, the pressed position determination device 200, using the CPU 911, determines that the operation plate 110 has been pressed, and terminates the pressing determination process S640. Then, the pressed position determination device 200 executes the pressed position determination process S610 to determine the position at which the operation plate 110 has been pressed.

In the above configuration, the pressure sensor 150 provided for detecting a pressure application position when a pressure is applied to the operation plate 110 also detects a pressure when the operation switch 180 is pressed. Thus, there is no need to separately provide a sensor (for example, a tact switch) for detecting the pressing of the operation switch 180. Thus, the component count of the touch panel 800 can be reduced. This makes it possible to reduce the size and the manufacturing cost of the touch panel 800.

The non-pressing determining threshold $P_1$ may be a predetermined value, or a value calculated by the threshold determination unit 234 based on the detected maximum pressure calculated by the maximum determination unit 231.

For example, a value larger than 0 is predetermined as a difference between the detected maximum pressure and the non-pressing determining threshold $P_1$ (hereafter called a "pressure difference threshold $\Delta P$"). The threshold determination unit 234, using the CPU 911, calculates the non-pressing determining threshold $P_1$ by subtracting the pressure difference threshold $\Delta P$ from the detected maximum pressure calculated by the maximum determination unit 231.

Alternatively, a value larger than 0 and smaller than 1 is predetermined as a ratio between the detected maximum pressure and the non-pressing determining threshold $P_1$ (hereafter called a "pressure ratio threshold $\alpha$"). The threshold determination unit 234, using the CPU 911, calculates the non-pressing determining threshold $P_1$ by multiplying the detected maximum pressure calculated by the maximum determination unit 231 by the pressure ratio threshold $\alpha$.

The threshold determination unit 234, by using the CPU 911, may calculate the difference or ratio between the detected maximum pressure and the detection position pressure and compare it with the pressure difference threshold $\Delta P$ or the pressure ratio threshold $\alpha$, instead of calculating the non-pressing determining threshold $P_1$ and comparing it with the detection position pressure.

The position input apparatus (the touch panel 800) in this embodiment further has the operation switches 180*a* to 180*lf*.

The operation switches 180*a* to 180*f* respectively correspond to the pressure detection devices (the pressure sensors 150*a* to 150*f*), and by pressing the operation switches 180*a* to 180*f*, a detection position pressure is applied to a corresponding pressure detection device. The pressed position determination device 200 determines whether or not the operation switches 180*a* to 180*f* are pressed, based on at least two detection position pressures detected by the at least two pressure detection devices.

According to the position input apparatus (the touch panel 800) in this embodiment, when the operation switches 180a to 180f are pressed, detection position pressures are applied to the pressure detection devices, and whether or not the operation switches 180a to 180f have been pressed is determined. Thus, there is no need to separately provide sensors for detecting the pressing of the operation switches 180a to 180f, and the component count, the manufacturing cost, and the size of the position input apparatus can be reduced.

In the position input apparatus (the touch panel 800) in this embodiment, when one of the pressure detection devices (the pressure sensors 150a to 150f) corresponding to the operation switches 180a to 180f detects a detection position pressure larger than a predetermined pressing determining threshold, the pressed position determination device 200 treats the detection position pressure detected by the pressure detection device corresponding to one of the operation switches 180a to 180f as a pressing candidate pressure, treats the detection position pressure detected by another pressure detection device as a non-pressing candidate pressure, and then determines pressing of the operation switch in at least one of three cases, the three cases being a case that the non-pressing candidate pressure is smaller than a predetermined non-pressing determining threshold, a case that a ratio of the non-pressing candidate pressure to the pressing candidate pressure is smaller than a predetermined pressure ratio threshold, and a case that a difference obtained by subtracting the non-pressing candidate pressure from the pressing candidate pressure is larger than a predetermined pressure difference threshold.

According to the position input apparatus (the touch panel 800) in this embodiment, the pressing of the operation switches 180a to 180f and the pressing of the operation plate 110 can be readily distinguished.

In the position input apparatus described above, the pressure detection positions are located outside the operation area on the operation plate 110, and the operation switches 180a to 180f are formed over the pressure detection devices (the pressure sensors 150a to 150f). The pressed position determination device 200 determines the pressed position and the pressing of the operation switches 180a to 180f based on at least two detection position pressures detected by at least two of the pressure detection devices.

The operation switches 180a to 180f are disposed over the pressure sensors 150a to 150f which detect a pressure when any position in the operation plate 110 is pressed. When the operation switches 180a to 180f are pressed, the pressure sensors 150a to 150f located directly under the operation switches 180a to 180f detect a pressing pressure. Since these pressure sensors 150a to 150f detect both the pressing of the operation switches 180a to 180f and the pressing of the operation plate 110, these two types of pressing need to be distinguished.

When a pressing pressure exceeding a certain level is applied to one of the buttons 811 on the operation screen display device 140, which are positioned corresponding to the positions of the pressure sensors 150a to 150f, the pressure is likely to be conveyed also to the pressure sensors 150a to 150f not located near the pressed position.

In contrast, when one of the operation switches 180a to 180f is pressed, the pressure is applied directly above the pressure sensors 150a to 150f. This can reduce the possibility of the pressure being conveyed to the pressure sensors 150a to 150f not corresponding to the pressed switch.

Accordingly, if a pressing pressure detected value is larger than a given value, the pressing of the operation plate 110 or the operation switches 180a to 180f can be detected. Further, if a pressing pressure exceeding a given value is detected also by any of the pressure sensors 150a to 150f other than the one at which the maximum pressure value is obtained, the pressing of the operation plate 110 is determined. If a pressing pressure exceeding the given value is not detected by any of the pressure sensors 150a to 150f other than the one at which the maximum pressure value is obtained, the pressing of the operation switch 180 is determined. The larger the maximum pressure value, the larger the detected pressure values of other pressure sensors 150a to 150f. Thus, after the pressing detecting threshold is exceeded, the pressing of the operation switches 180a to 180f and the pressing of the operation plate 110 are distinguished by comparing the ratio between the maximum pressure value and the next largest pressure value with a specified threshold. A certain level of distinction is also possible by comparing the difference between the maximum pressure value and the next largest pressure value with a specified threshold.

The above configuration allows both the pressing of the operation switches 180a to 180f and the pressing of the operation plate 110 to be detected by the pressure sensors 150a to 150f. Thus, tact switches normally used as operation switches are not required, so that cost savings can be achieved.

Seventh Embodiment

A seventh embodiment will be described with reference to FIGS. 28 to 32.

Like reference numerals will be used to denote like components as in the first to sixth embodiments, and explanation will be omitted.

Figure 28:
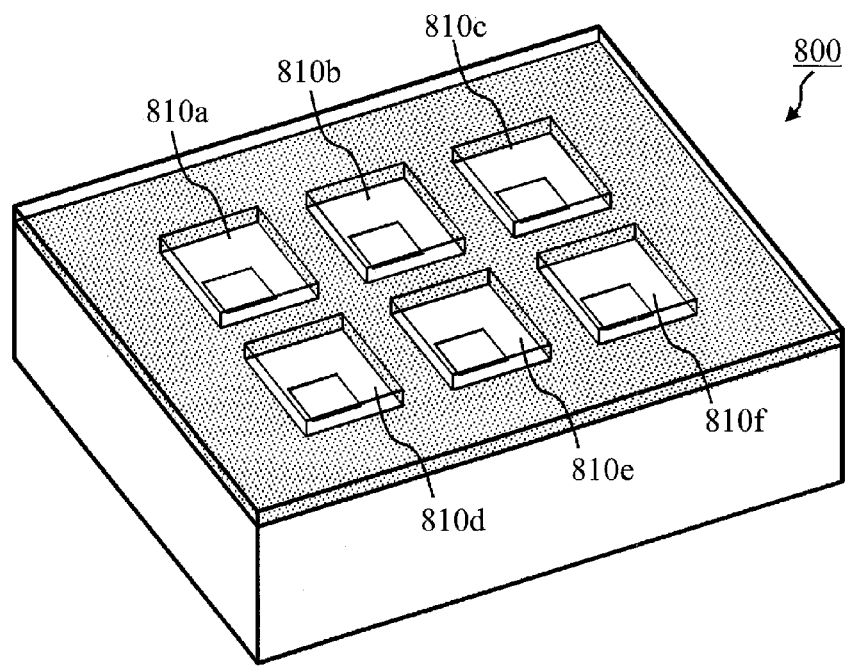
FIG. 28 is an overall axonometric view showing an example of the appearance of the touch panel 800 in a seventh embodiment.

FIG. 28 is an overall axonometric view showing an example of the appearance of the touch panel 800 in this embodiment.

The touch panel 800 has operation screens 810a to 810f (separated areas) divided into six. Each of the operation screens 810a to 810f displays one button 811. The operation screens 810a to 810f are arranged in a grid pattern in two horizontal rows of three screens each.

Figure 29:
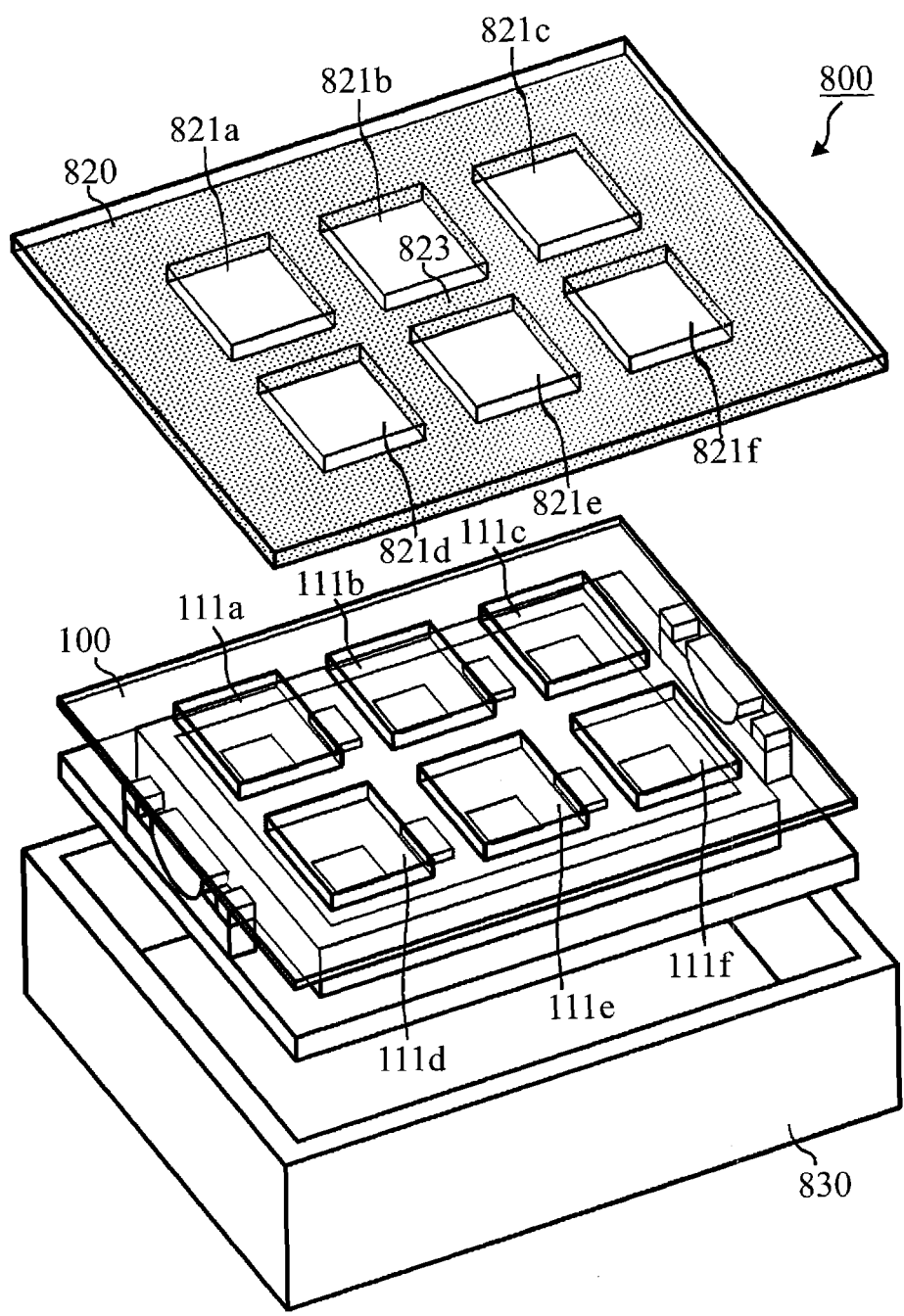
FIG. 29 is an exploded axonometric view showing an example of the structure of the touch panel 800 in the seventh embodiment.

FIG. 29 is an exploded axonometric view showing an example of the structure of the touch panel 800 in this embodiment.

The decorative plate 820 has a bridge portion 823. The bridge portion 823 divides the opening 821 into six openings 821a to 821f.

The center portion 111 of the main body 100 is divided into six center portions 111a to 111f corresponding to the openings 821a to 821f.

Figure 30:
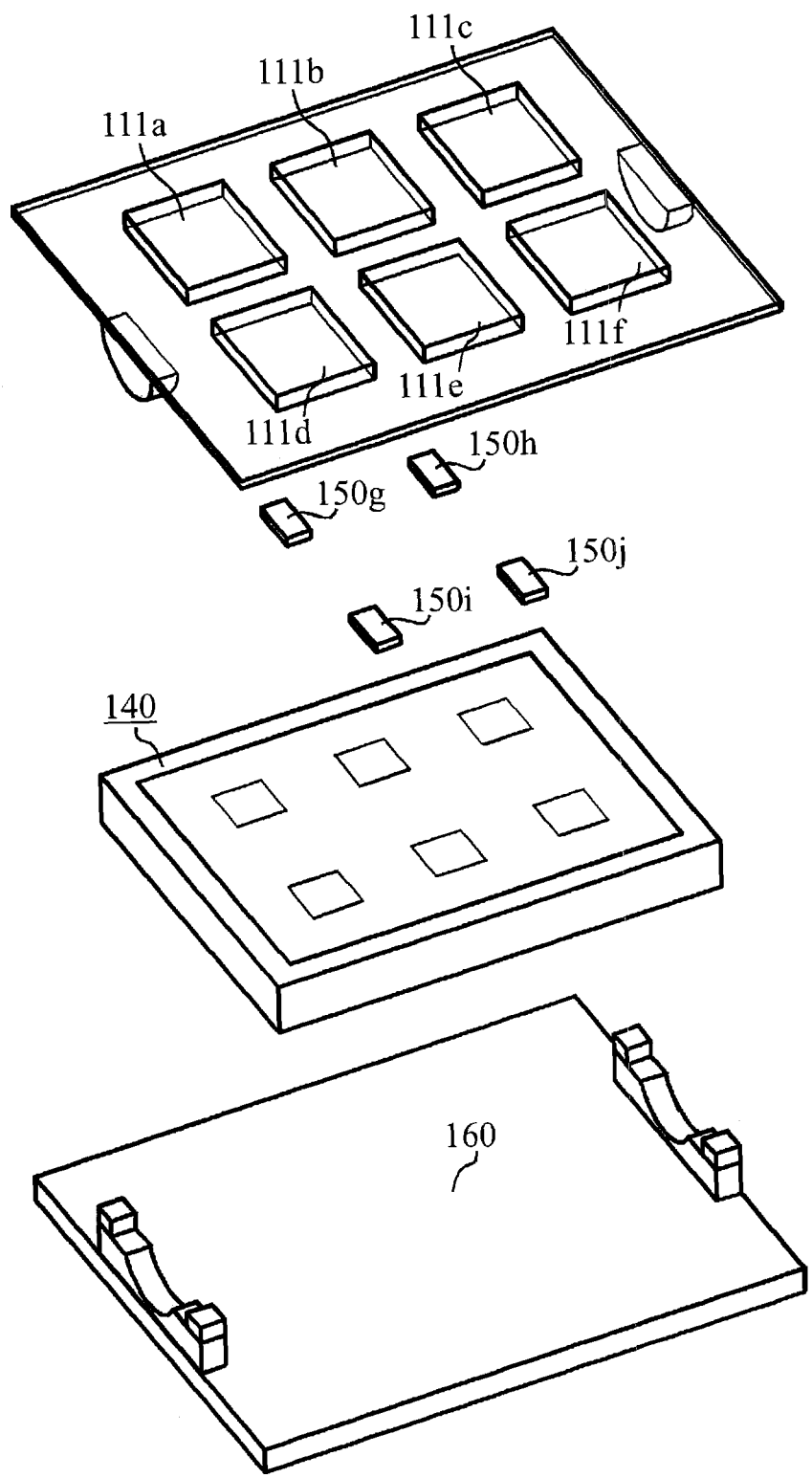
FIG. 30 is an exploded axonometric view showing an example of the structure of the main body 100 in the seventh embodiment.

FIG. 30 is an exploded axonometric view showing an example of the structure of the main body 100 in this embodiment.

The main body 100 has four pressure sensors 150g to 150j.

The pressure sensors 150g to 150j are located between the operation plate 110 and the operation screen display device 140. The pressure sensors 150g to 150j are disposed directly under the bridge portion 823 of the decorative plate 820 so as to be invisible from the exterior of the touch panel 800.

The pressure detection position of the pressure sensor 150g is located between two center portions 111a and 111b. The pressure detection position of the pressure sensor 150h is located between two center portions 111b and 111c. The pressure detection position of the pressure sensor 150i is located between two center portions 111d and 111e. The pressure detection position of the pressure sensor 150j is located between two center portions 111e and 111f.

In FIG. 30, the detection position support portion 120 is not shown, but the detection position support portion 120 may be provided and the pressure sensors 150g to 150j may be configured to detect detection position pressure through the detection position support portion 120 as in the first to sixth embodiments.

In this example, the display content of the button 811 can be changed by changing the display of the operation screen display device 140. However, if there is no need to change the display content of the button 811, the display content of the button 811 may be displayed in advance by printing or the like, and the operation screen display device 140 may be excluded.

Figure 31:
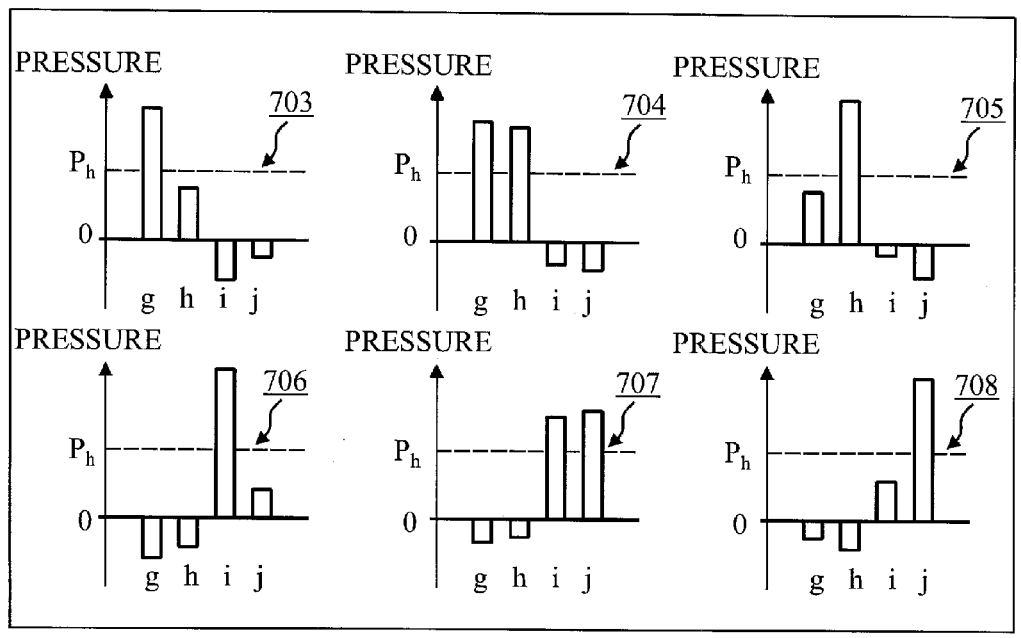
FIG. 31 shows graph charts depicting an example of detection position pressures detected by pressure sensors 150g to 150j in the seventh embodiment.

FIG. 31 shows graph charts depicting an example of detection position pressures detected by the pressure sensors 150g to 150j.

A chart 703 depicts a case in which the user presses the center portion 111a. A chart 704 depicts a case in which the user presses the center portion 111b. A chart 705 depicts a case in which the user presses the center portion 111c. A chart 706 depicts a case in which the user presses the center portion 111d. A chart 707 depicts a case in which the user presses the center portion 111e. A chart 708 depicts a case in which the user presses the center portion 111f.

When the user presses any one of the three center portions 111a to 111c located at a far side of the operation plate 110, the detection position pressures detected by the pressure sensors 150g and 150h become large. Conversely, the detection position pressures detected by the pressure sensors 150i and 150j become small.

When the user presses any one of the three center portions 111d to 111f at the near side of the operation plate 110, the detection position pressures detected by the pressure sensors 150i and 150j become large. Conversely, the detection position pressures detected by the pressure sensors 150g and 150h become small.

When the user presses any one of the two center portions 111a and 111d located at the left edge of the operation plate 110, the detection position pressure detected by the pressure sensor 150g or the pressure sensor 150i adjacent to the pressed position exceeds the pressing determining threshold $P_h$, but the detection position pressures detected by the pressure sensor 150h and the pressure sensor 150j far from the pressed position do not exceed the pressing determining threshold $P_h$.

Conversely, when the user presses any one of the two center portions 111c and 111f located at the right edge of the operation plate 110, the detection position pressure detected by the pressure sensor 150h or the pressure sensor 150j adjacent to the pressed position exceeds the pressing determining threshold $P_h$, but the detection position pressures detected by the pressure sensor 150g and the pressure sensor 150i do not exceed the pressing determining threshold $P_h$.

When the user presses the center portion 111b located at the center of the operation plate 110, the detection position pressures of the two pressure sensors 150g and 150h surrounding the pressed position both exceed the pressing determining threshold $P_h$. Likewise, when the user presses the center portion 111e located at the center of the operation plate 110, the detection position pressures detected by the two pressure sensors 150i and 150j surrounding the pressed position both exceed the pressing determining threshold $P_h$.

In this way, the detection position pressures detected by the pressure sensors 150g to 150j exceed the pressing determining threshold $P_h$ when the user presses a position adjacent to each pressure detection position.

Figure 32:
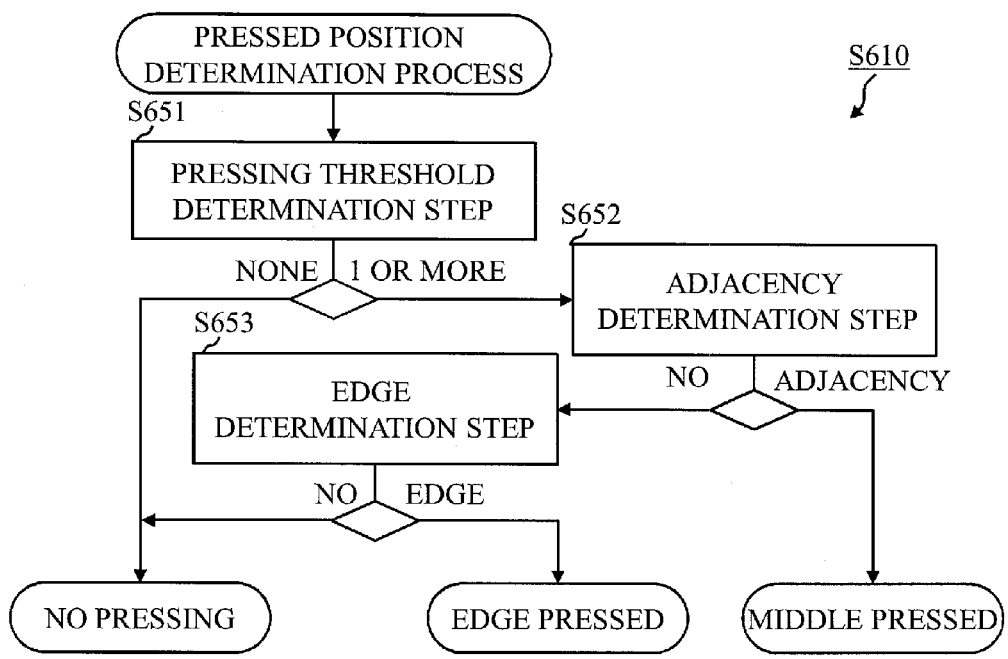
FIG. 32 is a flowchart diagram showing an example of the flow of the pressed position determination process S610 in the seventh embodiment.

FIG. 32 is a flowchart diagram showing an example of the flow of the pressed position determination process S610 in this embodiment.

The pressed position determination process S610 includes a pressing threshold determination step S651, an adjacency determination step S652, and an edge determination step S653.

In the pressing threshold determination step S651, the threshold determination unit 234, using the CPU 911 and based on the detection position pressures detected by the pressure sensors 150g to 150j, determines pressure sensors that have detected a detection position pressure exceeding the pressing determining threshold $P_h$.

If no pressure sensor has detected a detection position pressure exceeding the pressing determining threshold $P_h$, the pressed position determination device 200, using the CPU 911, determines that the operation plate 110 has not been pressed and terminates the pressed position determination process S610.

If any of the pressure sensors has detected a detection position pressure exceeding the pressing determining threshold $P_h$, processing proceeds to the adjacency determination step S652.

In the adjacency determination step S652, the position determination unit 235, using the CPU 911, determines whether or not the pressure sensors determined by the threshold determination unit 234 in the pressing threshold determination step S651 include any pressure sensors having adjacent pressure detection positions. The pressure sensors having adjacent pressure detection positions mean that there is one center portion between pressure detection positions of those pressure sensors. For example, the pressure sensor 150g and the pressure sensor 150h have adjacent pressure detection positions, but the pressure sensor 150g and the pressure sensor 150i do not have adjacent pressure detection positions.

If there are pressure sensors having adjacent pressure detection positions, the position determination unit 235, using the CPU 911, determines that the center portion between the adjacent pressure detection positions has been pressed, and terminates the pressed position determination process S610.

If there are no pressure sensors having adjacent pressure detection positions (including if only one pressure sensor has been determined by the threshold determination unit 234 in the pressing threshold determination step S651), processing proceeds to the edge determination step S653.

In the edge determination step S653, the position determination unit 235, using the CPU 911, determines whether or not the pressure sensors determined by the threshold determination unit 234 in the pressing threshold determination step S651 include any pressure sensor having the pressure detection position at the edge. The pressure sensor having the pressure detection position at the edge means that a center portion adjacent to a pressure detection position of this pressure sensor is not between the pressure detection positions of this pressure sensor and another pressure sensor. For example, the pressure detection position of the pressure sensor 150g is adjacent to two center portions 111a and 111b. The center portion 111b is between the pressure detection position of the pressure sensor 150g and the pressure detection position of the pressure sensor 150h, whereas the center portion 111a is not between pressure detection positions of the pressure sensor 150g and any other pressure sensors. Thus, the pressure sensor 150g has the pressure detection position at the edge. In this example, the center portions 111a to 111f are arranged in horizontal rows of three, so that each of the pressure sensors 150g to 150j has the pressure detection position at the edge. For this reason, the edge determination step S653 may be eliminated. On the other hand, when the center portions are arranged in horizontal rows of four or more, some pressure sensors do not have the pressure detection position at the edge.

If the pressure sensors determined by the threshold determination unit 234 in the pressing threshold determination step S651 include any pressure sensor having the pressure detection position at the edge, the position determination unit 235, using the CPU 911, determines that the center portion adjacent to that pressure detection position has been pressed, and terminates the pressed position determination process S610.

If the pressure sensors determined by the threshold determination unit 234 in the pressing threshold determination step S651 do not include any pressure sensor having the pressure detection position at the edge, the position determination unit 235, using the CPU 911, determines that the operation plate 110 has not been pressed, and terminates the pressed position determination process S610.

In this way, by dividing the operation area into a plurality of areas and disposing the pressure sensors 150g to 150j such that the pressure detection position of each pressure sensor is located at a position between the separated areas separated in a grid pattern, the number of pressure sensors per row can be reduced by one, compared to when the pressure sensors are disposed such that the pressure detection position of each pressure sensor is located at a position corresponding to each separated area. As a result, the component count, the manufacturing cost, and the size of the touch panel 800 can be reduced.

The position input apparatus (the touch panel 800) in this embodiment determines a pressed position where a pressure is applied, when the pressure is applied to any position within the operation area.

The position input apparatus has the operation plate 110, at least two pressure detection devices (the pressure sensors 150g to 150j), and the pressed position determination device 200.

The operation plate 110 is of a flat plate shape and has the operation area on one surface.

Each of the pressure detection devices detects, at a pressure detection position different from a pressure detection position of other pressure detection device, a detection position pressure generated by the pressure applied to the pressed position.

The operation area has a plurality of separated areas (the center portions 111a to 111f) separated from one another.

The pressure detection position is located between the plurality of separated areas on the operation plate 110.

The pressed position determination device 200 determines which one of the plurality of separated areas includes the pressed position, based on at least two detection position pressures detected by the at least two pressure detection devices.

According to the position input apparatus (the touch panel 800) in this embodiment, fewer pressure detection devices need to be provided compared to when the pressure detection devices have pressure detection positions at positions corresponding to the plurality of separate areas. Thus, the component count, the manufacturing cost, and the size of the position input apparatus can be reduced.

The position input apparatus described above determines a pressed position where a pressure is applied, when the pressure is applied to a plurality of predetermined positions within the operation area.

The position input apparatus has the operation plate 110, at least two pressure detection devices (the pressure sensors 150g to 150j), and the pressed position determination device 200.

The operation plate 110 is of a flat plate shape and has the operation area on one surface.

Each of the pressure detection devices detects, at a pressure detection position different from a pressure detection position of other pressure detection device, a detection position pressure generated by the pressure applied to the pressed position.

The pressure detection devices are disposed at boundary positions between the plurality of predetermined positions in the operation area.

The pressed position determination device 200 determines the pressed position, based on at least two detection position pressures detected by the at least two pressure detection devices.

For example, let us assume that eight pressing positions are arranged in a horizontal row in the operation plate 110. The pressing positions may be printed on the operation plate 110. Alternatively, only portions corresponding to the pressing positions may be transparent in the operation plate, and the pressing positions may be displayed from the backside of the operation plate with a display device (the operation screen display device 140) of the size of the operation plate 110.

Each pressure sensor 150 is disposed at each boundary portion between the pressing positions.

When the left-most button is pressed, the pressure is applied to the pressure sensor 150 existing between the left-most button and its adjacent button on the right, so that the pressed position can be identified from the pressure value of each pressure sensor 150.

When a button located at an intermediate position in the row is pressed, a pressure is applied to the pressure sensors 150 on both sides of the button with no other pressure being generated, so that the pressed position can be readily detected.

In this way, by locating the pressure sensors 150 at boundary positions between the buttons, the position of the pressed button can be accurately determined as well as the number of the pressure sensors 150 can be reduced by one, compared to when the pressure sensors 150 are located directly under the pressing positions. Thus, cost savings and enhanced accuracy can be achieved. Further, even when the pressure sensors 150 are not transparent, they are located at boundary positions, so that a design with enhanced appearance can be realized by printing the backside of the operation plate 110 so as to hide only the boundary positions and placing the display device at the backside.

Eighth Embodiment

An eighth embodiment will be described with reference to FIG. 33.

Like reference numerals will be used to denote like components as in the first to seventh embodiments, and explanation will be omitted.

Figure 33:
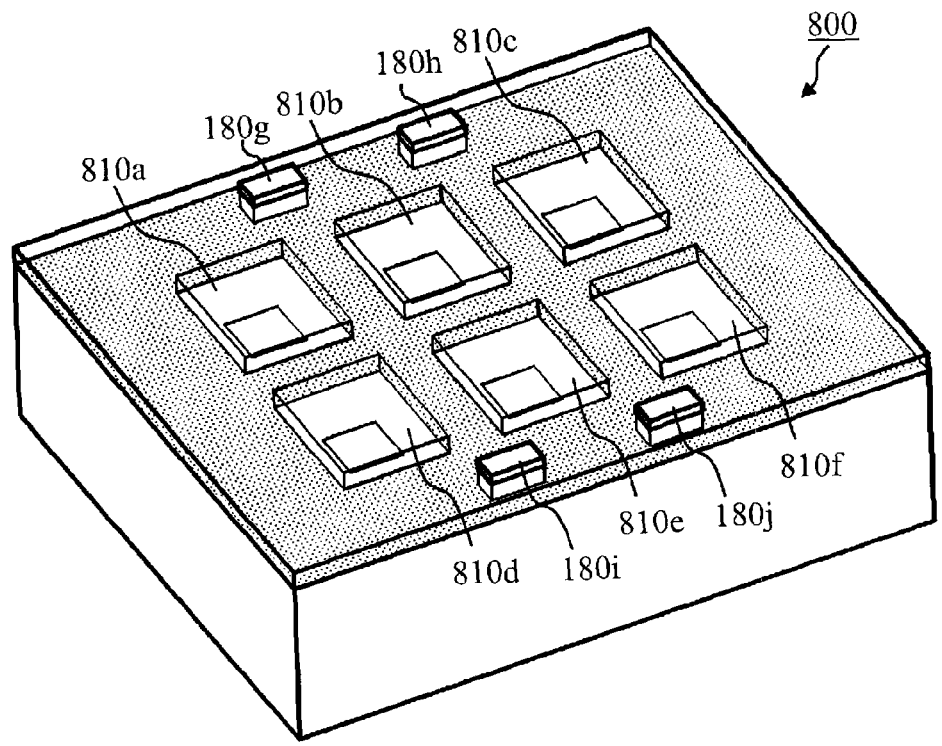
FIG. 33 is an overall axonometric view showing an example of the appearance of the touch panel 800 in an eighth embodiment.

FIG. 33 is an overall axonometric view showing an example of the appearance of the touch panel 800 in this embodiment.

As in the seventh embodiment, the touch panel 800 has the operation screens 810a to 810f (separated areas) divided into six. The touch panel 800 also has four operation switches 180g to 180j.

The operation switches 180g to 180j are located outside the whole of the operation screens 810a to 810f and at positions extended from the bridge portion 823 dividing the operation screens 810a to 810f.

The structure of the operation switches 180g to 180j is the same as that described in the sixth embodiment. The pressure sensors 150g to 150j not shown in FIG. 33 are located at positions directly under the operation switches 180g to 180j. When the operation plate 110 or one of the operation switches 180g to 180j corresponding to the pressure sensors 150g to 150j is pressed, a detection position pressure is detected.

In this way, when the pressure detection positions of the pressure sensors 150g to 150j are located not between the separated areas but at positions extended from the boundary lines separating the separated areas, the pressed position can be determined as in the seventh embodiment.

The configuration of this embodiment may be combined with the configuration of the sixth embodiment such that the operation switches 180g to 180j corresponding to the pressure sensors 150f to 150j may be provided.

The position input apparatus (the touch panel 800) described above has the pressure sensors 150 located at positions extended from the boundary positions. By this arrangement, the operation portion can be designed without any concern for the boundary portions, so that design flexibility can be enhanced.

The buttons 811 may be arranged in one horizontal row or in two horizontal rows. By placing the pressure sensors 150 such that their positions are shifted from the positions of the buttons 811 in upward or downward directions, a design can be considered without any concern for the boundary portions even when the display device is placed on the backside.

Ninth Embodiment

A ninth embodiment will be described with reference to FIGS. 34 to 42.

Like reference numerals will be used to denote like components as in the first to eighth embodiments, and explanation will be omitted.

Figure 34:
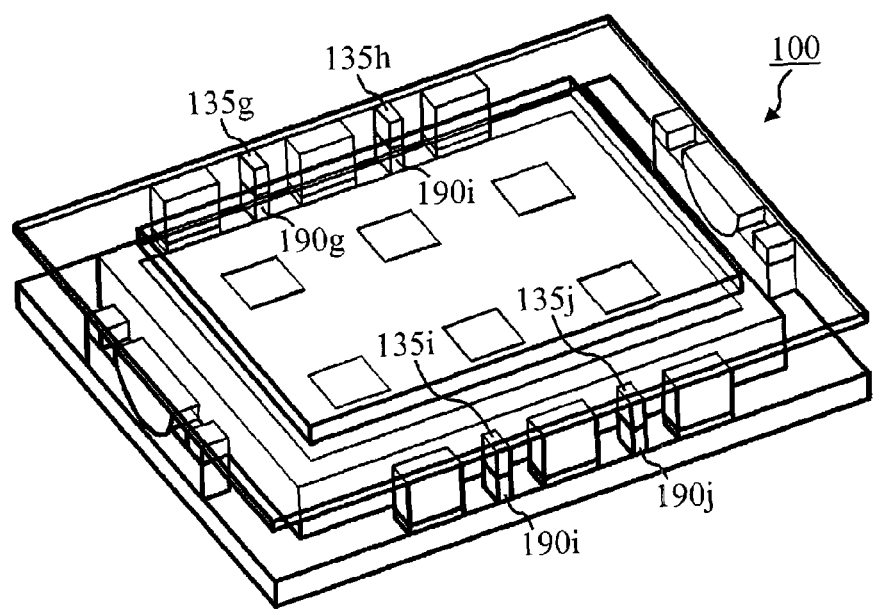
FIG. 34 is an axonometric view showing an example of the structure of the main body 100 in a ninth embodiment.

FIG. 34 is an axonometric view showing an example of the structure of the main body 100 in this embodiment.

The main body 100 has four operation plate support portions 135g to 135j and four support adjustment portions 190g to 190j.

The operation plate support portions 135g to 135j are positioned between pressure detection positions of the adjacent pressure sensors 150, and support the operation plate 110.

The support adjustment portions 190g to 190j respectively correspond to the operation plate support portions 135g to 135j, and adjust the height and so on of the corresponding operation plate support portions 135g to 135j.

The operation plate support portions 135g to 135j support the operation plate 110 at intermediate points between the pressure detection positions of the pressure sensors 150, so that a pressure applied to the operation plate 110 can be prevented from being directly conveyed to the pressure sensors far from the pressed position. Thus, the determination of the pressed position is facilitated.

Figure 35:
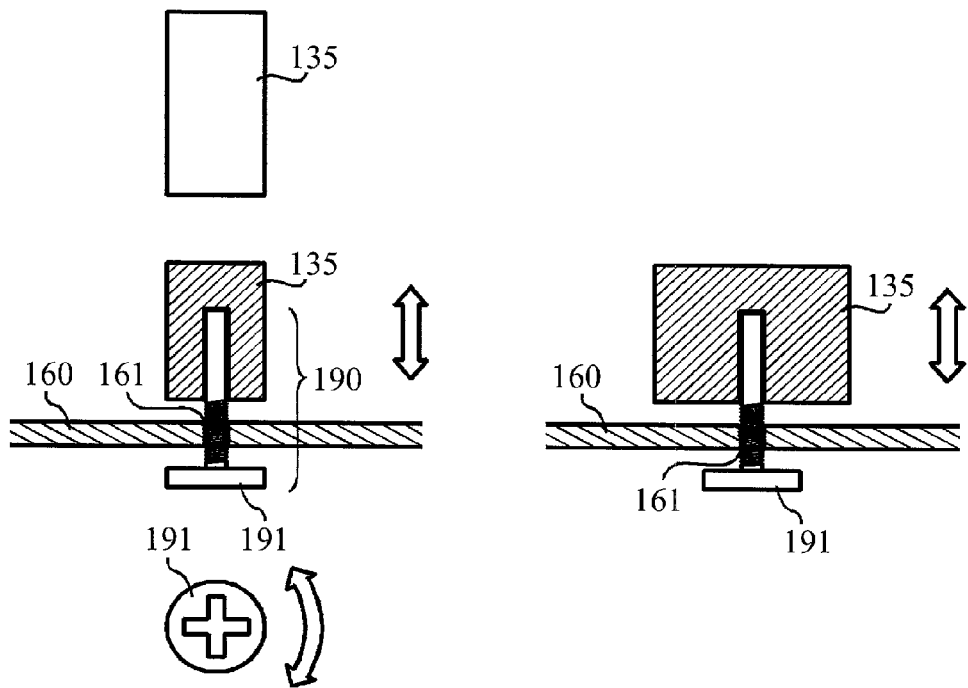
FIG. 35 is enlarged orthographic views showing an example of the structure of a support adjustment portion 190 in the ninth embodiment.

FIG. 35 is enlarged orthographic views showing an example of the structure of the support adjustment portion 190 in this embodiment.

The support adjustment portion 190 has, for example, an adjustment screw 191. The adjustment screw 191 threadingly engages with a screw hole 161 provided in the bottom plate 160. By rotating the adjustment screw 191, the height of the operation plate support portion 135 can be adjusted.

When the operation plate support portion 135 is at a high position, a small pressure applied to the operation plate 110 is not conveyed to the pressure sensor 150, and no detection position pressure is detected. Conversely, when the operation plate support portion 135 is at a low position, even a small pressure applied to the operation plate 110 is conveyed to the pressure sensor 150, and a detection position pressure is detected.

Accordingly, by adjusting the height of the operation plate support portion 135, the detection position pressure detected by the pressure sensor 150 can be adjusted.

The position input apparatus (the touch panel 800) described above determines a pressed position where a pressure is applied, when the pressure is applied to any position within the operation area.

The position input apparatus has the operation plate 110, at least two pressure detection devices (the pressure sensors 150), and the pressed position determination device 200.

The operation plate 110 is of a flat plate shape and has the operation area on one surface.

Each of the pressure detection devices detects, at a pressure detection position different from a pressure detection position of other pressure detection device, a detection position pressure generated by the pressure applied to the pressed position.

A support portion (the operation plate support portion 135 and the support adjustment portion 190) having a mechanism for controlling a height is provided between two adjacent pressure detection devices. By changing the height of the support portion, a pressing pressure given to the pressure detection devices is adjusted.

The pressed position determination device 200 determines the pressed position, based on at least two detection position pressures detected by the at least two pressure detection devices.

For example, let us assume that three pressure sensors 150 are attached to the operation plate 110, and support portions (the operation plate support portions 135 and the support adjustment portions 190) are attached between the pressure sensors 150. Points to be operated (pressed) exist at positions between the support portions. The support portion is positioned between two adjacent pressure sensors 150, and the height of the support portion can be changed from the backside with a height adjustment screw (the adjustment screw 191). When this height is raised, no pressure is conveyed to the pressure sensors until the pressure exceeds a certain value. By adjusting the initial pressure in this way, an operational feeling can be changed, and variations in sensitivity of the pressure sensors 150 can be corrected.

Further, even when a product larger than the interval between the two support portions is placed on the operation plate (for example, a pot is envisaged when this embodiment is applied to an induction heating cooking heater or the like), the pressure sensors 150 detect no pressure, so that an incorrect operation can be prevented.

Figure 36:
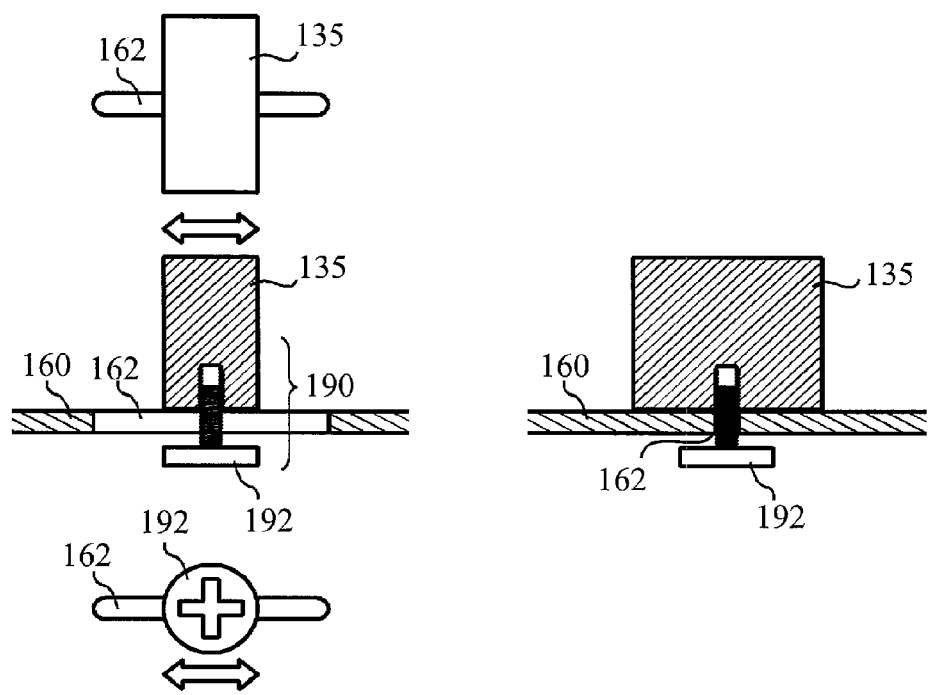
FIG. 36 is enlarged orthographic views showing another example of the structure of the support adjustment portion 190 in the ninth embodiment.

FIG. 36 is enlarged orthographic views showing another example of the structure of the support adjustment portion 190 in this embodiment.

The support adjustment portion 190 has, for example, a fixation screw 192. The fixation screw 192 is inserted through a guide hole 162 provided in the bottom plate 160, and threadingly engages with the operation plate support portion 135. By tightening the fixation screw 192 so as to hold the bottom plate 160 between the fixation screw 192 and the operation plate support portion 135, the operation plate support portion 135 can be rigidly fixed. By loosening the fixation screw 192, the operation plate support portion 135 can be moved in a direction of the guide hole 162.

When the position of the operation plate support portion 135 is close to the pressure detection position, the detection position pressure detected by the pressure sensor 150 becomes small. Conversely, when the position of the operation plate support portion 135 is far from the pressure detection position, the detection position pressure detected by the pressure sensor 150 becomes large.

By changing the position of the operation plate support portion 135, the range of the pressing position at which each pressure sensor 150 detects the detection position pressure can be changed.

The position input apparatus (the touch panel 800) described above determines a pressed position where a pressure is applied, when the pressure is applied to any position within the operation area.

The position input apparatus has the operation plate 110, at least two pressure detection devices (the pressure sensors 150), and the pressed position determination device 200.

The operation plate 110 is of a flat plate shape and has the operation area on one surface.

Each of the pressure detection devices detects, at a pressure detection position different from a pressure detection position of other pressure detection device, a detection position pressure generated by the pressure applied to the pressed position.

A support portion (the operation plate support portion 135 and the support adjustment portion 190) having a mechanism for enabling planar movement is provided between two adjacent pressure detection devices. By changing the position of the support portion, a pressing pressure given to the pressure detection devices is adjusted.

The pressed position determination device 200 determines the pressed position, based on at least two detection position pressures detected by the at least two pressure detection devices.

For example, let us assume that three pressure sensors 150 are attached to the operation plate 110, and the support portions (the operation plate support portions 135 and the support adjustment portions 190) are attached between the pressure sensors 150. Points to be operated (pressed) exist at points between support portions. The support portion is positioned between two adjacent pressure sensors 150, and the position of the support portion can be moved sideways by loosening a position adjustment screw (the fixation screw 192). The sideway movement of the support portion makes the pressure sensor 150 located near the support portion receive a smaller pressure relative to the pressure applied to the operation plate 110, and makes the pressure sensor 150 located far from the support portion receive a larger pressure compared to the pressure sensor 150 located near the support portion. In this way, variations in the structure and variations in sensitivity among the pressure sensors 150 can be corrected.

Figure 37:
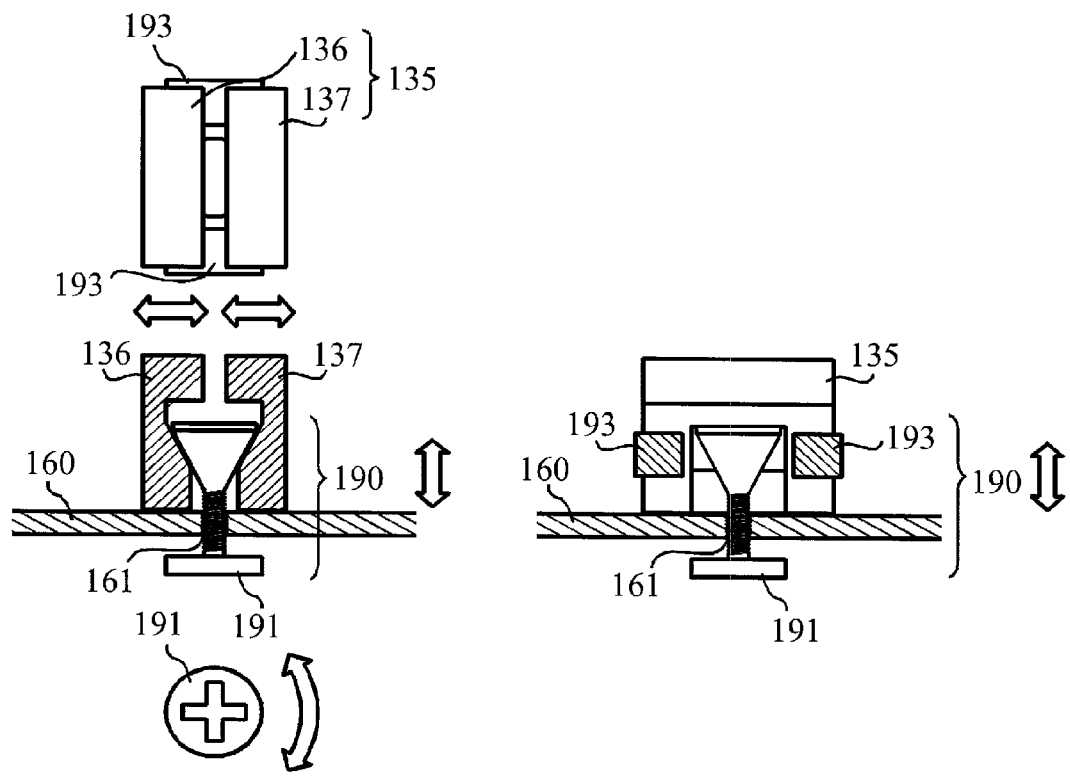
FIG. 37 is enlarged orthographic views showing yet another example of the structure of the support adjustment portion 190 in the ninth embodiment.

FIG. 37 is enlarged orthographic views showing yet another example of the structure of the support adjustment portion 190 in this embodiment.

The operation plate support portion 135 is divided into two portions, namely, a left support portion 136 and a right support portion 137. The left support portion 136 and the right support portion 137 each include a taper on the inner side.

The support adjustment portion 190 has the adjustment screw 191 and two elastic bodies 193. The adjustment screw 191 threadingly engages with the screw hole 161 provided in the bottom plate 160. The elastic bodies 193 are rubber, plastic, springs or the like, for example, and connect the left support portion 136 and the right support portion 137 and exert a force to bring them together. The adjustment screw 191 has an approximately conically-shaped tip which contacts the tapers formed on the inner sides of the left support portion 136 and the right support portion 137.

When the position of the adjustment screw 191 is lowered by rotating the adjustment screw 191, the interval between the left support portion 136 and the right support portion 137 is widened, so that the overall width of the operation plate support portion 135 is widened. Conversely, when the position of the adjustment screw 191 is raised by rotating the adjustment screw 191, the elastic bodies 193 act to bring the left support portion 136 and the right support portion 137 together, so that the overall width of the operation plate support portion 135 is narrowed.

The position input apparatus (the touch panel 800) described above determines a pressed position where a pressure is applied, when the pressure is applied to any position within the operation area.

The position input apparatus has the operation plate 110, at least two pressure detection devices (the pressure sensors 150), and the pressed position determination device 200.

The operation plate 110 is of a flat plate shape and has the operation area on one surface.

Each of the pressure detection devices detects, at a pressure detection position different from a pressure detection position of other pressure detection device, a detection position pressure generated by the pressure applied to the pressed position.

A support portion (the operation plate support portion 135 and the support adjustment portion 190) having a mechanism for making a support width changeable is provided between two adjacent pressure detection devices. By changing the support width of the support portion, a pressing pressure given to the pressure detection devices is adjusted.

The pressed position determination device 200 determines the pressed position, based on at least two detection position pressures detected by the at least two pressure detection devices.

For example, let us assume that three pressure sensors 150 are attached to the operation plate 110, and the support portions (the operation plate support portions 135 and the support adjustment portions 190) are attached between the pressure sensors 150. Points to be operated (pressed) exist at positions between support portions. The support portion is positioned between two adjacent pressure sensors 150, and the width of the support portion can be changed from the backside with a conically-shaped support-width adjustment screw (the adjustment screw 191). The support portion is held by integrally-formed composite springs (the elastic bodies 193). By screwing the conically-shaped support-width adjustment screw, the width of the support portion can be widened or narrowed. By enlarging the size of the support portion with the support-width adjustment screw, the area at which the pressure sensor 150 detects a pressure can be reduced. Since the operational area can be limited in this way, a balance between a rate of incorrect operations and user friendliness can be adjusted.

Figure 38:
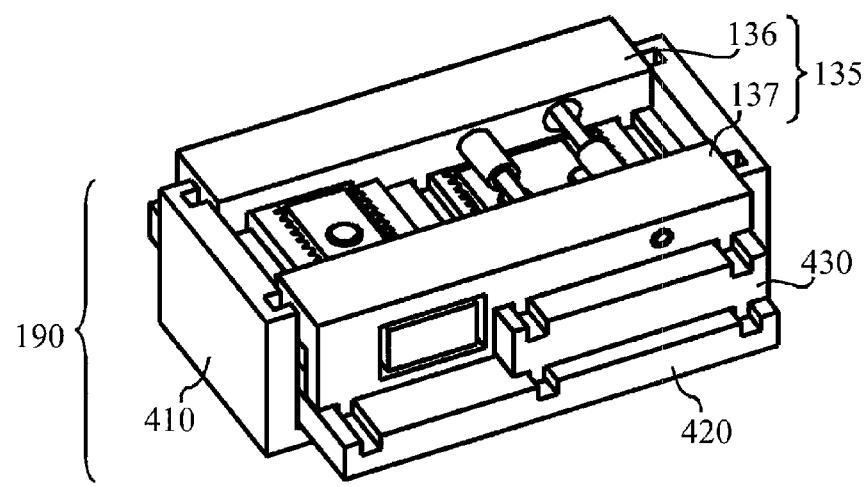
FIG. 38 is an axonometric view showing still yet another example of the structure of the support adjustment portion 190 in the ninth embodiment.

FIG. 38 is an axonometric view showing yet another example of the structure of the support adjustment portion 190 in this embodiment.

As in the example of FIG. 37, the operation plate support portion 135 is divided into the left support portion 136 and the right support portion 137.

The support adjustment portion 190 has a base portion 410, a first movable portion 420, and a second movable portion 430.

The base portion 410 is an immovable portion of the support adjustment portion 190 and rigidly or semi-rigidly fixed to the bottom plate 160. The base portion 410 may be integrally formed with the bottom plate 160.

The first movable portion 420 is positioned on the base portion 410, and its position varies in a vertical direction relative to the base portion 410.

The second movable portion 430 is positioned on the first movable portion 420, and its position varies in a vertical direction along with the first movable portion 420. Also, the position of second movable portion 430 varies in a horizontal direction relative to the first movable portion 420.

The left support portion 136 and the right support portion 137 are positioned on the second movable portion 430, and their positions vary in vertical and horizontal directions along with the second movable portion 430. Also, the distance between the left support portion 136 and the right support portion 137 varies.

Figure 39:
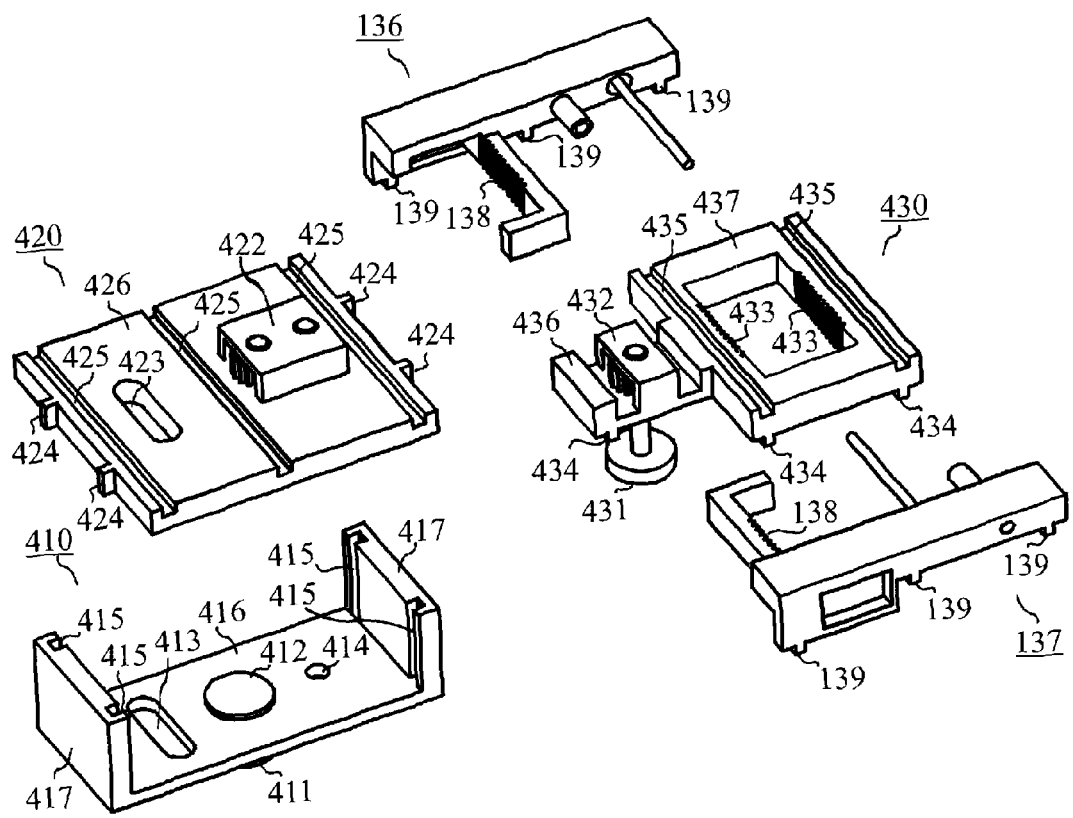
FIG. 39 is an exploded axonometric view showing the structure of the support adjustment portion 190 in the ninth embodiment.

FIG. 39 is an exploded axonometric view showing the structure of the support adjustment portion 190 in this example.

The base portion 410 has a height adjustment screw 411, a disk portion 412, a bottom portion 416, and two side portions 417.

The height adjustment screw 411 threadingly engages with a screw hole provided in the bottom portion 416. The disk portion 412 is fixed to the tip of the adjustment screw 411. By rotating the height adjustment screw 411, the height of the disk portion 412 can be changed.

Two openings 413 and 414 are provided in the bottom portion 416, being through holes for passing respectively a shank of a position adjustment screw 421 and a shank of a width adjustment screw 431 to be described later.

Four guide grooves 415 are grooves provided at an interior side of the side portions 417, and control a direction in which the first movable portion 420 can be moved.

The first movable portion 420 has the position adjustment screw 421 (see FIG. 40), a gear box 422, and a flat portion 426.

The flat portion 426 is mounted on the disk portion 412, and moves upward or downward in accordance with upward or downward movement of the disk portion 412.

The position adjustment screw 421 passes through the through hole provided in the flat portion 426, and connects with gears in the gear box 422. The gear box 422 has a pair of intermeshing gears having the same number of teeth. Rotation of the position adjustment screw 421 causes the pair of gears in the bear box 422 to rotate in mutually opposite directions.

An opening 423 is a through hole provided in the flat portion 426 for passing the width adjustment screw 431.

Four guide protrusions 424 are protrusions provided on side faces of the flat portion 426, respectively engaging with the guide grooves 415. The guide protrusions 424 move along the guide grooves 415, thereby controlling a direction in which the first movable portion 420 can be moved.

Three guide grooves 425 are grooves provided on an upper face of the flat portion 426, and controls directions in which the second movable portion 430, the left support portion 136, and the right support portion 137 can be moved.

The second movable portion 430 has the width adjustment screw 431, a gear box 432, an arm portion 436, and a frame portion 437.

The width adjustment screw 431 is inserted through the through hole provided in the arm portion 436, and connects with a gear in the gear box 432. The gear box 432 has one gear. Rotation of the width adjustment screw 431 causes the gear in the gear box 432 to rotate.

Two rack gears 433 are provided inside the frame portion 437, respectively engaging with the two gears in the gear box 422 and converting a rotational motion of the gears into a horizontal liner motion. When rotation of the position adjustment screw 421 causes the gears in the gear box 422 to rotate, the second movable portion 430 as a whole moves sideways.

Three guide protrusions 434 are protrusions provided on undersides of the arm portion 436 and the frame portion 437, respectively engaging with the guide grooves 425. The guide protrusions 434 move along the guide grooves 425, thereby controlling a direction in which the second movable portion 430 can be moved.

Two guide grooves 435 are grooves provided on an upper side of the frame portion 437, and controls directions in which the left support portion 136 and the right support portion 137 can be moved.

The left support portion 136 and the right support portion 137 each have a rack gear 138 and three guide protrusions 139.

The rack gear 138 engages with the gears in the gear box 432, and converts a rotational motion of the gears into a horizontal linear motion. When rotation of the width adjustment screw 431 causes the gears in the gear box 432 to rotate, the left support portion 136 and the right support portion 137 move in mutually opposite directions.

The three guide protrusions 139 engage with the guide grooves 425 and 435. The guide portions 139 move along the guide grooves 425 and 435, thereby controlling directions in which the left support portion 136 and the right support portion 137 can be moved.

Figure 40:
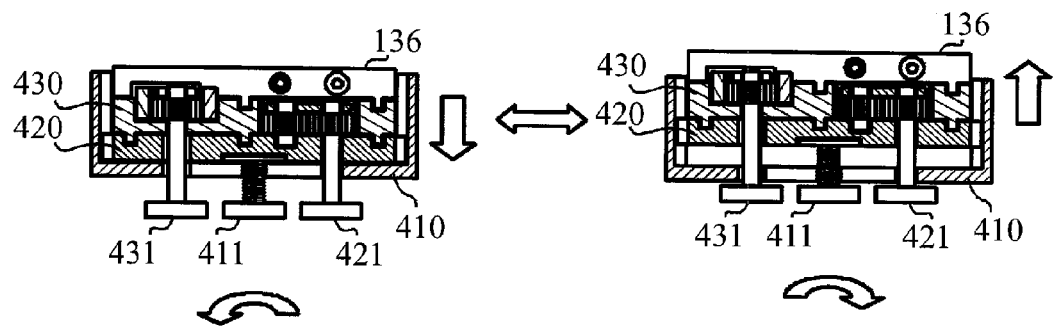
FIG. 40 is side sectional views showing a movement of the support adjustment portion 190 in the ninth embodiment.

FIG. 40 is side sectional views showing a movement of the support adjustment portion 190 in this embodiment.

Rotation of the height adjustment screw 411 causes the disk portion 412 to move upward or downward. This causes the first movable portion 420 mounted on the disk portion 412 as well as the second movable portion 430, the left support portion 136, and the right support portion 137 mounted on the first movable portion 420 to move upward or downward as a whole.

Figure 41:
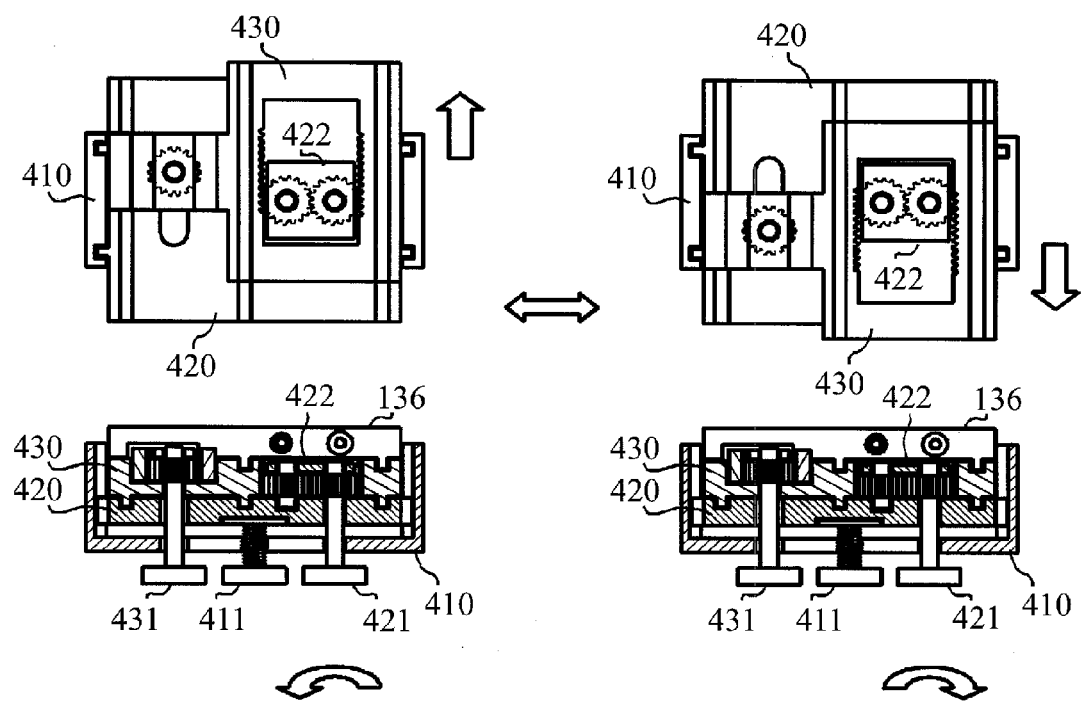
FIG. 41 is top views and side sectional views showing another movement of the support adjustment portion 190 in the ninth embodiment.

FIG. 41 is top views and side sectional views showing another movement of the support adjustment portion 190 in this example.

Rotation of the position adjustment screw 421 causes the gears in the gear box 422 to rotate. This is translated into a linear motion, causing the second movable portion 430 as well as the left support portion 136 and the right support portion 137 mounted on the second movable portion 430 to move sideways as a whole.

Figure 42:
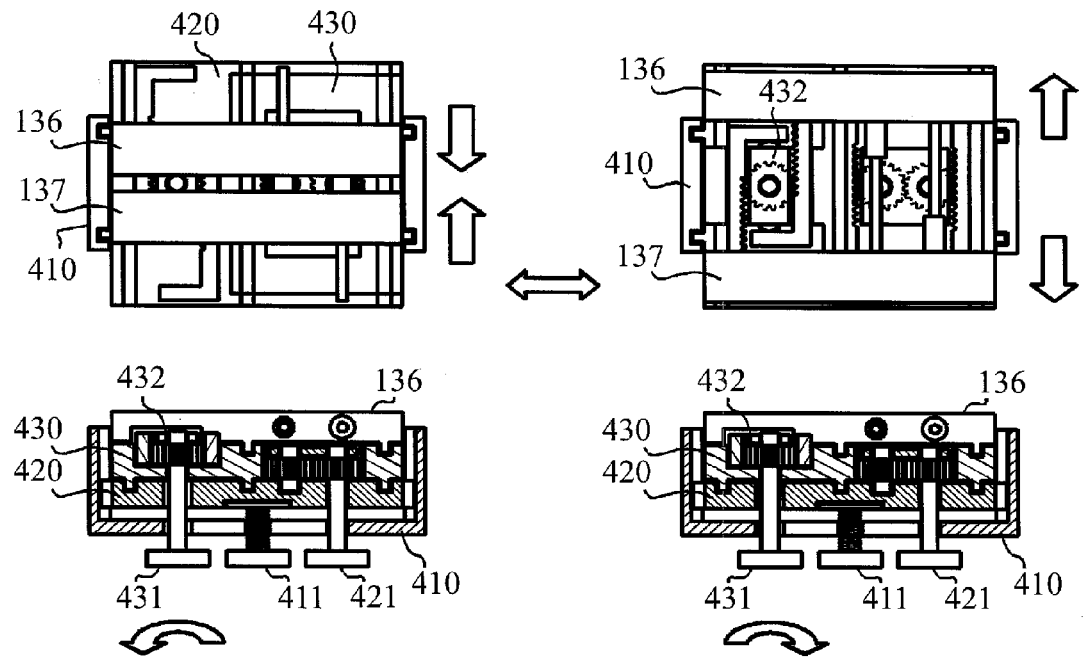
FIG. 42 is top views and side sectional views showing yet another movement of the support adjustment portion 190 in the ninth embodiment.

FIG. 42 is top views and side sectional views showing yet another movement of the support adjustment portion 190 in this example.

Rotation of the width adjustment screw 431 causes the gear in the gear box 432 to rotate. This is translated into a linear motion, causing the left support portion 136 and the right support portion 137 to move in mutually opposite directions. In this way, the interval between the left support portion 136 and the right support portion 137 is widened or narrowed.

By rotating each of the height adjustment screw 411, the position adjustment screw 421, and the width adjustment screw 431 as described above, the height, position, and width of the operation plate support portion 135 can be respectively adjusted.

The mechanism for adjusting any of the height, position, or width of the operation plate support portion 135 may be omitted. Alternatively, a mechanism may be added for adjusting the extent, longitudinal position and so on of the operation plate support portion 135.

The position input apparatus (the touch panel 800) in this embodiment further has an operation plate support adjustment portion (the support adjustment portion 190).

The operation plate support adjustment portion is capable of adjusting at least either one of a height, a position, a width, and an extent of the operation plate support portion 135 supporting the operation plate 110.

According to the position input apparatus (the touch panel 800) in this embodiment, by adjusting the height and so on of the operation plate support portion 135, the detection position pressure detected by the pressure detection device (the pressure sensor 150) can be readily adjusted.

The position input apparatus (the touch panel 800) described above can provide enhanced flexibility for modification by using a combination of the mechanisms for adjusting the height, position and width of the support portion (the operation plate support portion 135, the support adjustment portion 190).

The mechanisms of the support adjustment portion 190 described in this embodiment may also be provided in the operation plate support portion 131, the operation plate support receiving portion 132, the detection position support portion 120 and so on. These mechanism may also be provided in the support portion configured with the operation plate support portion 131, the operation plate support receiving portion 132, and the elastic body 133. By making the height adjustable, the sensitivity of pressure detection can be changed, and a pressure balance between the left and right sides of the operation plate 110 can also be adjusted. By making the support portions slidable, the sensitivity of the upper three pressure sensors and the sensitivity of the lower three pressure sensors can be adjusted. For example, the positions of the buttons to be pressed on the operation plate 110 can be adjusted for design purposes such that the buttons are positioned at the upper or lower side of the plate, and so on. By making the width of the support portions adjustable, the sensitivity of pressure detection can be adjusted, and a non-pressure detection area in the operation plate can be increased or reduced.

The position input apparatus (the touch panel 800) described above adjusts the balance of pressures to be given to the pressure detection device (the pressure sensor 150) or the sensitivity of the pressure detection device by adjusting the height of each operation plate support portion.

Tenth Embodiment

A tenth embodiment will be described with reference to FIGS. 43 to 45.

Like reference numerals will be used to denote like components as in the first to ninth embodiments, and explanation will be omitted.

Figure 43:
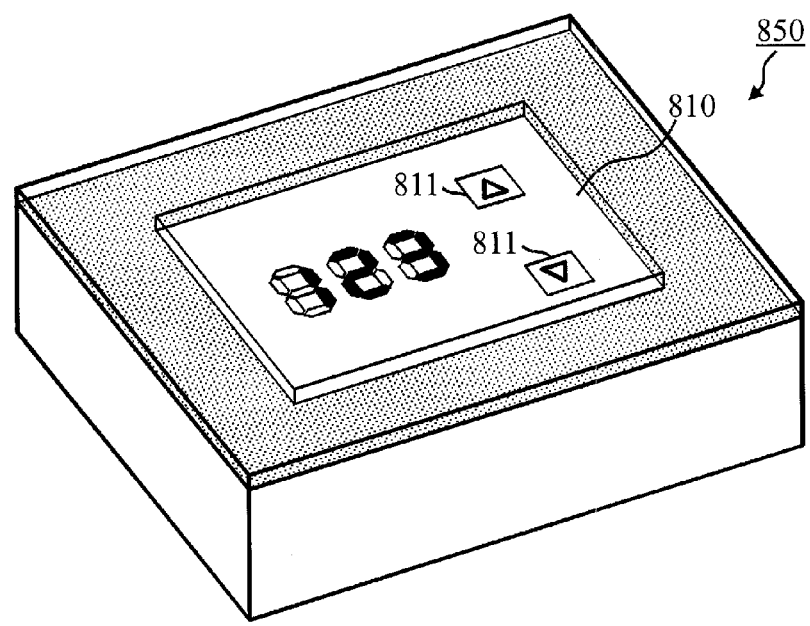
FIG. 43 is an axonometric view showing an example of the appearance of a numerical value input apparatus 850 in a tenth embodiment.

FIG. 43 is an axonometric view showing an example of the appearance of a numerical value input apparatus 850 in this embodiment.

The numerical value input apparatus 850 is adapted from the touch panel 800 described in the first to ninth embodiments. The numerical value input apparatus 850 displays an input numerical value on the operation screen 810. The numerical value may be displayed digitally as illustrated, or graphically using a bar chart or the like. The numerical value input by the numerical value input apparatus 850 may be a value used by an external apparatus, such as a temperature setting of an air conditioner, or may be a value used internally by the numerical value input apparatus 850 for sensitivity adjustment of the pressure sensor 150, and so on.

The numerical value input apparatus 850 displays on the operation screen 810 at least two buttons 811 in addition to the input numerical value. One of the buttons 811 is an increase button for increasing the numerical value, and the other button is a decrease button for decreasing the numerical value.

Figure 44:
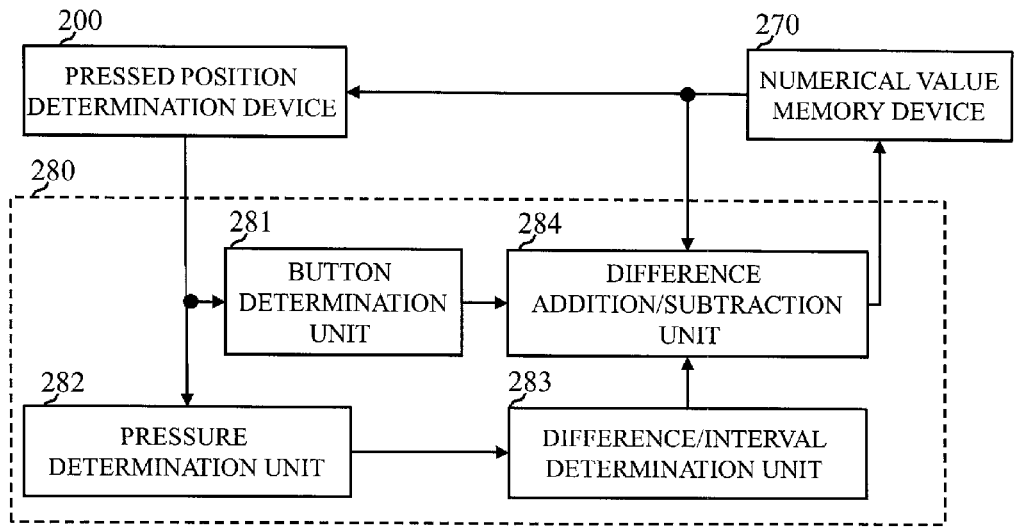
FIG. 44 is a block configuration diagram showing an example of the functional block configuration of the numerical value input apparatus 850 in the tenth embodiment.

FIG. 44 is a block configuration diagram showing an example of the functional block configuration of the numerical value input apparatus 850 in this embodiment.

The numerical value input apparatus 850 has a numerical value memory device 270 and a numerical value changing device 280 in addition to the pressed position determination device 200. The numerical value memory device 270 and the numerical value changing device 280 may be configured with the same hardware as the pressed position determination device 200, such as the CPU 911 and the RAM 914, or may be configured with different hardware from the hardware used for the pressed position determination device 200.

The numerical value memory device 270, using the RAM 914, stores a numerical value.

The pressed position determination device 200, using the CPU 911, generates an operation screen containing the numerical value stored by the numerical value memory device 270 and the increase and decrease buttons, and has the operation screen displayed by the operation screen display device 140. When the user presses the operation plate 110, the pressed position determination device 200, using the CPU 911, calculates the pressed position and the applied pressure.

The numerical value changing device 280 has a button determination unit 281, a pressure determination unit 282, a difference/interval determination unit 283, and a difference addition/subtraction unit 284.

The button determination unit 281, using the CPU 911 and based on the pressed position calculated by the pressed position determination device 200, determines whether the user has pressed the increase button or the decrease button.

The pressure determination unit 282, using the CPU 911 and based on the pressure calculated by the pressed position determination device 200, determines whether the pressure applied to the operation plate 110 by the user is larger or smaller than a predetermined threshold.

The difference/interval determination unit 283, using the CPU 911 and based on the result of the determination by the pressure determination unit 282, determines the difference and interval for changing the numerical value.

The difference addition/subtraction unit 284, using the CPU 911 and based on the difference and interval determined by the difference/interval determination unit 283, changes the numerical value stored by the numerical value memory device 270.

Figure 45:
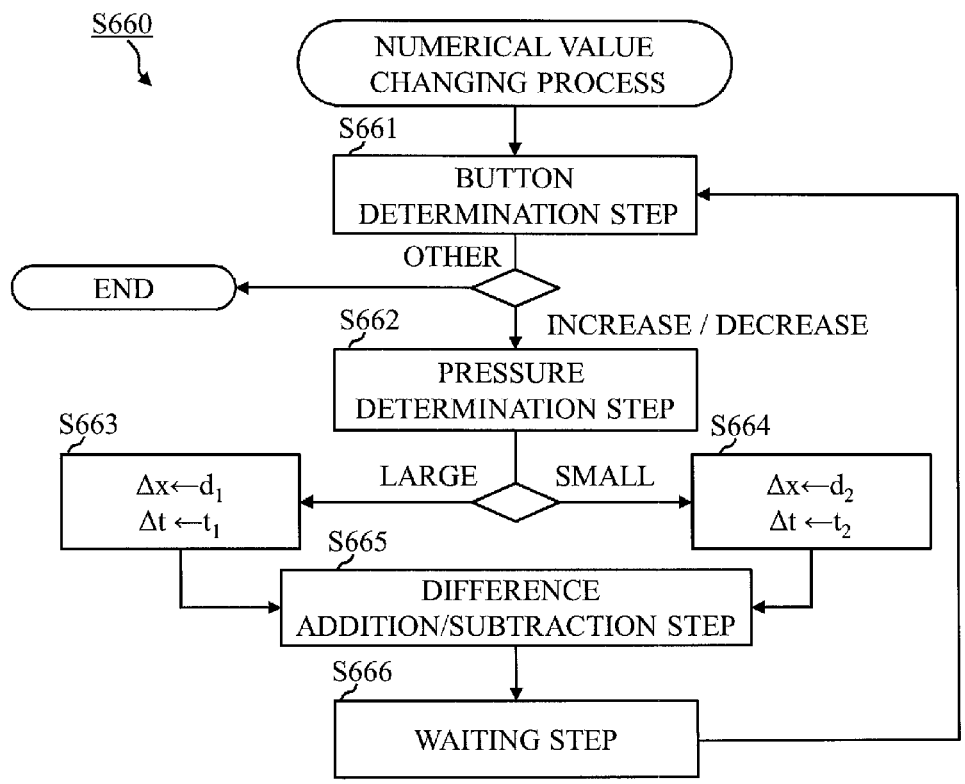
FIG. 45 is a flowchart diagram showing an example of the flow of a numerical value changing process S660 in the tenth embodiment.

FIG. 45 is a flowchart diagram showing an example of the flow of a numerical value changing process S660 in this embodiment.

In the numerical value changing process S660, the numerical value changing device 280, based on the result of the determination by the pressed position determination device 200, changes the numerical value stored by the numerical value memory device 270. The numerical value changing process S660 includes a button determination step S661, a pressure determination step S662, a first difference/interval determination step S663, a second difference/interval determination step S664, a difference addition/subtraction step S665, and a waiting step S666.

In the button determination step S661, the button determination unit 281, using the CPU 911 and based on the pressed position calculated by the pressed position determination device 200, determines the button 811 pressed by the user.

If the button 811 pressed by the user is the increase button or the decrease button, processing proceeds to the pressure determination step S662.

If the button 811 pressed by the user is any other button or the user has not pressed any button 811, the numerical value changing process S660 is terminated.

In the pressure determination step S662, the pressure determination unit 282, using the CPU 911 and based on the pressure calculated by the pressed position determination device 200, determines whether the pressure applied by the user on either of the increase button and the decrease button is larger or smaller than a predetermined threshold.

If the pressure is larger than the threshold, processing proceeds to the first difference/interval determination step S663.

If the pressure is smaller than the threshold, processing proceeds to the second difference/interval determination step S664.

In the first difference/interval determination step S663, the difference/interval determination unit 283, using the CPU 911, defines a predetermined value $d_1$ as a difference $\Delta x$ and a predetermined value $t_1$ as an interval $\Delta t$. Then, processing proceeds to the difference addition/subtraction step S665.

In the second difference/interval determination step S664, the difference/interval determination unit 283, using the CPU 911, defines a predetermined value $d_2$ as the difference $\Delta x$ and a predetermined value $t_2$ as the interval $\Delta t$. Then, processing proceeds to the difference addition/subtraction step S665.

Here, $d_1$ and $d_2$ are larger than 0, and $d_1$ is larger than or equal to $d_2$. $t_1$ and $t_2$ are larger than 0, and $t_1$ is smaller than or equal to $t_2$. However, when $d_1$ and $d_2$ are equal, $t_1$ is smaller than $t_2$.

In the difference addition/subtraction step S665, the difference addition/subtraction unit 284, using the CPU 911, obtains the numerical value stored by the numerical value memory device 270.

If the button 811 determined by the button determination unit 281 in the button determination step S661 is the increase button, the difference addition/subtraction unit 284, using the CPU 911, adds to the obtained numerical value the difference $\Delta x$ calculated by the difference/interval determination unit 283 in the first difference/interval determination step S663 or the second difference/interval determination step S664.

If the button 811 determined by the button determination unit 281 in the button determination step S661 is the decrease button, the difference addition/subtraction unit 284, using the CPU 911, subtracts from the obtained numerical value the difference $\Delta x$ calculated by the difference/interval determination unit 283 in the first difference/interval determination step S663 or the second difference/interval determination step S664.

The numerical value memory device 270, using the RAM 914, stores the numerical value obtained by adding or subtracting the difference $\Delta x$ by the difference addition/subtraction unit 284.

In the waiting step S666, the difference addition/subtraction unit 284, using the CPU 911, waits until expiration of the interval $\Delta t$ determined by the difference/interval determination unit 283 in the first difference/interval determination step S663 or the second difference/interval determination step S664.

Upon expiration of the interval $\Delta t$, processing returns to the button determination step S661.

If the pressure applied by the user on the increase button or the decrease button is larger than the threshold, the difference $\Delta x$ for changing the numerical value is large or the interval $\Delta t$ for changing the numerical value is short, so that the numerical value changes rapidly. Conversely, if the pressure applied by the user on the increase button or the decrease button is smaller than the threshold, the difference $\Delta x$ for changing the numerical value is small or the interval $\Delta t$ for changing the numerical value is long, so that the numerical value changes slowly.

This makes it possible to realize intuitive operation, compared to when the speed at which the numerical value changes varies based on the length of time the button is pressed, and so on. It is also possible to reduce the time required for the user to change the numerical value to a desired value.

In this example, the speed at which the numerical value changes can be changed in two steps by using one threshold. The configuration may be modified such that the speed at which the numerical value changes can be changed in a greater number of steps by using a greater number of thresholds, or such that the speed at which the numerical value changes is made to change gradually.

The position input apparatus (the numerical value input apparatus 850) in this embodiment further has the numerical value memory device 270 and the numerical value changing device 280.

The numerical value memory device 270 stores a numerical value.

When the pressed position determination device 200 determines that a pressure has been applied to a predetermined position within the operation area, the numerical value changing device 280 determines a difference $\Delta x$ and an interval $\Delta t$ for changing the numerical value stored by the numerical value memory device 270 based on the detection position pressure detected by the pressure detection device (the pressure sensor 150), and adds or subtracts at the determined interval $\Delta t$ the determined difference $\Delta x$ to or from the numerical value stored by the numerical value memory device 270.

According to the position input apparatus (the numerical value input apparatus 850) in this embodiment, the speed at which the numerical value changes is changed according to the pressure applied by the user. Thus, intuitive operation can be realized and the time required for operation can be reduced.

The position input apparatus (the numerical value input apparatus 850) described above changes the speed at which a setting value is displayed on the operation screen display device 140, according to the pressure detected by the pressure detection device (the pressure sensor 150), or changes the number of steps in which the setting value is displayed on the operation screen display device 140, according to the pressure detected by the pressure detection device.

For example, a temperature setting value is displayed on the operation screen display device 140. The numerical value input apparatus 850 changes this temperature setting value when the button 811 (the increase button, the decrease button) on the operation plate 110 is pressed. The numerical value input apparatus 850 changes the speed at which the display of the temperature setting value changes, according to differences in the pressure detected by the pressure sensor 150.

After a pressed position is detected, if the detected pressure is larger than a given threshold A, the temperature setting value is changed, for example, at an update speed (the interval $\Delta t$) of 500 milliseconds. Further, if the detected pressure is larger than a given threshold B, the temperature setting value is changed, for example, at an update speed of 200 milliseconds. In this way, a user-friendly interface can be provided.

The number of steps (the difference $\Delta x$) may be changed, instead of changing the update speed. For example, if the detected pressure is larger than the given threshold A, the temperature setting value is changed in steps of 2° C. Further, if the detected pressure is larger than the given threshold B, the temperature setting value is changed in steps of 4° C., and so on.

The numerical value may be displayed with a setting bar chart. The speed at which the setting bar chart is updated or the number of steps in which the setting bar chart is updated is changed depending on the force with which the button 811 is pressed.

REFERENCE SIGNS LIST

100: main body, 110: operation plate, 111: center portion, 112: outer edge portion, 113: tongue portion, 120: detection position support portion, 121: tongue support portion, 131, 135: operation plate support portions, 132: operation plate support receiving portion, 133, 193: elastic bodies, 136: left support portion, 137: right support portion, 138, 433: rack gears, 139, 424, 434: guide protrusions, 140: operation screen display device, 141: display portion, 142: frame portion, 150: pressure sensor, 160: bottom plate, 161: screw hole, 162: guide hole, 171, 191: adjustment screws, 172: rubber, 180: operation switch, 190: support adjustment portion, 191: adjustment screw, 192: fixation screw, 200: pressed position determination device, 211: button input unit, 212: button memory unit, 221: pressure input unit, 222: pressure memory unit, 231: maximum determination unit, 232: sum calculation unit, 233: ratio calculation unit, 234: threshold determination unit, 235: position determination unit, 236: position output unit, 241: mode input unit, 242: screen generation unit, 243: screen output unit, 251: correction calculation unit, 252: correction memory unit, 253: pressure correction unit, 270: numerical value memory device, 280: numerical value changing device, 281: button determination unit, 282: pressure determination unit, 283: difference/interval determination unit, 284: difference addition/subtraction unit, 311: button display position, 331: axis, 350: detection position, 410: base portion, 410: height adjustment screw, 412: disk portion, 413, 414, 415: openings, 415, 425, 435: guide grooves, 416: bottom portion, 417: side portion, 420: first movable portion, 421: position adjustment screw, 422, 432: gear boxes, 426: flat portion, 430: second movable portion, 431: width adjustment screw, 436: arm portion, 437: frame portion, 800: touch panel, 810: operation screen, 811: button, 815: adjustment screen, 816: countdown display, 830: housing, 820: decorative plate, 821: opening, 822: through hole, 823: bridge portion, 850: numerical value input apparatus, 911: CPU, 913: ROM, 914: RAM, 915: communication device, 916: ADC

The invention claimed is:

1. A position input apparatus that determines a pressed position where a pressure is applied within an operation area, the position input apparatus comprising:
an operation plate that is of a flat plate shape and has the operation area on one surface;
at least two pressure detection devices, each of which detects, at a pressure detection position different from one another, a detection position pressure generated by the pressure applied to the pressed position, the pressure detection position being located outside the operation area on the operation plate;
a pressed position determination device that determines the pressed position, based on at least two detection position pressures detected by the at least two pressure detection devices;
an operation plate support portion that supports the operation plate at a position different from the pressure detection position; and
an operation plate support adjustment portion having an adjustment screw, the adjustment screw adjusting at least either one of a height, a position, and a width of the operation plate support portion supporting the operation plate,
wherein the adjustment screw is inserted through a guide hole provided under the operation plate support portion and threadingly engages with the operation plate support portion, and adjusts by moving sideways parallel to a surface of the operation plate along the guide hole the position of the operation plate support portion supporting the operation plate.

2. The position input apparatus according to claim 1, further comprising:
a numerical value memory device that stores a numerical value to be displayed on the operation plate; and
a numerical value changing device that, when the pressed position determination device determines that a pressure has been applied to a predetermined position within the operation area, determines a difference and a time interval for changing the numerical value stored by the numerical value memory device based on the detection position pressure detected by a pressure detection device of the at least two pressure detection devices, and based on the determined time interval, periodically adds or subtracts the determined difference to or from the numerical value stored by the numerical value memory device.

3. A position input apparatus that determines a pressed position where a pressure is applied within an operation area, the position input apparatus comprising:
an operation plate that is of a flat plate shape and has the operation area on one surface;
at least two pressure detection devices, each of which detects, at a pressure detection position different from one another, a detection position pressure generated by the pressure applied to the pressed position, the pressure detection position being located outside the operation area on the operation plate;
a pressed position determination device that determines the pressed position, based on at least two detection position pressures detected by the at least two pressure detection devices;
an operation plate support portion that supports the operation plate at a position different from the pressure detection position; and
an operation plate support adjustment portion having an adjustment screw, the adjustment screw adjusting at least either one of a height, a position, and a width of the operation plate support portion supporting the operation plate,
wherein the operation plate support portion includes a left support portion and a right support portion,
the adjustment screw has an inverted conically-shaped tip located at an end of the adjustment screw that is opposite to the head of the adjustment screw, and the conically-shaped tip tapers from the tip towards the head of the adjustment screw, and
the inverted conically-shaped tip contacts tapers formed on inner sides of the left support portion and the right support portion, and thereby adjusts the width of the operation plate support portion supporting the operation plate.

4. A position input apparatus that determines a pressed position where a pressure is applied within an operation area, the position input apparatus comprising:
an operation plate that is of a flat plate shape and has the operation area on one surface, the operation area having a plurality of separated areas separated from one another;
at least two pressure detection devices each of which detects, at a pressure detection position different from one another, a detection position pressure generated by the pressure applied to the pressed position, the pressure detection position being located between the plurality of separated areas on the operation plate;

a pressed position determination device that determines which one of the plurality of separated areas includes the pressed position, based on at least two detection position pressures detected by the at least two pressure detection devices;

an operation plate support portion that supports the operation plate at a position different from the pressure detection position; and an operation plate support adjustment portion having an adjustment screw, the adjustment screw adjusting at least either one of a height, a position, and a width of the operation plate support portion supporting the operation plate, wherein the adjustment screw is inserted through a guide hole provided under the operation plate support portion and threadingly engages with the operation plate support portion, and adjusts by moving sideways parallel to a surface of the operation plate along the guide hole the position of the operation plate support portion supporting the operation plate.

5. The position input apparatus according to claim 4, further comprising:

a numerical value memory device that stores a numerical value to be displayed on the operation plate; and a numerical value changing device that, when the pressed position determination device determines that a pressure has been applied to a predetermined position within the operation area, determines a difference and a time interval for changing the numerical value stored by the numerical value memory device based on the detection position pressure detected by a pressure detection device of the at least two pressure detection devices, and based on the determined time interval, periodically adds or subtracts the determined difference to or from the numerical value stored by the numerical value memory device.

6. A position input apparatus that determines a pressed position where a pressure is applied within an operation area, the position input apparatus comprising:

an operation plate that is of a flat plate shape and has the operation area on one surface, the operation area having a plurality of separated areas separated from one another;

at least two pressure detection devices each of which detects, at a pressure detection position different from one another, a detection position pressure generated by the pressure applied to the pressed position, the pressure detection position being located between the plurality of separated areas on the operation plate;

a pressed position determination device that determines which one of the plurality of separated areas includes the pressed position, based on at least two detection position pressures detected by the at least two pressure detection devices;

an operation plate support portion that supports the operation plate at a position different from the pressure detection position; and an operation plate support adjustment portion having an adjustment screw, the adjustment screw adjusting at least either one of a height, a position, and a width of the operation plate support portion supporting the operation plate, wherein the operation plate support portion includes a left support portion and a right support portion, the adjustment screw has an inverted conically-shaped tip located at an end of the adjustment screw that is opposite to the head of the adjustment screw, and the conically-shaped tip tapers from the tip towards the head of the adjustment screw, and the inverted conically-shaped tip contacts tapers formed on inner sides of the left support portion and the right support portion, and thereby adjusts the width of the operation plate support portion supporting the operation plate.

* * * * *